US012160671B2

(12) United States Patent
Rao et al.

(10) Patent No.: US 12,160,671 B2
(45) Date of Patent: Dec. 3, 2024

(54) SHELF-MOUNTABLE IMAGING SYSTEM

(71) Applicant: Target Brands, Inc., Minneapolis, MN (US)

(72) Inventors: Anup Jayapal Rao, Bengaluru (IN); Sunay Narkar, Bengaluru (IN); Karthik Raju, Bengaluru (IN); Sanjay Bhokse, Bengaluru (IN); Sandeep Tammana, Bengaluru (IN); Abby P Joby, College Station, TX (US); Hithyshi M, Tumakuru (IN); Kurmanadharao Valla, Srikakulam (IN)

(73) Assignee: Target Brands, Inc., Minneapolis, MN (US)

( * ) Notice: Subject to any disclaimer, the term of this patent is extended or adjusted under 35 U.S.C. 154(b) by 237 days.

(21) Appl. No.: 17/681,517

(22) Filed: Feb. 25, 2022

(65) Prior Publication Data
US 2022/0318729 A1    Oct. 6, 2022

(30) Foreign Application Priority Data

Mar. 31, 2021 (IN) .............................. 202111014915

(51) Int. Cl.
*A47F 10/02* (2006.01)
*G06K 17/00* (2006.01)
(Continued)

(52) U.S. Cl.
CPC ............. *H04N 23/90* (2023.01); *A47F 10/02* (2013.01); *G06K 17/0022* (2013.01);
(Continued)

(58) Field of Classification Search
CPC ...... H04N 23/57; H04N 23/61; H04N 23/617; H04N 23/65; H04N 23/651; H04N 23/66; H04N 23/661; H04N 23/667; H04N 1/00053; H04N 1/00066; H04N 1/00885; H04N 1/00888; H04N 1/00938; G06Q 10/087; G06K 17/0022; A47F 2010/025;
(Continued)

(56) References Cited

U.S. PATENT DOCUMENTS 7,233,241 B2    6/2007  Overhultz et al.
2014/0028841 A1  1/2014  Case et al.
(Continued)

FOREIGN PATENT DOCUMENTS

WO       2018204833 A1    11/2018

*Primary Examiner* — Daniel M Pasiewicz
(74) *Attorney, Agent, or Firm* — Merchant & Gould P.C.

(57) ABSTRACT

An imaging system capture images of products on shelves in a minimally invasive way. The images can be processed to assess restocking needs and other information. The imaging system includes multiple shelf-mountable imaging devices that can be positioned throughout one or more retail locations. Certain types of imaging devices may be self-contained units having replaceable or rechargeable internal power sources and/or wireless communication interfaces. Certain types of imaging device are configured to take images only when the field of view is not blocked by traffic (e.g., consumers, employees, etc.). Certain types of imaging devices are low-profile and/or are camouflageable to enhance the user experience.

19 Claims, 41 Drawing Sheets

(51) Int. Cl.
*G06Q 10/087* (2023.01)
*G06Q 20/20* (2012.01)
*H04N 23/54* (2023.01)
*H04N 23/57* (2023.01)
*H04N 23/61* (2023.01)
*H04N 23/617* (2023.01)
*H04N 23/65* (2023.01)
*H04N 23/661* (2023.01)
*H04N 23/80* (2023.01)
*H04N 23/90* (2023.01)

(52) U.S. Cl.
CPC ......... *G06Q 20/203* (2013.01); *G06Q 20/208* (2013.01); *H04N 23/54* (2023.01); *H04N 23/61* (2023.01); *H04N 23/617* (2023.01); *H04N 23/65* (2023.01); *H04N 23/661* (2023.01); *H04N 23/80* (2023.01); *A47F 2010/025* (2013.01); *G06Q 10/087* (2013.01); *H04N 23/57* (2023.01)

(58) Field of Classification Search
CPC . A47F 10/02; G06F 8/65; G06F 8/656; G06F 8/658; G06F 8/66
See application file for complete search history.

(56) References Cited

U.S. PATENT DOCUMENTS

| | | |
|---|---|---|
| 2014/0184818 A1 | 7/2014 | Argue et al. |
| 2014/0201041 A1 | 7/2014 | Meyer |
| 2017/0202369 A1 | 7/2017 | Mercier et al. |
| 2018/0332236 A1* | 11/2018 | Glaser ............. G08B 13/19656 |
| 2019/0180150 A1 | 6/2019 | Taylor et al. |
| 2019/0215424 A1 | 7/2019 | Adato et al. |
| 2022/0360695 A1* | 11/2022 | Schwarz ................ G09F 3/208 |

* cited by examiner

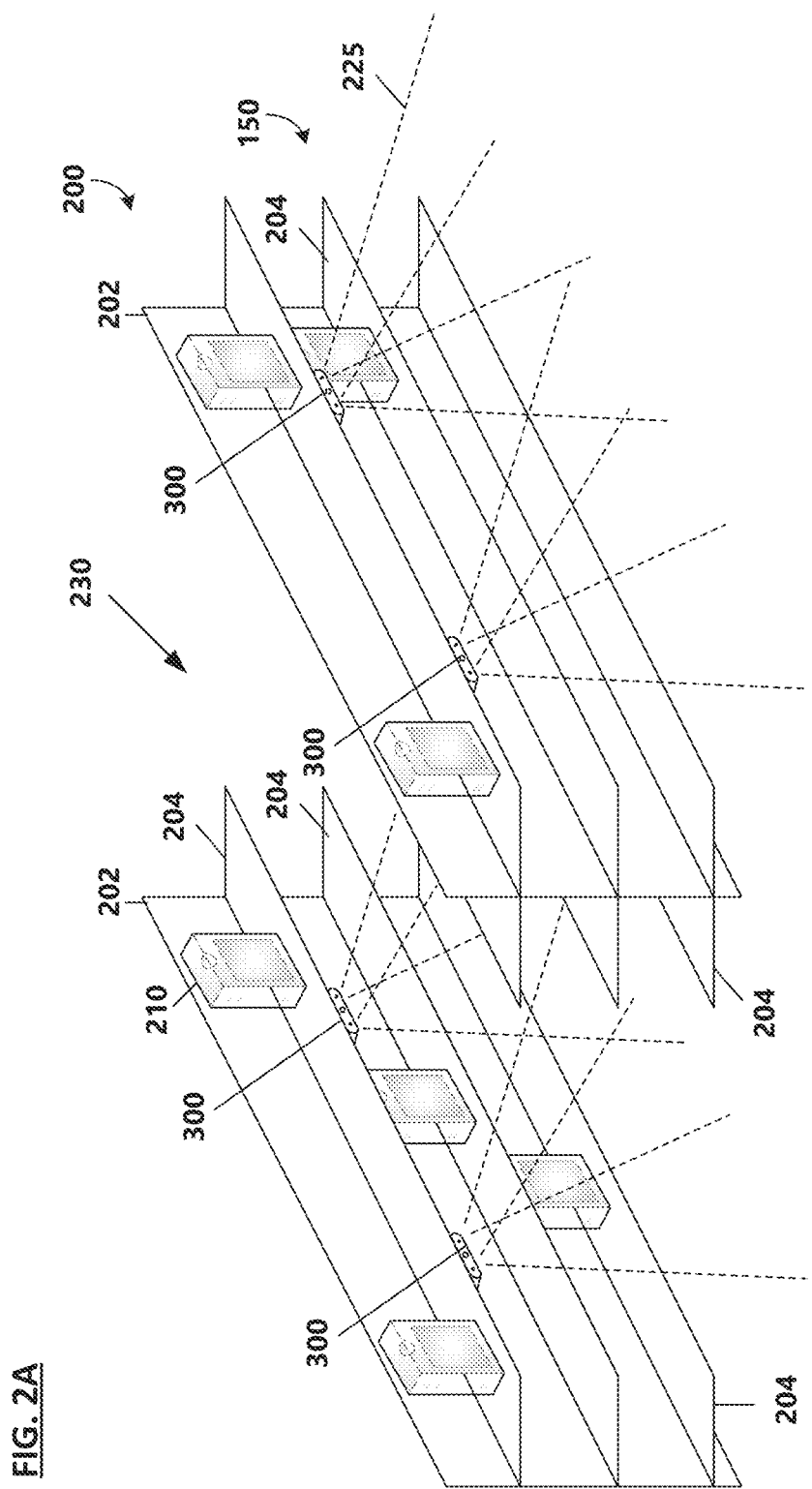

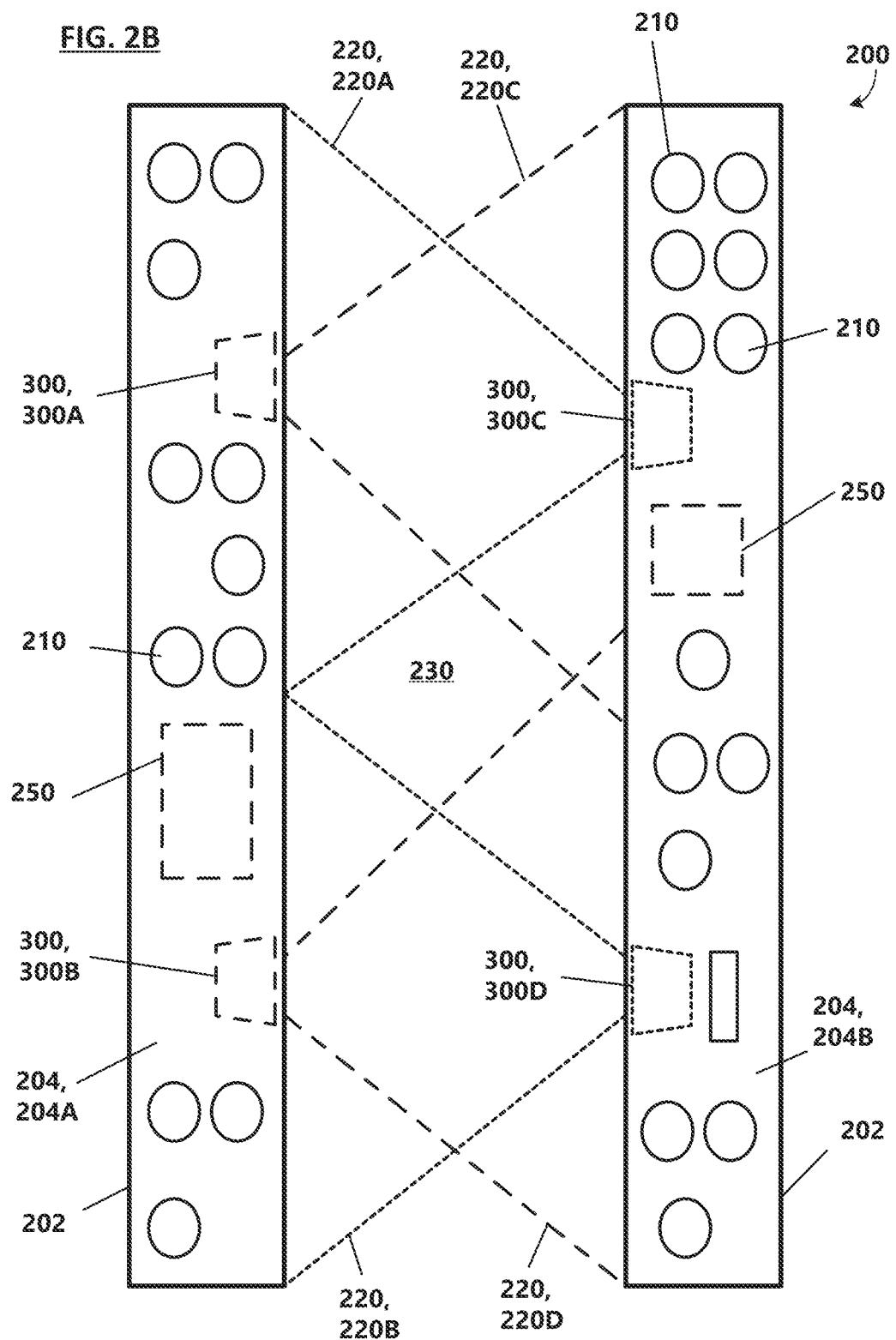

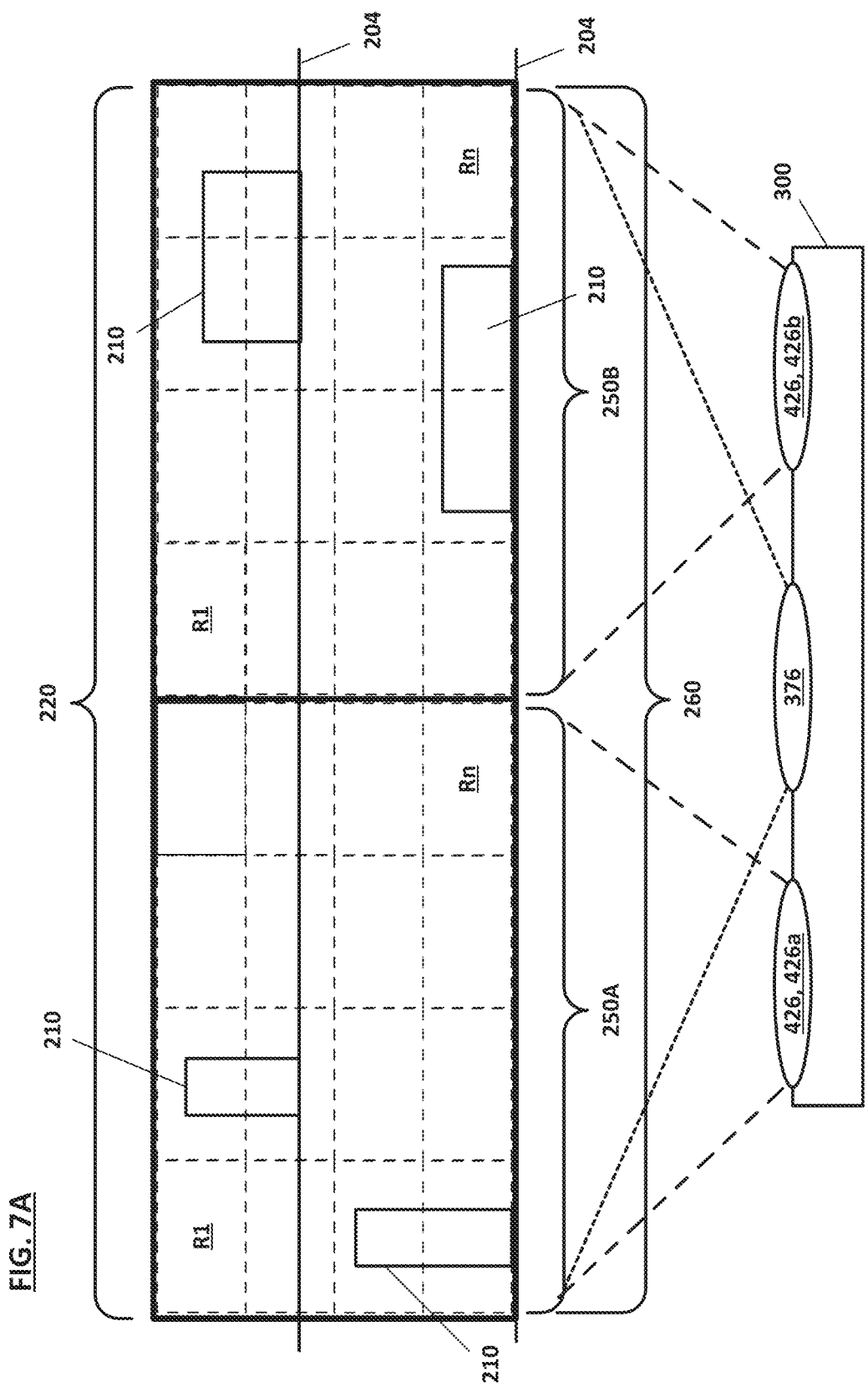

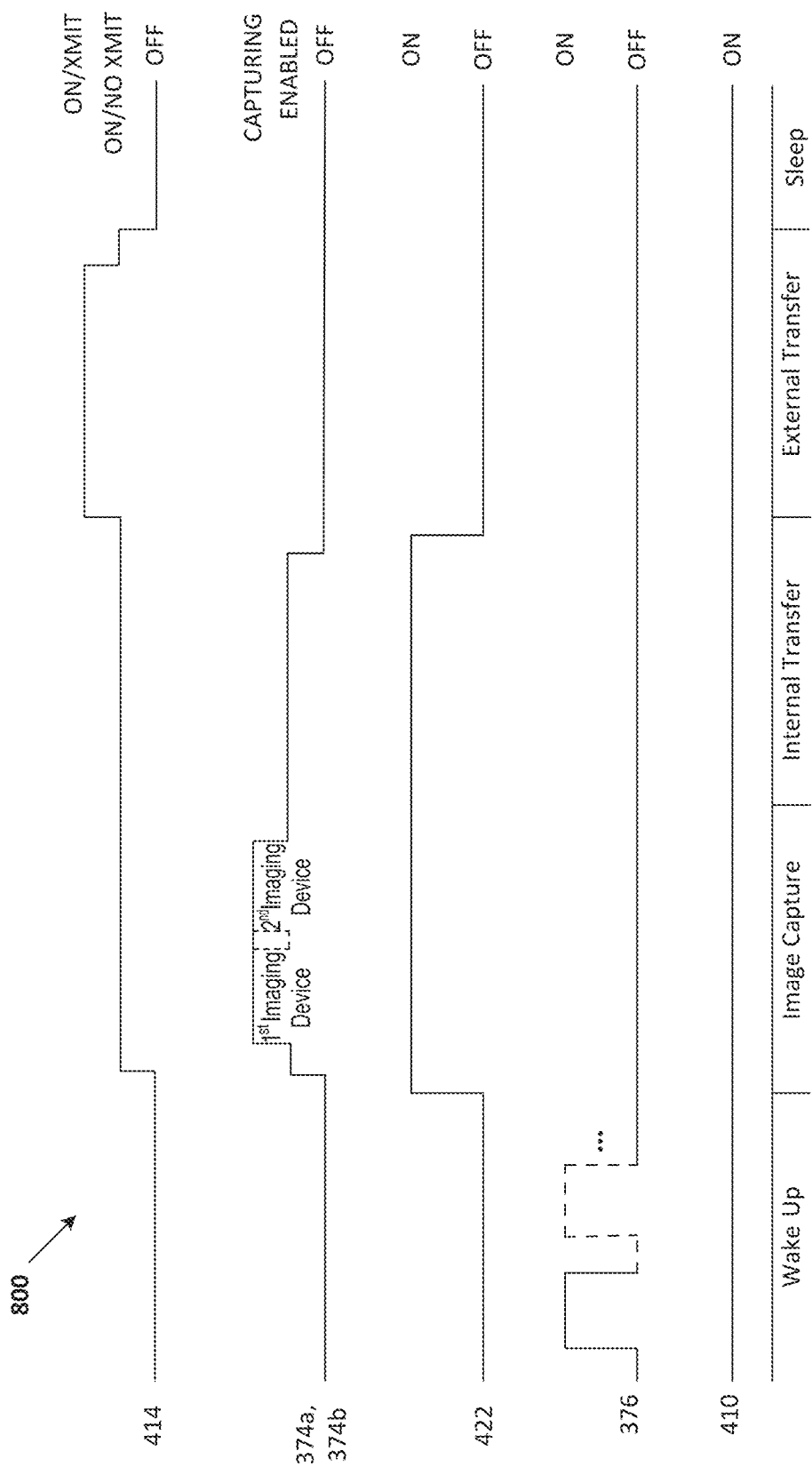

SHELF-MOUNTABLE IMAGING SYSTEM

CROSS-REFERENCE TO RELATED APPLICATIONS

This application claims priority from India Provisional Application No. 202111014915, filed Mar. 31, 2021, the disclosure of which is incorporated by reference in its entirety.

BACKGROUND

Effective inventory management is critical for retailers, and in particular at physical retail locations, due to the possibility of lost sales or reduced customer loyalty in response to inability to find an item in stock at a retail location.

For retailers having a mix of high-volume and low-volume products, or products with wide fluctuations in demand, this issue is exacerbated. Retailers will often schedule restocking efforts during off-hours to minimize disruption to customers, and will otherwise require employees to monitor stock levels on shelves during business hours and restock items that are out of stock on an ad-hoc basis. This relies on an employee either being told about the lack of stock by a customer, or otherwise noticing the lack of stock on a shelf. Additionally, even if items may be in stock, they may have been restocked at a different, unexpected location due to lack of space in the intended location, or simply due to employee error.

A number of robust solutions have been proposed to assist with monitoring of on-shelf inventory, including, for example, use of continuous surveillance cameras or robotic devices that capture images of store shelves. However, such devices can be disrupted by traffic through a store aisle or may be disconcerting to customers, out of a potential concern that the customer is being watched. Furthermore, often inventory monitoring solutions require significant employee intervention to assist with image capture processes, or introduce large power or communication requirements at a wide variety of shelf positions within a retail location.

SUMMARY

In accordance with aspects of the present disclosure, the shelf-mountable imaging system described herein may be placed at a location in proximity to products on shelves, for example in a location that is minimally noticeable to customers at the retail location. In example aspects, the shelf-mountable imaging system may be configured to capture images of products on shelves in a minimally invasive way, avoiding capturing pictures of customers, employees, or other nonproduct objects that may be present within a shopping aisle between shelf installations.

Additionally, in example aspects, the shelf mountable imaging system may be constructed to periodically capture and transmit images with very low-power consumption, and not requiring wiring for an external power supply or communication. The shelf mountable imaging system may then communicate image data to a local or remote server, for further analysis of products on shelves. Such imaging and image analysis may be used to determine, for example, a current product location, whether one or more products are out of stock, or various restocking patterns. Other applications may be used as well as described herein.

In accordance with example embodiments, the shelf mountable imaging system provides a number of advantages. For example, the low-power consumption required by such a system avoids a requirement of retrofitting product shelves at a retail location with power supply or communication lines, while also avoiding a requirement of regular employee maintenance. Additionally, the shelf mountable imaging system is constructed to capture high resolution imagery using low-power, low bandwidth imaging components. Furthermore, the shelf mountable imaging system includes instructions and circuitry to avoid capture of unwanted images of customers or employees, or other non-product objects present within an aisle (e.g., abandoned carts, or other unexpected objects), while at the same time remaining inconspicuous to customers. Furthermore, the shelf mountable imaging system may be remotely upgradable from a centralized server system, for example to update firmware, it change one or more settings directed to frequency or quality of image capture, or other settings.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 2A illustrates a schematic diagram of a retail location having the imaging system of FIG. 1 installed, the imaging system including one or more shelf-mountable imaging devices.

FIG. 2B illustrates multiple shelf-mounted imaging devices of the imaging system of FIG. 1 installed on opposing shelves in an aisle of an example retail location.

FIG. 7A is an example configuration of dividing a field of view of an imaging device of the shelf-mountable imaging device into a plurality of sub-views.

FIG. 8 illustrates a time diagram for power management of the shelf-mountable imaging device.

DETAILED DESCRIPTION

In general, a shelf-mountable imaging system is described. The shelf-mounted imaging system includes one or more cameras, and may be positioned and programmed to be both unobtrusive to customers and non-invasive to customer privacy, while monitoring stock levels at a retail location.

In accordance with aspects of the present disclosure, the shelf-mountable imaging system described herein may be placed at a location in proximity to products on shelves, for example in a location that is minimally noticeable to customers at the retail location. In example aspects, the shelf-mountable imaging system may be configured to capture images (e.g., one or more still images, one or more video images, etc.) of products on shelves in a minimally invasive way, avoiding capturing pictures of customers, employees, or other nonproduct objects that may be present within a shopping aisle between shelf installations. Additionally, in example aspects, the shelf mountable imaging system may be constructed to periodically capture and transmit images with very low-power consumption, and not requiring wiring for an external power supply or communication. The shelf mountable imaging system may then communicate image data (e.g. through wireless communication such as Bluetooth communication, WiFi communication, or LoRa communication, through a cabled connection, etc.) to a local or remote server, for further analysis of products on shelves. Such imaging and image analysis may be used to determine, for example, a current product location, whether one or more products are out of stock, or various restocking patterns. Other applications may be used as well as described herein.

In accordance with example embodiments, the shelf mountable imaging system provides a number of advantages. For example, the low-power consumption required by such a system avoids a requirement of retrofitting product shelves at a retail location with power supply or communication lines, while also avoiding a requirement of regular employee maintenance. Additionally, the shelf mountable imaging system is constructed to capture high resolution imagery using low-power, low bandwidth imaging components. Furthermore, the shelf mountable imaging system includes instructions and circuitry to avoid capture of unwanted images of customers or employees, or other non-product objects present within an aisle (e.g., abandoned carts, or other unexpected objects), while at the same time remaining inconspicuous to customers. Furthermore, the shelf mountable imaging system may be remotely upgradable from a centralized server system, for example to update firmware, it changes one or more settings directed to frequency or quality of image capture, or other settings.

I. Retail Environment

Figure 1:
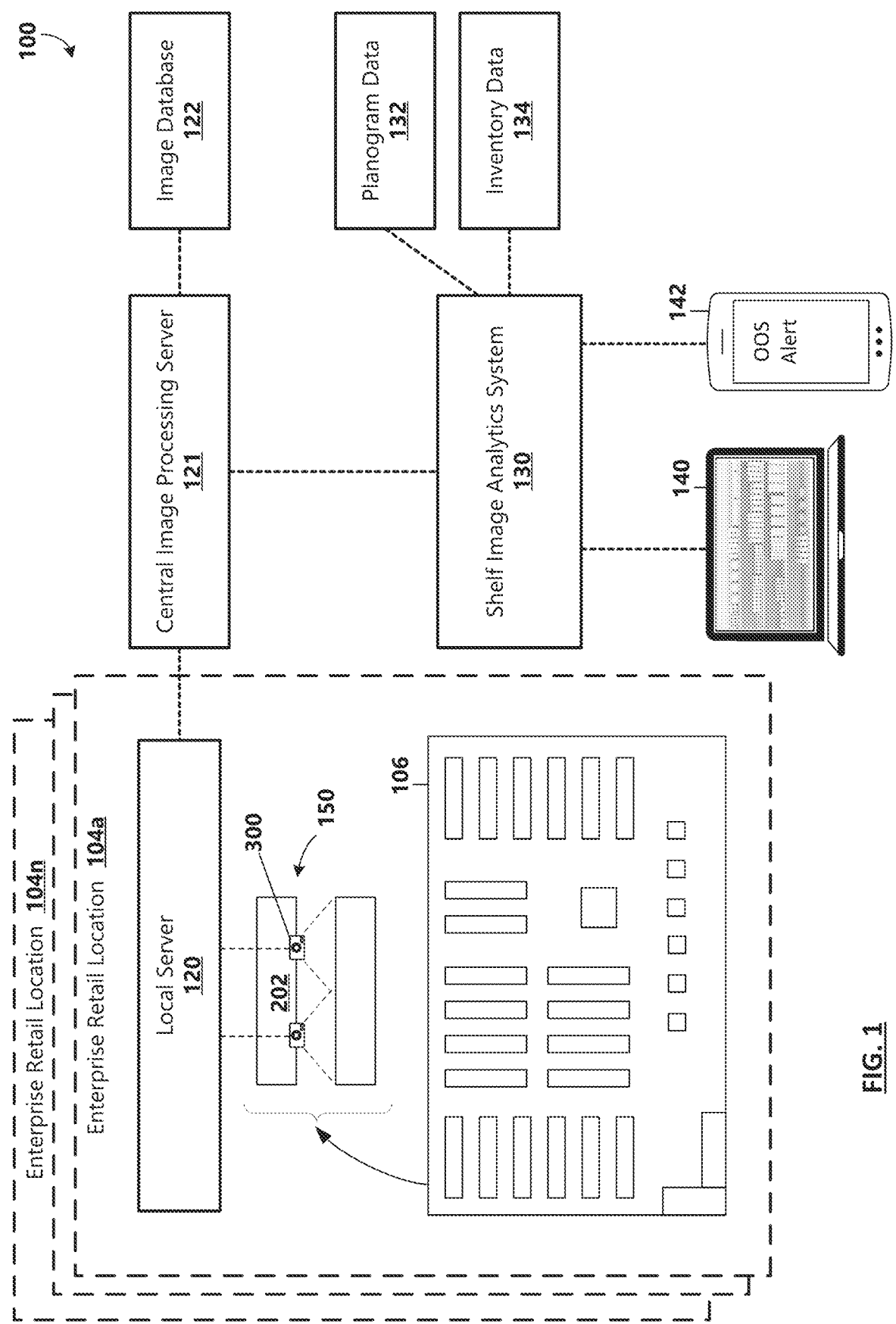
FIG. 1 illustrates a schematic diagram of a retail imaging system utilizing the shelf-mountable imaging system of the present disclosure at a plurality of retail locations.

Referring first to FIGS. 1, 2A, and 2B, an example environment in which a shelf mountable imaging system may be provided is shown. In particular, FIG. 1 illustrates a schematic diagram of a retail imaging system 100 utilizing the shelf-mountable imaging system of the present disclosure at a plurality of retail locations. FIG. 2 illustrates a schematic diagram of shelf arrangement 200 at one example retail location having a plurality of shelf-mountable imaging systems installed.

Referring to FIG. 1, the retail imaging system 100 is implemented across a retail organization that includes a plurality of enterprise retail locations 104a-104n. Each enterprise retail location 104a-104n has a store layout, shown as planogram 106. An imaging system 150 may be provided at each retail location 104a-104n. In certain implementations, each of the imaging systems 150 is communicatively connected to a local server 120 to compile and/or process images captured by the imaging system 150. In some implementations, each local server 120 is communicatively connected (e.g., through a wireless connection, such as WiFi or other wireless protocol, through a cabled connection, or otherwise connected) to a central processing server 121 (or network of servers). In other implementations, each local server 120 may operate independently.

As shown in FIGS. 2A and 2B, each imaging system 150 includes one or more imaging devices 300 mounted to one or more shelves 204 within the retail location. Each imaging device 300 is configured to capture images of a corresponding shelf 204, for example a shelf on an opposite side of an aisle from a mounting location of the imaging device 300. For example, in FIG. 2B, first and second imaging devices 300A, 300B are mounted to a first shelf 204A while third and fourth imaging devices 300C, 300D are mounted to an opposing second shelf 204B. In certain implementations, the imaging devices 300 are mounted to undersides of the shelves 204. Accordingly, the imaging devices 300 are shown in dashed lines in FIG. 2B.

Each shelf 204, 204A, 204B is configured to hold one or more retail items for sale 210. Each imaging device 300 is configured to capture images of the opposed shelf and, hence, the retail items 210 held by the shelf 204. The images also capture any empty spaces 250 along the shelves 204 when a retail item 210 is missing from the shelf 204. In some implementations, the imaging devices 300 are configured to periodically (e.g., two times daily, four times daily, eight times daily, ten times daily, twelve times daily, twenty-four times daily, etc.) capture the images. In other implementations, the imaging devices 300 are configured to capture images upon a request from the local server 120.

Each imaging device 300 has a corresponding field of view 220. In the example shown in FIG. 2B, the first imaging device 300A has a first field of view 220A, the second imaging device 300B has a second field of view 220B, the third imaging device 300C has a third field of view 220C, and the fourth imaging device 300D has a fourth field of view 220D. In certain examples, the fields of view 220 of imaging devices 300 on a common shelf 204 partially overlap or have contiguous boundaries to that the imaging devices 300 can cooperate to obtain a complete image of the opposing shelf 202. For example, in FIG. 2B, the first and second imaging devices 300A, 300B have contiguous fields of view 220A, 220B while the third and fourth imaging devices 300C, 300D have partially overlapping fields of view 220C, 220D.

Referring back to FIG. 1, in certain implementations, each of the imaging devices 300 includes a wireless communication interface that allows the imaging device 300 to communicate with the local server 120. In some examples, each imaging device 300 is wirelessly connected to the local server 120. For example, each imaging device 300 may send captured images to the local server 120, e.g., over WiFi or other wireless communication protocol. Image data may then be transmitted from the local server 120 to a central image processing server 121 for storage in an image database 122 for subsequent processing.

In the example shown, the local server 120 may optionally perform image analysis on the image data received from each of the imaging systems 300 at the particular enterprise retail location 104 at which the imaging system 300 is located. In some alternative embodiments, the local server 120 may be excluded, and instead image data may be transmitted via WiFi or other wireless networking equipment to a remote system, such as central image processing server 121 for processing.

In the example shown, the central image processing server 121 may perform one or more operations on image data received from each of the plurality of enterprise retail locations 104a-n. For example, the central image processing server 121 may perform one or more of dewarping image data, or stitching together image data from two or more imaging systems 300 to form a composite image.

In the example shown, a shelf image analytics system 130 may be communicative lead connected to the central image processing serve 121. The shelf image analytics system 130 may perform analysis on reconstructed image data to determine information about products or product shelves 204 represented in the captured image. For example, the shelf image analytics system 130 may combine reconstructed images stored in the image database by the central image processing server 121 with planogram data 132 describing intended locations of items 210 on shelves 204, and inventory data 134 describing particular products and including reference images of those products, to provide a variety of types of analyses and reporting to an end-user computing system 140, or mobile device 142. The end-user computing systems 140 may be used by the enterprise to generate reporting analyses regarding product restocking and product inventory levels. The mobile device 142 may be used by a customer or employee, and may provide one or more alerts regarding lack of stock of a particular item. For example, an out of stock alert may be presented on a mobile device 142 of an employee, indicating that the employee should initiate restock of a particular item based on image analysis indicating that a shelf is empty in a location corresponding to the particular item.

FIG. 2A illustrates an example shelf arrangement 200 with which the imaging system 300 of the present disclosure may be utilized. In the example shown, a plurality of shelf installations 202 are depicted, forming one or more aisles 230. Each of the shelf installations 202 may include one or more shelving units 204 onto which products 210 may be stocked.

In the example shown, a plurality of imaging devices 300 are mounted to an underside of one of the shelving units 204 of the shelf installations 202. The imaging devices 300 are designed to be relatively low-profile, inconspicuous camera systems that each include, as described below, a plurality of image sensors. In certain examples, each imaging device 300 has a field of view 220 that covers a portion of an opposing shelving unit 204. In certain examples, the field of view 220 of each imaging device 300 covers a portion of multiple shelving units 204 including shelving units 204 disposed above and below the opposing shelving unit 204.

In the example shown, each imaging device 300 can include two image sensors that capture respective fields of the view 225 that cooperate to define a combined field of view 220 for the imaging device 300. The combined field of view of each imaging device 300 capturing an image of at least a portion of an opposed shelving installation 202. Accordingly, a composite image may be created from the images captured by the image sensors of a single imaging device 300 to form a captured image, and additionally, composite images of a shelf installation 202 may be created from the captured images provided by multiple imaging devices 300 oriented at the shelf installation 202. In other examples, each imaging device 300 may have a greater or lesser number (e.g., one, three, four, etc.) of imaging sensors.

II. Shelf-Mountable Imaging Device

FIGS. 3A-3F and 11-31 illustrate an example configuration of a shelf-mountable imaging device 300, 700 suitable for use with the imaging system 150 and in implementing aspects of the present disclosure. As shown, the shelf-mountable imaging device 300, 700 generally includes a housing 310, 710 having a mountable portion 312, 712 and a viewing portion 314, 714. The mountable portion 312, 712 is configured to mount to a retail shelf (e.g. shelving unit 204 of FIGS. 2A and 2B). The viewing portion 314, 714 carries one or more imaging sensors 426 (FIGS. 4 and 7A). In certain examples, the viewing portion 314, 714 carries a presence sensor 376 such as a motion sensor (FIG. 4).

The imaging device 300, 700 has a depth D extending between a front 702 and a rear 704 of the imaging device, a width W extending between opposite first and second sides 706, 708 of the imaging device, and a height H extending between a top 703 and a bottom 705 of the imaging device. The viewing portion 314, 714 is disposed at the front 702 of the imaging device 300, 700. In certain examples, the viewing portion 714 is disposed forwardly of the mountable portion 712 via a neck portion 716. In certain implementations, the viewing portion 314, 714 extends over less than the height H of the imaging device 300, 700.

Referring to FIGS. 3A-3B and 14-16, the mountable portion 312, 712 is configured to be fixedly mounted to a shelving installation 202 so that the imaging device 300, 700 does not move relative to the shelving installation 202. In certain examples, the mountable portion 312, 712 is configured to engage an underside of a shelf 204 of the shelving installation 202. In other implementations, the mountable portion 312, 712 may be configured to engage a rear or side surface of the shelf 204 or of the shelving installation 202.

Figure 3A:
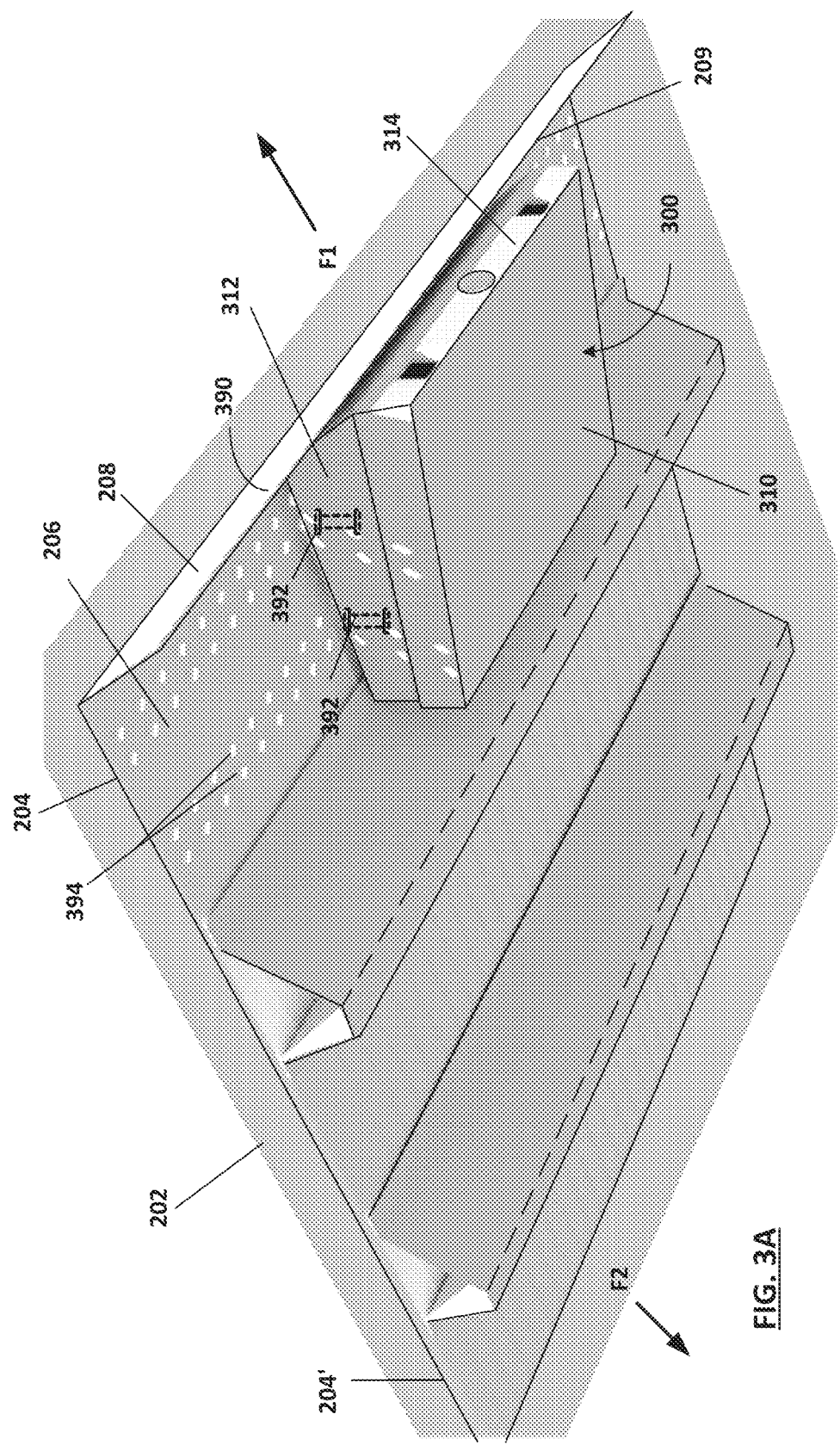
FIG. 3A is a bottom perspective view of a housing of one example implementation of a shelf-mountable imaging device of the imaging system of FIG. 2, the imaging device being mounted beneath a retail shelf.

In FIG. 3A, an example shelving installation 202 includes a shelf 204 facing in a first direction F1. In certain examples, the shelving installation 202 also may define another shelf 204' facing in an opposite second direction F2. The shelf 204 has a flat main portion 206 on which the retail items 210 may be disposed. In certain implementations, the shelf 204 also includes a flange 208 that extends downwardly from the main portion 206 of the shelf 204. In certain examples, the flange 208 is angled outwardly from the main portion 206. In certain examples, the flange 208 can be used to support product labels indicating product names, prices, or other indicia (e.g., product SKU).

Figure 3B:
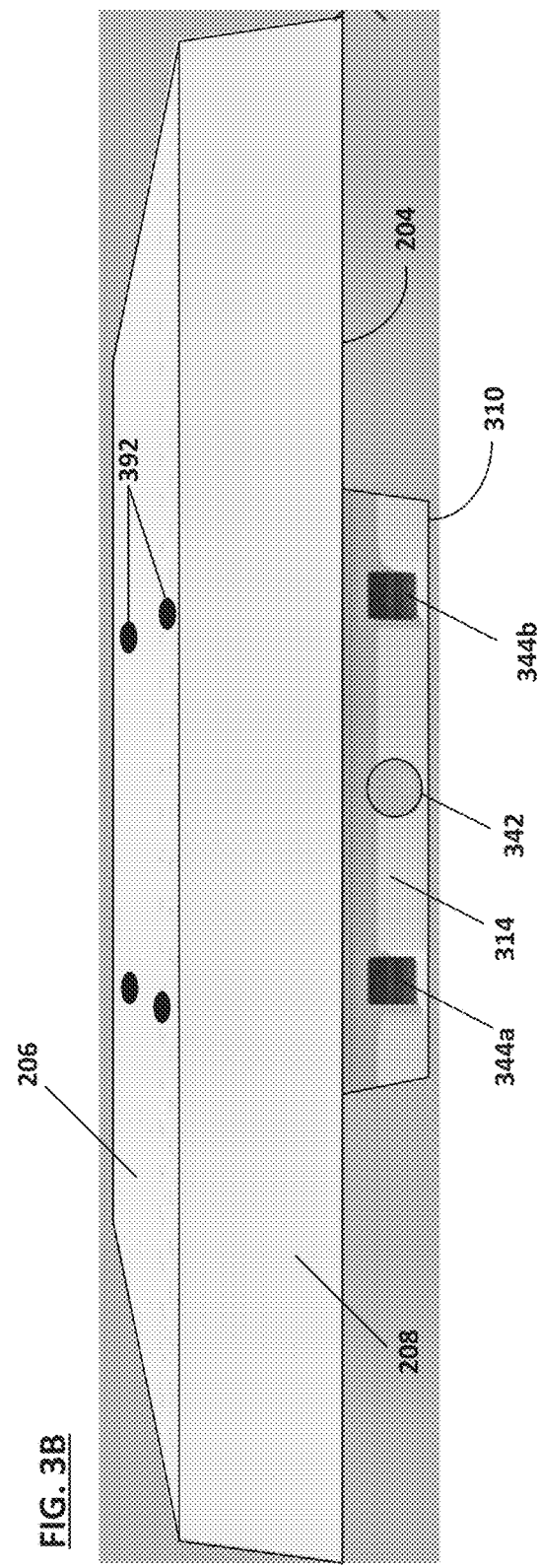
FIG. 3B is a front elevational view of the shelf-mountable imaging device of FIG. 3A mounted to a retail shelf with a viewing portion of the housing of the imaging device disposed beneath the retail shelf.

In some implementations, the imaging device housing 310 is configured to be recessed inwardly from an outer edge 209 of the shelf 204. Accordingly, the housing 310 does not extend beyond the shelf 204 and into the aisle 230. Therefore, the housing 310 does not interfere with traffic through the aisle 230. As shown in FIGS. 3A and 3B, the imaging device housing 310 is configured to mount beneath the main portion 206 of the shelf 204 and behind the flange 208. Accordingly, the imaging device 300 is partially hidden by the shelf 204. For example, the mounting portion 312 of the device 300 may be hidden by the shelf 204. In certain implementations, the viewing portion 314 of the imaging device 300 extends below the flange 208 to align the imaging sensors 426 and/or presence sensor 376 with the opposing shelf 204 or other subject to be imaged.

Figure 16:
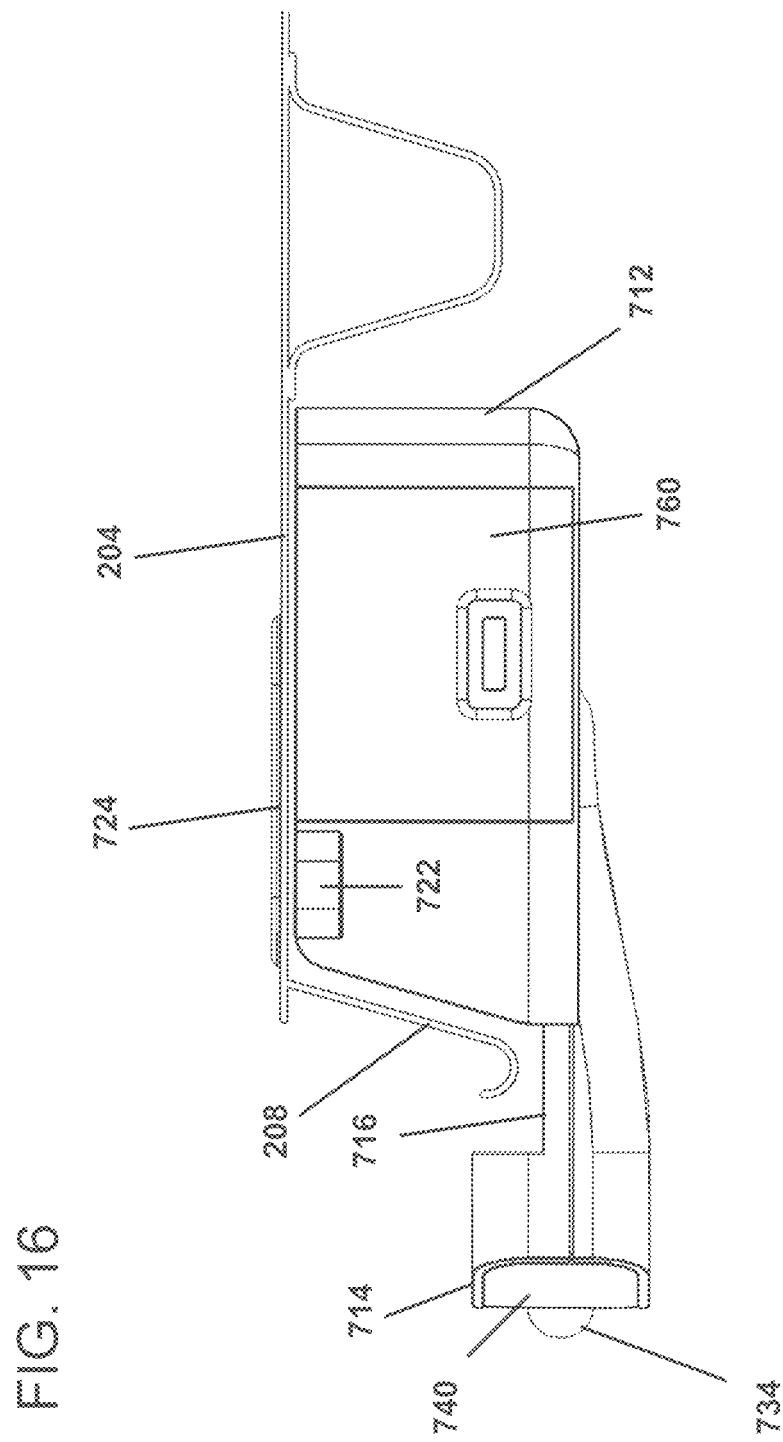
FIG. 16 is a side elevational view of the imaging device of FIG. 11 mounted to the retail shelf of FIG. 14.

In other implementations, a mountable portion 712 of the device housing 710 is recessed inwardly from the outer edge 209 while a neck portion 716 extends forwardly of the mountable portion 712 to position the viewing portion 714 forward of the shelf 204 (e.g., see FIG. 16). In certain examples, the flange 208 of the shelf 204 may extend towards the neck portion 716 between the viewing portion 714 and the mountable portion 712. In certain examples, the viewing portion 714 is less than half of the size of the mountable portion 712. In certain examples, the viewing portion 714 is less than a third the size of the mountable portion 712. Accordingly, in certain examples, a majority of the imaging device 700 is concealed from view by the shelf 204.

Concealing part of the imaging device 300 may reduce visibility of the device 300, 700 by consumers, which may enhance the comfort and user experience of the consumers. In certain embodiments, an opaque or semi-opaque film 740 (e.g., see FIG. 17) is used to cover sections of the viewing portion 314, 714 (e.g., openings 344a, 344b, 732) serving to hide lenses of the imaging units 374a, 374b, 730a, 730b from view and/or to protect the lenses.

FIGS. 3A-3F illustrate a first example imaging device 300. FIGS. 11-31 illustrate a second example imaging device 700. In the illustrated embodiment of FIGS. 3A-3F, mounting bolts 392 extend through mounting holes 336 (see FIG. 3C) in the mounting portion 312 of the housing 310. The mounting bolts 392 may extend through existing holes 394 in the shelf 204 such that modification of the shelf 204 is not required for installation of the shelf-mountable imaging device 300. Other manners of mounting the shelf-mountable imaging housing 310 to the shelf 204 also are possible with or without modification of the shelf 204. Once mounted, in certain configurations of the shelf-mountable imaging device 300, removal of the viewing portion 314 from the mounting portion 312 is possible to provide service access to interior components without having to de-mount the imaging housing 310 from the shelf 204. In other embodiments, a port such as port 354 (see FIG. 3D) provides service access to interior components (e.g., changing imaging device position, swapping out batteries, etc.) without demounting the shelf-mountable imaging device 300 and without removing the viewing portion 314.

Figure 3D:
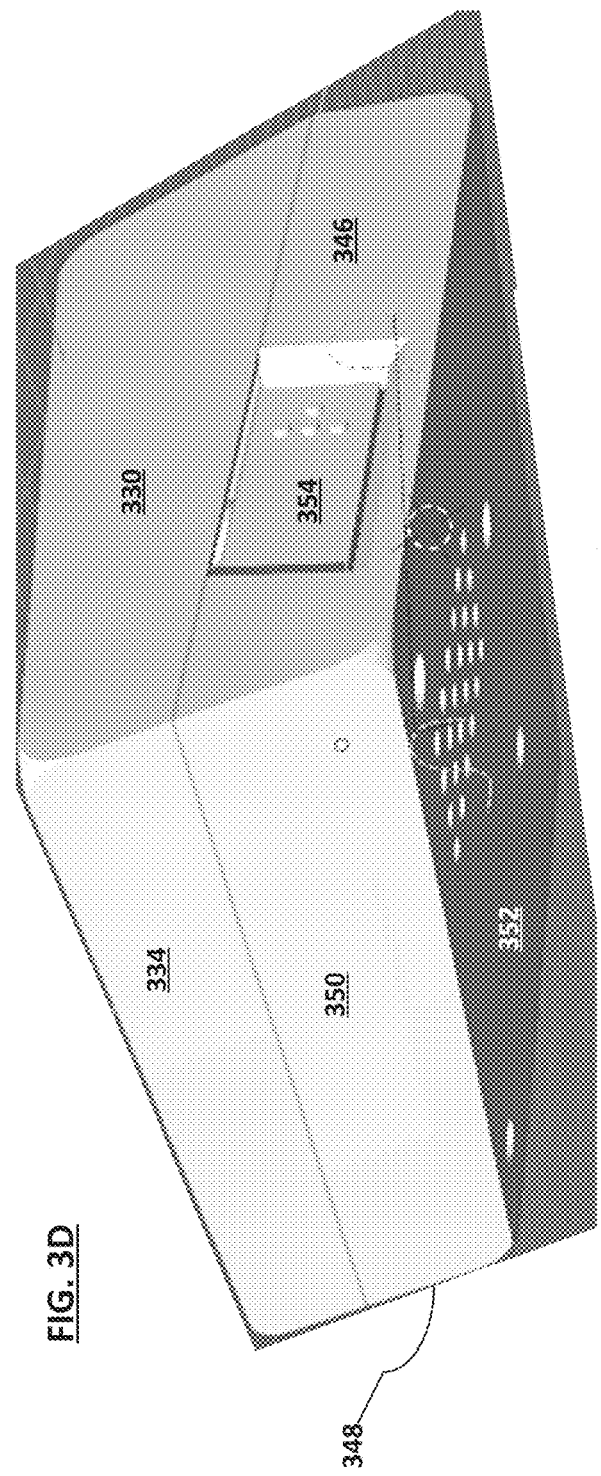
FIG. 3D is a rear, bottom perspective view of the shelf-mountable imaging device of FIG. 3A.
Figure 3C:
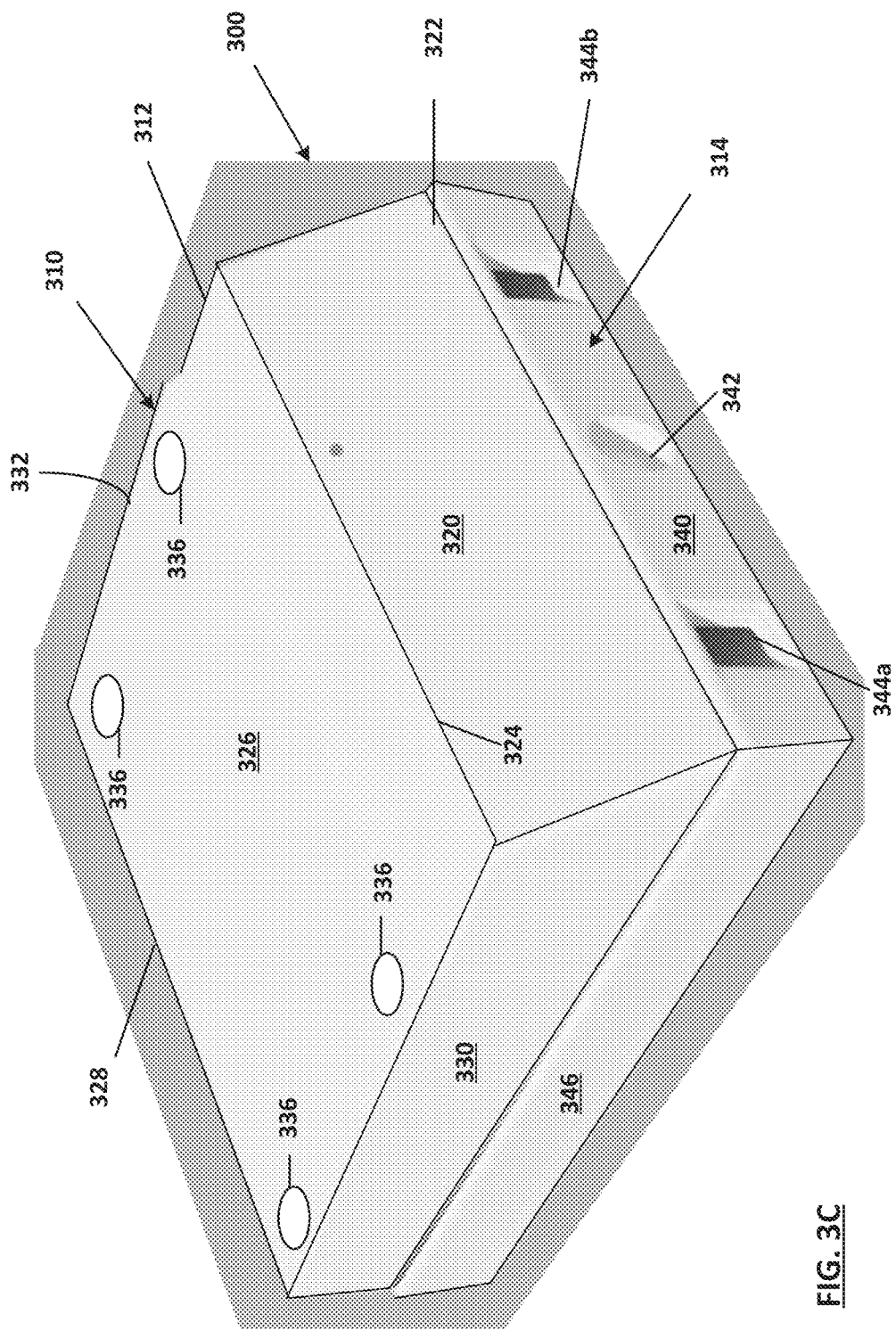
FIG. 3C is a top perspective view of the housing of the shelf-mountable imaging device of FIG. 3A.

As shown in FIGS. 3C and 3D, the mounting portion 312 of the housing 310 includes an upward ramped forward face 320 that extends from a forward edge 322 to a rearward edge 324. The rearward edge 324 interfaces with a downward ramped upper face 326 extending from rearward edge 324 to back edge 328. First and second side walls 330, 332 and back wall 334 extend about the remainder of the periphery of the mounting portion 312 to present a unitary configuration. In certain embodiments, the first side, second side and/or back walls 330, 332, 334 include a port (not shown) to that is openable to provide access to interior components of the shelf-mountable imaging device 300. The ramped forward face 320 and ramped upper face 326 are designed to accommodate a profile of a shelf (e.g., shelf 204) to which the shelf-mountable imaging device will be removably secured. As such, the mounting portion 312 can be manufactured with different profiles suitable to the item to which the shelf-mountable imaging device 300 will be mounted and is not limited to the illustrated profile. One or more mounting holes 336 extend through the upper face 326 of the mounting portion 312 enabling a mounting bolt (not shown) to be inserted therethrough. A cavity is formed by the walls 330, 332, 334 and faces 320, 326 of the mounting portion 312.

The viewing portion 314 of the shelf-mountable imaging device 310 includes a forward face 340 including a centrally positioned opening 342 as well as first and second side openings 344a, 344b. First and second side walls 346, 348, along with a back wall 350, complete the perimeter of the viewing portion 314 and are unitary with a bottom face 352. In certain embodiments, first side, second side and/or back walls 346, 348, 350 include a port 354 to provide access to components within the shelf-mountable imaging device 300. The bottom face 352 includes one or more vent holes 356 to provide cooling airflow to interior components of the shelf-mountable imaging device 300. In certain configurations, the bottom face 352 includes one or more mounting holes 358 that align with mounting holes 336 on the mounting portion 312 enabling a bolt to be inserted through aligned mounting holes 336, 358 to secure the shelf-mountable imaging device 300 to a shelf. In certain embodiments, the viewing portion 314 is removably secured to the mounting portion 312 independent of the mounting of the shelf-mountable imaging device housing 310, e.g. mounting bolts extend only through the mounting portion 312 rather than through both the viewing portion 314 and mounting portion 312.

Figure 3E:
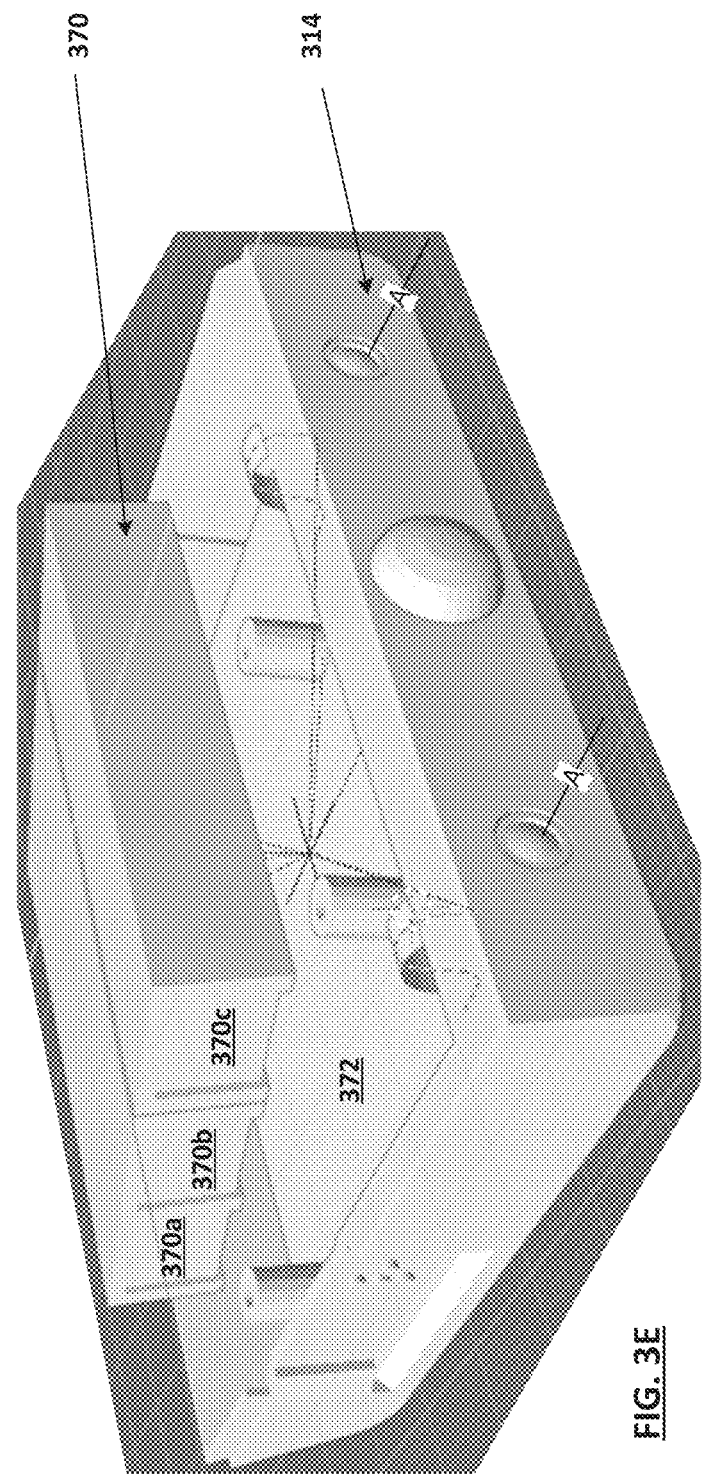
FIG. 3E shows the shelf-mountable imaging device of FIG. 3A with a top portion removed to enable viewing of interior components such as the power source.
Figure 3F:
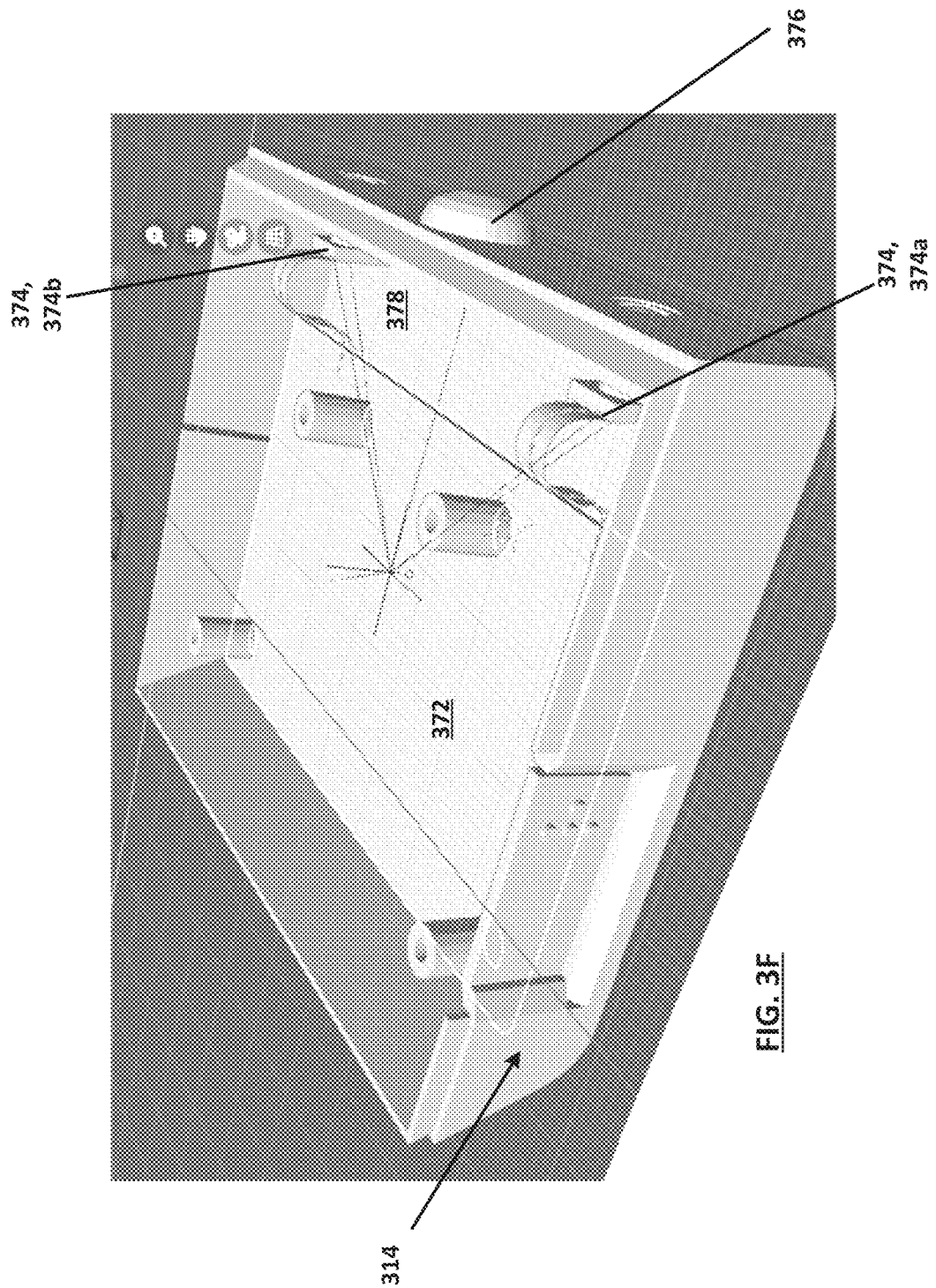
FIG. 3F is a perspective view of the imaging device of FIG. 3A with the top portion and power source removed.

Referring to FIGS. 3E-3F, the interior components of the shelf-mountable imaging device 300 can be appreciated with the mounting portion 312 removed from the viewing portion 314. As shown, the interior components of the shelf-mountable imaging device housing 310 generally include one or more imaging units (e.g., electronic imaging chip) 374 and a circuit board 372 with processor (e.g., a main processor circuit 410 of FIG. 4) to manage the imaging unit(s) 374. In the example shown, the housing 310 holds a first imaging unit 374a and a second imaging unit 374b. In other examples, the housing 310 may hold a greater or lesser number of imaging units 374. In certain implementations, a presence sensor 376 also may be disposed within the housing 310 and managed by the circuit board 372. In certain implementations, the shelf-mountable imaging device 300 is a self-contained unit that holds one or more power sources 370 to power the imaging units 374 and/or the presence sensor 376. Further details regarding the interior components are provided with reference to FIG. 4.

Imaging units 374a, 374b are positioned proximate respective first and second side openings 344a, 344b of the viewing portion 314. In certain embodiments an imaging sensor of each of the imaging units 374a, 374a is centrally aligned with its respective opening 344a, 344b while in other embodiments the imaging sensor of one or both of the imaging units 374a, 374b is positioned at an angle relative to a central axis A of the openings 344a, 344b. For example, one or both of the imaging sensors may be positioned at 15 degree angle relative to the central axis A to provide a desired field of vision (e.g., 170 degree field of vision); other positioning angles are also possible. The ability to angle the imaging sensors enables the shelf-mountable imaging device 300 to obtain images with a wider field of vision than would otherwise be provided with a centrally aligned imaging sensor. As such, in the context of obtaining an image of stock on an aisle-length shelf (e.g., a very wide shelf) through use of an angled image sensor, fewer shelf-mountable imaging devices 300 and fewer imaging units 374a, 347b are needed. In certain embodiments, only one imaging unit 374 is found within and/or used by the shelf-mountable imaging device 300. In certain embodiments, a number of imaging units 374 greater than two is found within and/or used by the shelf-mountable imaging device 300.

The presence sensor 376 is mounted to and supported by the circuit board 372. In certain implementations, the presence sensor 376 is aligned with an opening 342 defined through the viewing portion 314 of the housing 310. In certain examples, the opening 342 is centrally positioned along a front face of the viewing portion 314. In certain examples, the opening 342 is disposed intermediate the openings 344a, 344b for the imaging sensors. In certain examples, the presence sensor 376 is a motions sensor.

The one or more power sources 370 are supported in a position over the circuit board 372. In certain implementations, a battery serves as the power source 370. In the example shown in FIG. 3E, the power source 370 includes first, second, and third batteries 370a, 370b, 370c, respectively. In other examples, however, the power source 370 may include a greater or lesser number of batteries. In certain examples, a structure extending upward from the bottom face 352 may support the one or more batteries 370 and/or a structure, such as harness, extending from the upper face 326 of the mounting portion 312 may support the one or more batteries 370. In certain embodiments, the cavity defined by the mounting portion 312 of the shelf-mountable imaging device 300 is designed to accommodate the space required for containing the one or more batteries. In still other examples, the power source may include a receptacle for receiving a cabled power connection or an induction interface.

In certain implementations, the circuit board 372 is positioned proximate an interior surface 378 of the bottom face 352 accommodating any bolt sleeves 380, if used, positioned atop mounting holes 358.

Figure 4A:
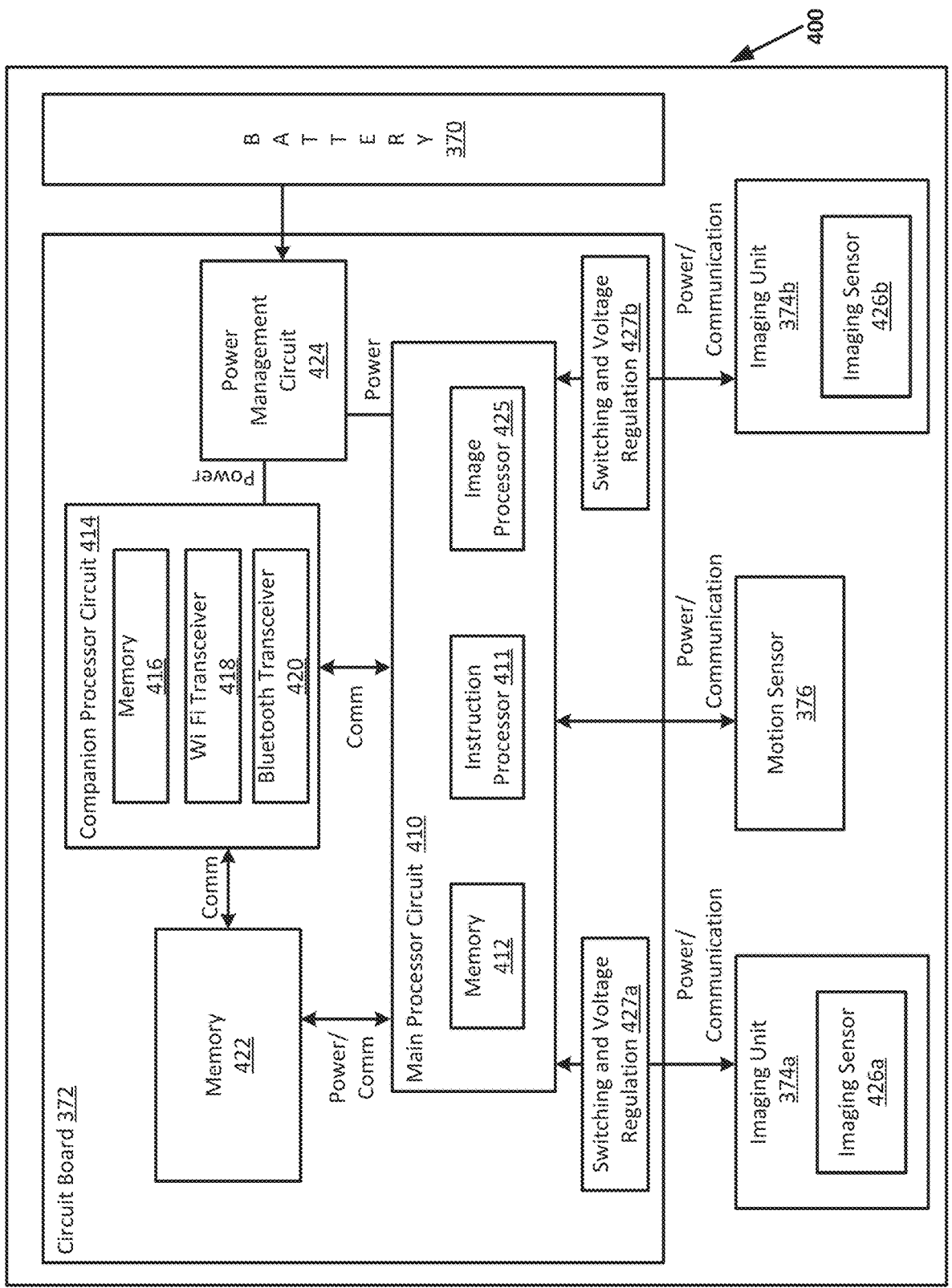
FIG. 4A illustrates a schematic of an example hardware system suitable for use with the shelf-mountable imaging device, the hardware system being configured to mount within a housing such as the housing of FIGS. 3A-3F.
Figure 4B:
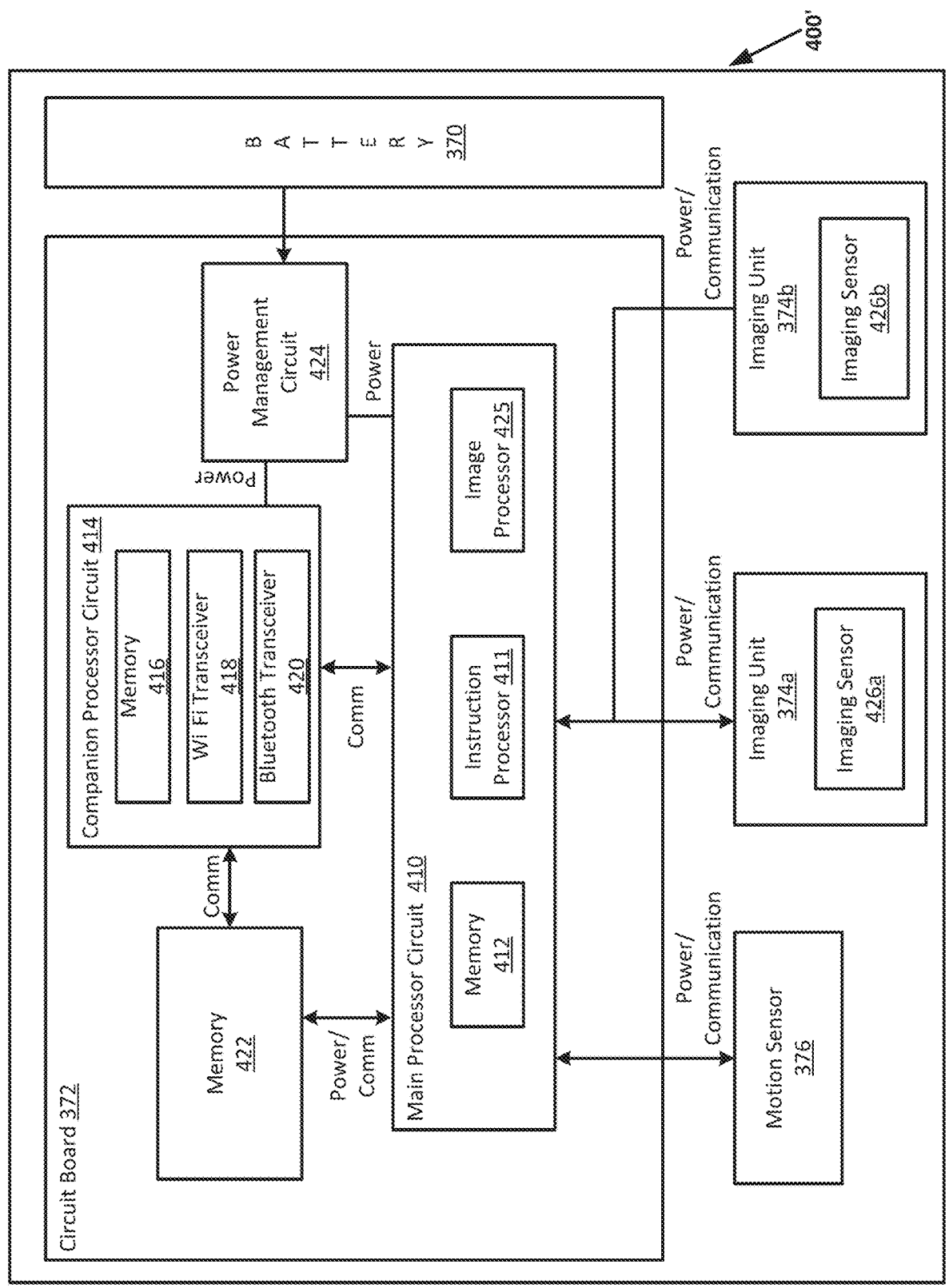
FIG. 4B illustrates another example schematic of an example hardware system suitable for use with the shelf-mountable imaging device, the hardware system being configured to mount within a housing such as the housing of FIGS. 3A-3F.

Referring to FIGS. 4A and 4B, schematics of example hardware systems 400, 400' of the shelf-mountable imaging device 300 is illustrated. The hardware system 400, 400' includes the circuit board 372 and the first and second imaging units 374a, 374b mentioned previously. In certain implementations, the hardware system 400, 400' also includes the presence sensor 376. In certain implementations, the hardware system 400, 400' also includes a power source 370 (e.g., a battery). In certain examples, the power source 370 includes multiple batteries (e.g., depicted in FIG. 3E as batteries 370a-c).

The one or more batteries forming power source 370 comprise one or more replaceable and/or rechargeable batteries. In certain embodiments, the one or more batteries comprise Li-Ion (lithium-ion) batteries. In certain embodiments, the one or more Li-Ion batteries comprise one or more 3.7V, 3500 mAH rated batteries. In certain embodiments, the one or more batteries include AA batteries. In certain embodiments, the one or more batteries include one or more 1.5 v rated batteries. Other types of batteries with different voltages and/or current ratings can also be used as appropriate to the power requirements of the hardware system 400, 400'.

The circuit board 372 incorporates a main processor circuit 410 configured to manage operation of the imaging units 374a, 374b and the presence sensor 376. The first and second imaging units 374a, 374b each include an imaging sensor 426a, 426b for capturing images. In certain examples, each of the first and second imaging units 374a, 374b includes a display control application processor with embedded memory. The use of other types of imaging units also is possible. In some implementations, the imaging units 374a, 374b are connected to the main processor circuit 410 using a switching and voltage regulation circuit 427a, 427b, respectively. Accordingly, the main processor circuit 410 controls the switching and voltage regulation circuits 427a, 427b to manage which imaging unit 374a, 374b is sending a captured image. In other implementations, the imaging units 374a, 374b connect to the main processor circuit 410 via a common data channel. In such implementations, the imaging units 374a, 374b send images to the main processor circuit 410 at separate times using the common data channel. Using the common data channel allows the hardware system 400' to be implemented with fewer electronic chips and fewer pins out of the main processor as compared to the hardware system 400, thereby reducing component costs. Using fewer electronic chips may lead to less power consumption.

In certain implementations, the main processor circuit 410 includes an embedded memory 412 (e.g., a non-volatile memory, a volatile memory such as RAM, etc.), an instruction processor 411, and an image processor 425. The image processor 425 communicates with the imaging units 374a, 374b to request that one or more images be captured as will be described in more detail herein. The instruction processor 411 is configured to execute instructions stored in memory 412 and/or in memory 422. In certain examples, the instruction processor 411 executes instructions stored in memory 422 when first booting up. In certain examples, the instruction processor 411 uses the memory 422 as working memory. In certain examples, the instruction processor 411 manages the presence sensor 376. In certain examples, the instruction processor 411 manages or coordinates with the image processor 425.

In some implementations, the circuit board 372 also incorporates a companion processor circuit 414 that manages communication with external computing devices/servers (e.g., local processor 120 or server 121 of FIG. 1). The certain implementations, the companion processor circuit 414 includes an embedded memory 416 (e.g., a non-transitory, non-volatile memory, a volatile memory such as RAM, a mix of volatile and non-volatile memory), and a wireless transceiver (e.g., a WiFi transceiver 418, a Bluetooth transceiver 420, a LoRa transceiver) or other communications interface communicating with an external computing device/server. In other implementations, the main processor circuit 410 may manage such communication. In certain implementations, the instruction processor 411 of the main processor circuit 410 communicates with the companion processor circuit 414.

The circuit board 372 also includes a non-volatile memory 422 (e.g., a non-transitory memory, a flash memory, etc.). In certain embodiments, memory 422 comprises a non-transitory, non-volatile flash memory. In certain embodiments, the circuit board 372 also includes a volatile memory. In certain examples, the main processor circuit 410 supplies power to the memory 422. The use of additional and/or alternative processor circuits and memories are also possible.

In certain implementations, data (e.g., captured image data) is communicated from the imaging units 374 to the companion processor circuit 414 via the main processor circuit 410. In certain examples, the data from the imaging units 374 is not stored in memory 412 of the main processor circuit 410. Rather, the data may pass through a channel of the main processor circuit 410 directly to the companion circuit 414 for immediate transmission to an external computing device/server.

In some implementations, the circuit board 372 also incorporates a power management circuit 424 to manage supplying power obtained from the power source 370 to the main processor circuit 410. In certain examples, the power management circuit 424 also supplies power to the companion circuit 414. The main and/or companion processor circuits 410, 414 may distribute power to the other components as needed (e.g., in accordance with a predetermined power cycle as will be described in more detail herein.) In other implementations, the main processor circuit 410 may manage the power.

The main processor circuit 410 supplies power to the imaging units 374a, 374b via respective switching and voltage regulation circuits 373a, 373b. In some implementations, the main processor circuit 410 supplies power to the imaging units 374a, 374b simultaneously. In other implementations, the main processor circuit 410 supplies power to the imaging units 374a, 374b sequentially. In certain examples, the switching and voltage regulation circuits 373a, 373b control when power is supplied to the imaging units 374a, 374b.

The use of more than one processor circuit 410, 414 enables the power management circuit 424 to minimize power consumption of the hardware system 400, 400' by turning ON/OFF components as needed to execute various functions. Further details of power management are described elsewhere herein. Additional electrical and/or electronic components can be incorporated into the circuit board 372 as needed to achieve a desired functionality.

In certain embodiments, the main processor circuit 410 is a mixed signal controller utilizing a CPU (central processing unit) that is designed for low cost and low power consumption; the main processor circuit 410 is capable of executing instructions stored in memory 412 and/or memory 422. In certain embodiments the companion processor circuit 414 comprises a low cost, low power consumption microcontroller with integrated WiFi and Bluetooth capabilities. The companion processor circuit 414 is capable of executing instructions stored in memory (e.g., a non-volatile portion of the memory) 416. For example, the memory 416 may store communication instructions to enable a wireless communication interface, to transmit data to the remote server, to check for available updates to the operational instructions at the remote server, and/or to enter a low power state after checking for updates.

In certain implementations, the non-volatile memory 422 (e.g., Flash memory) is shared by both the main processor circuit 410 and the companion processor circuit 414. For example, the main processor circuit 410 and the companion processor circuit 414 may exchange one or more handshake signals and/or save data flags in the memory 422 to coordinate access to the memory 422 without interfering with each other or otherwise causing a malfunction. In certain examples, the main processor circuit 410 may have write access to all or at least a portion of the memory 422 unless access is requested by the companion circuit 414. In certain examples, the companion circuit 414 may be granted sole write access to the memory 422 (or to a portion of the memory) during an update process as will be discussed in more detail herein.

In certain embodiments, the presence sensor 376 is a motion sensor. In an example, the presence sensor 376 is a PIR (passive infrared) motion sensor that detects heat energy thereby requiring no energy for detecting purposes. The use of other types of presence sensors is also possible.

FIGS. 11-31 illustrate the second example imaging device 700 suitable for use in the retail imaging system 100. The imaging device 700 includes a mountable portion 712 and a viewing portion 714 connected by a neck portion 716. In certain implementations, the mountable portion 712 defines a flat top surface 718 at the top 703 of the imaging device 700 and an angled surface 720 extending forwardly from the top surface 718 towards the neck portion 716. The top surface 718 is configured to contact or be directly adjacent to an underside of the shelf 204 while the angled surface 720 is configured to contact or be directly adjacent the flange 208.

In certain implementations, one or more mounting tabs 722 extend outwardly from the mountable portion 712 of the imaging device at the top 703 of the imaging device 700. The certain examples, mounting tabs 722 extends outwardly from the opposite sides 706, 708 of the mountable portion 712. In certain examples, the mounting tab 722 extending outwardly from the first side 706 has a different size and/or shape than the mounting tab 722 extending outwardly from the second side 708. Fastener openings defined in the mounting tabs 722 enable fasteners to extend through the mounting tabs 722 and through apertures 394 defined in the shelf 204. In certain implementations, the fasteners may extend into a mounting plate 724 disposed at a top side of the shelf 204 opposite the mountable portion 712 (e.g., see FIG. 14).

Figure 17:
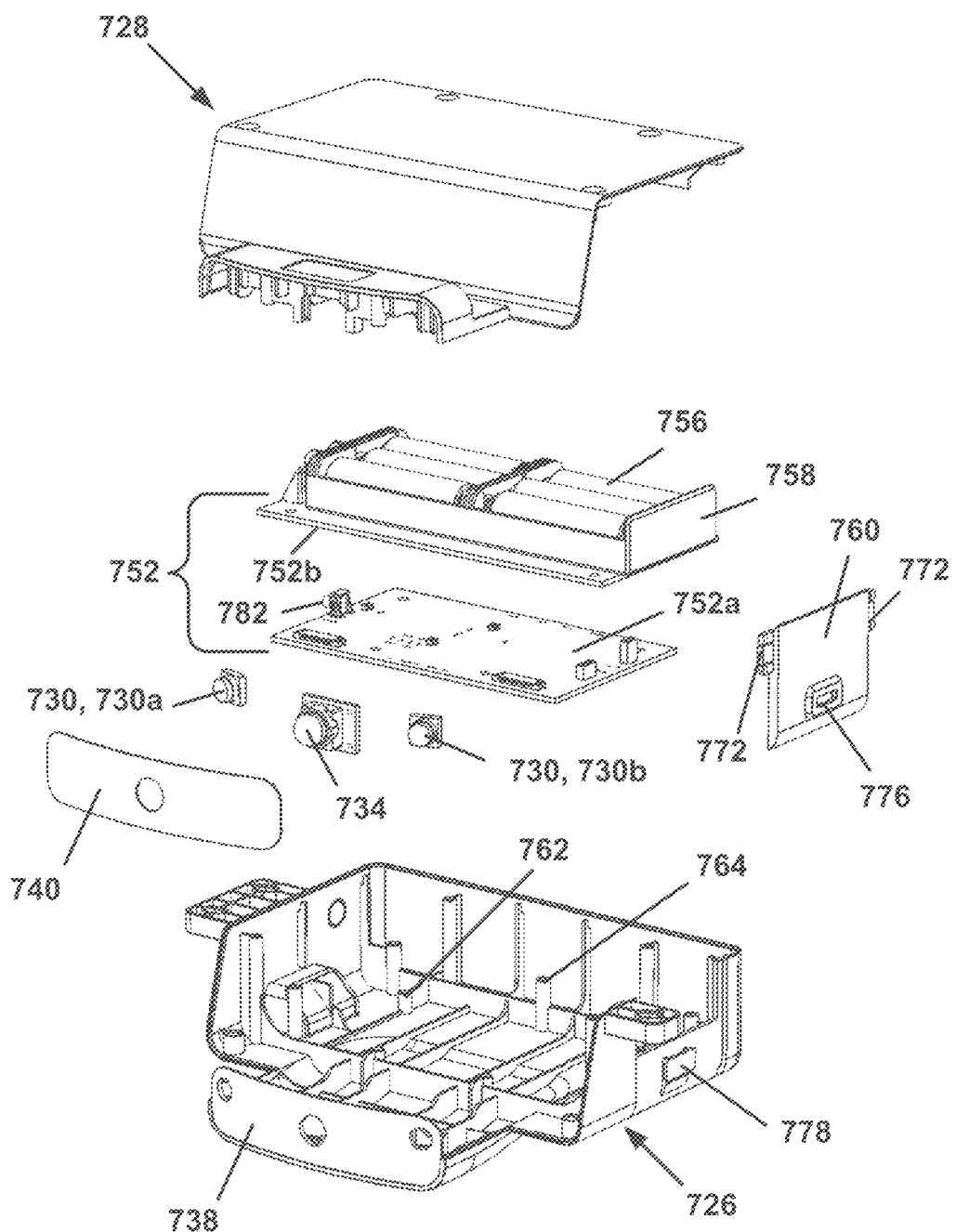
FIG. 17 is an exploded view of the imaging device of FIG. 11 showing a top and bottom housing exploded away from interior components.
Figure 18:
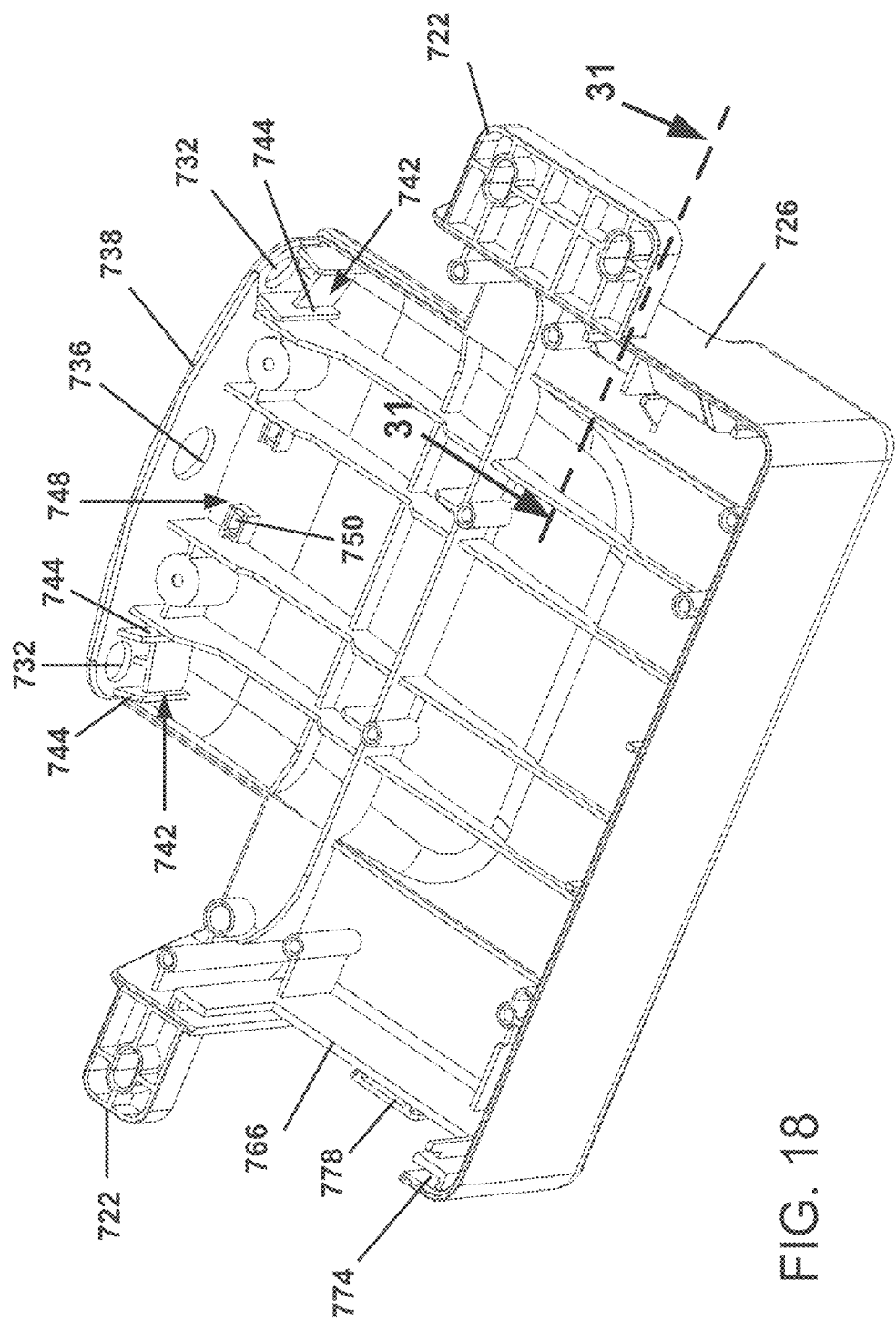
FIG. 18 is a top perspective view of an example implementation of the bottom housing of FIG. 17.
Figure 19:
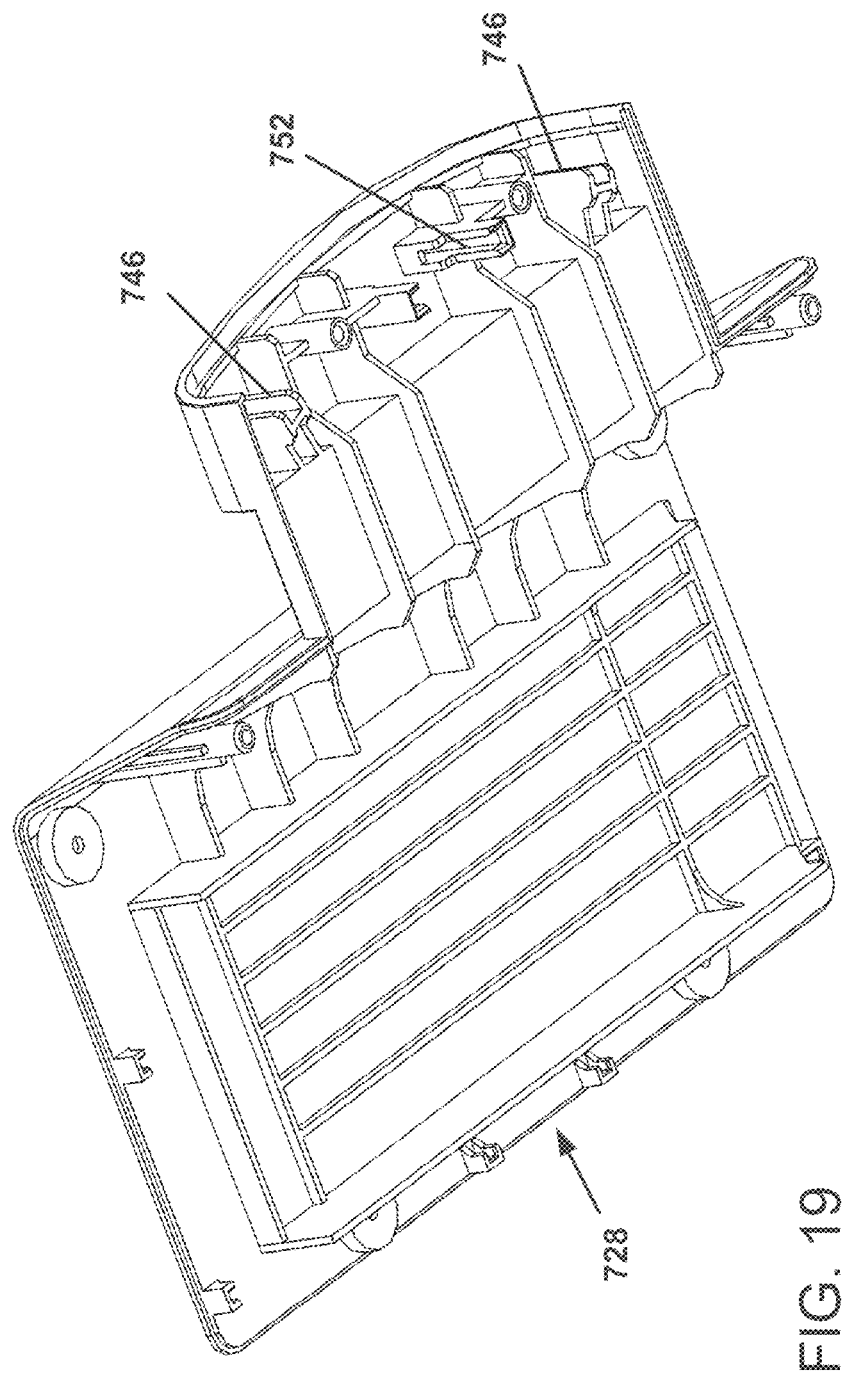
FIG. 19 is a bottom perspective view of an example implementation of the top housing of FIG. 17.
Figure 20:
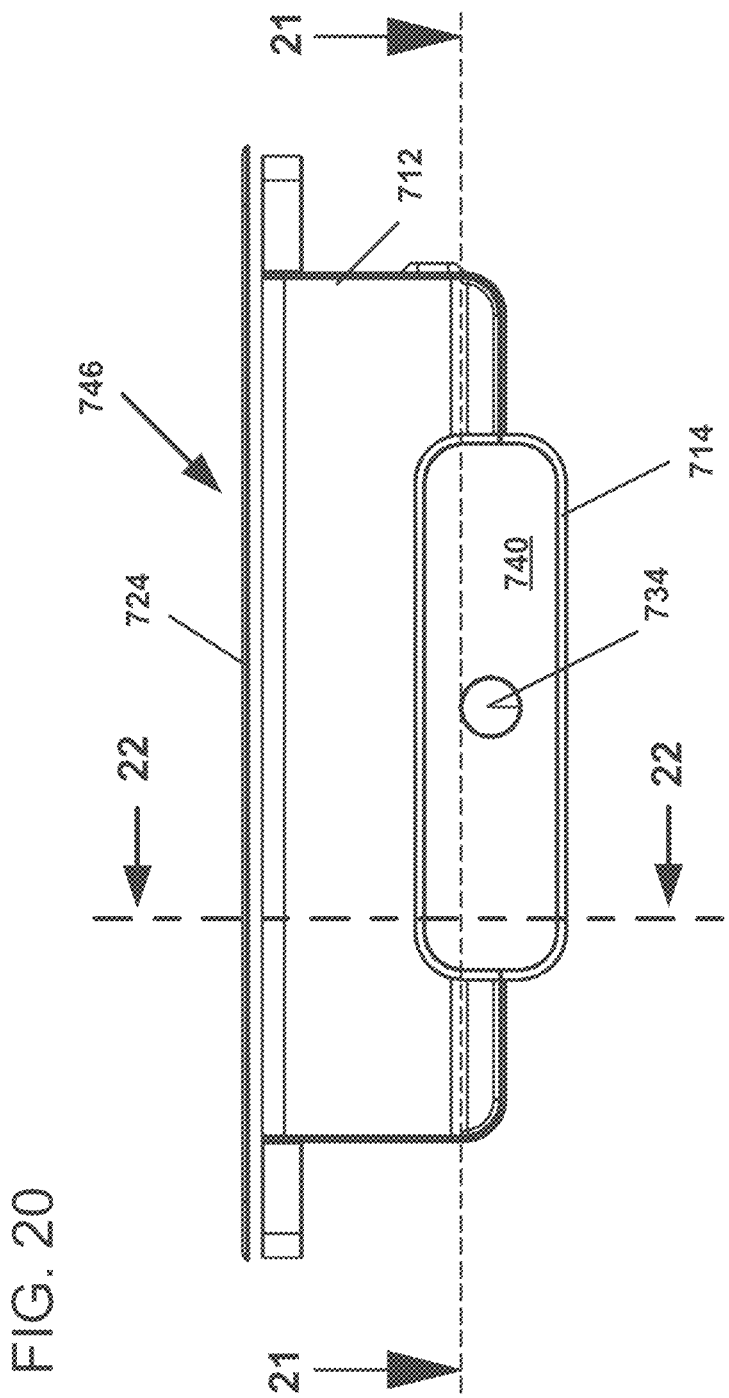
FIG. 20 is a front elevational view of the imaging device of FIG. 11.
Figure 21:
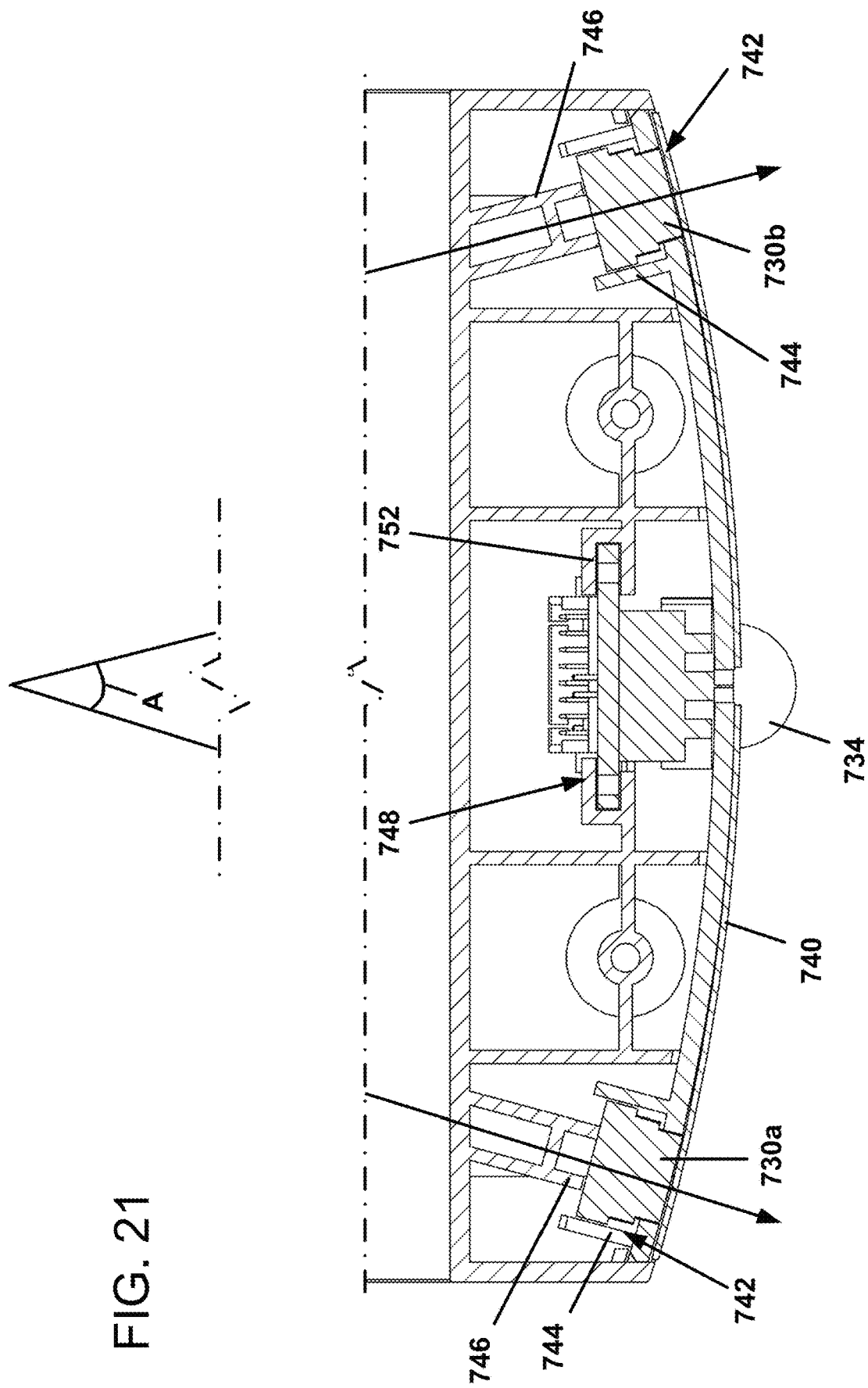
FIG. 21 is a cross-sectional view taken along the 21-21 line of FIG. 20 in which an angle between the two image sensors is shown with a section of the angle removed for ease in viewing.
Figure 22:
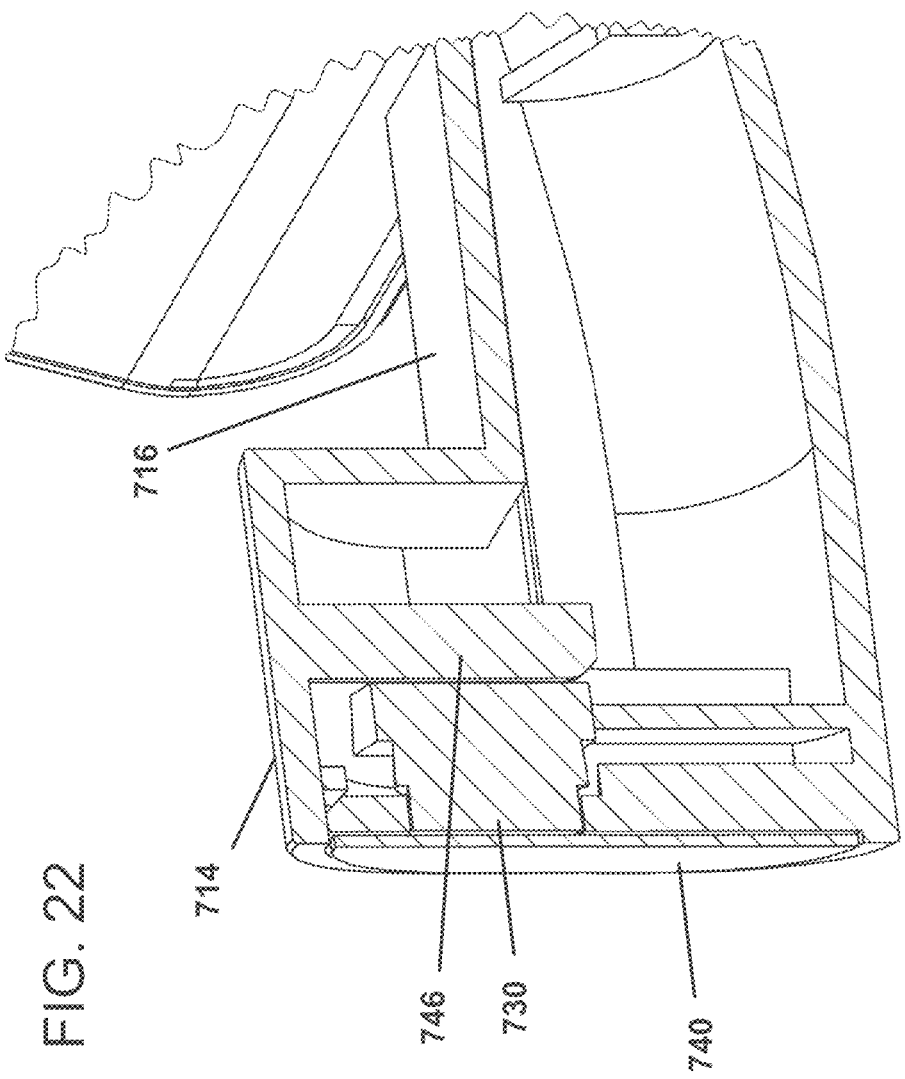
FIG. 22 is a cross-sectional view taken along the 22-22 line of FIG. 20.

FIG. 17 shows the components of the imaging device 700 exploded outwardly from each other. In certain implementations, the housing 710 includes a bottom housing 726 that defines the bottom 705 of the imaging device 700 and a top housing 728 that defines the top 703 of the imaging device 700. In certain examples, each of the bottom and top housings 726, 728 defines part of the mounting portion 712, part of the neck 716, and part of the viewing portion 714. The bottom and top housings 726, 728 cooperate to define an interior of the housing 710. In some examples, the bottom and top housings 726, 728 can be removably coupled together (e.g., using latches or fasteners such as screws). In other examples, the bottom and top housings 726, 728 are fixedly held together (e.g., via welding or adhesive).

In certain implementations, one or more imaging sensors 730 are sandwiched between the bottom and top housings 726, 728 at the viewing portion 714. In the example shown, the viewing portion 714 holds a first imaging sensor 730a and a second imaging sensor 730b. In certain implementations, the imaging sensors 730a, 730b face through apertures 732 defined in a front face 738 of the viewing portion 714. In certain examples, the view face 738 is contoured so that the apertures 732 face in non-parallel directions. In certain examples, the apertures 732 are angled relative to each other by an angle A (FIG. 21) ranging between 20 degrees and 80 degrees so that the first and second imaging sensors 730a, 730b face partially away from each other. In certain examples, the first and second directions are angled relative to each other by an angle A ranging between 40 degrees and 60 degrees. In certain examples, a film or other cover 740 extends over the front face 738 and extends over the apertures 732. The film or other cover 740 is transparent to the image sensors 730a, 730b so as to not interfere with image collection, but blocks the image sensors 730a, 730b from view by an observer.

In certain implementations, a presence sensor 734 is sandwiched between the bottom and top housings 726, 728 at the viewing portion 714. In the example shown, the presence sensor 734 is disposed between the first and second imaging sensors 730a, 730b. In certain examples, the motion sensor 734 protrudes beyond the front face 738 of the viewing portion 714 of the housing 710. Accordingly, the presence sensor 734 may protrude past the film or other cover 740 at the front of the viewing portion 714. A cap (e.g., a dome-shaped cap) may extend forwardly of the film or other cover 740 to cover the presence sensor 734.

As shown in FIGS. 18-22, the housing 710 defines a first mounting station 742 for each image sensor 730a, 730b. In certain implementations, the bottom and top housings 726, 728 cooperate to define each first mounting station 742. In certain examples, each first mounting station 742 includes two spaced apart walls 744 between which a mounting structure of the image sensor 730a, 730b is disposed. For example, a circuit board of the image sensor 730a, 730b may slide between the walls 744. In certain examples, the image sensor 730a, 730b is slidable between the walls 744 to mount the image sensor 730a, 730b at the respective mounting station 742. In certain examples, the walls 744 are defined by the bottom housing 726. In certain implementations, a bracing structure 746 is disposed behind the image sensor 730a, 730b when the image sensor 730a, 730b is disposed between the walls 744. The bracing structure 746 retains the image sensor 730a, 730b at the first mounting station 742 even if the imaging device housing 710 is moved. For example, the bracing structure 746 may contract the circuit board or other base of the image sensor 730a, 730b. In certain examples, the bracing structure 746 is carried by the top housing 728 so that the bracing structure 746 slides down behind the image sensor 730a, 730b when the image device housing 710 is assembled.

In certain implementations, the housing 710 also defines a second mounting station 748 for the presence sensor 734. In certain implementations, the bottom and top housings 726, 728 cooperate to define the second mounting station 748. In certain examples, each second mounting station 748 includes a guide arrangement 750 defining a groove in which a portion of the presence sensor 734 can be disposed. For example, a circuit board or other base of the presence sensor 734 may extend into the groove of the guide arrangement 750. In certain examples, the guide arrangement 750 is defined by the bottom housing 726. In the example shown, the top housing 728 includes walls defining a channel 752 along which a portion of the presence sensor 734 slides when the bottom and top housings 726, 728 are being assembled.

In certain implementations, a circuit board arrangement 752 is disposed within the mounting portion 712 of the housing 710. In certain examples, the image sensor(s) 730, 730a, 730b are connected to the circuit board arrangement 752 via a flexible cable 754 (e.g., see FIG. 24). In certain examples, the presence sensor 734 is connected to the circuit board 752 via the same or another flexible cable 754. In certain examples, the circuit board arrangement 752 includes first and second circuit boards 752a, 752b disposed parallel to each other (see FIG. 24). In certain examples, the first circuit board 752a mounts to a first set of posts or other support members 762 and the second circuit board 752b mounts to a second set of posts or other support members 764. The first circuit board 752a is electrically connected to the image sensor(s) 730, 730a, 730b and the presence sensor 734. The second circuit board 752b is electrically connected to the power source (e.g., a battery).

In certain implementations, the power source includes one or more batteries 756 mounted to a carriage 758 that is removable relative to the housing 710. In certain examples, the carriage 758 is slidable relative to the housing 710. In certain examples, the carriage 758 slides over a major surface of the second circuit board 752b when the power source is mounted within the housing 710. In certain examples, the carriage 758 rests on the second circuit board 752b when the power source is disposed within the housing 710.

Figure 24:
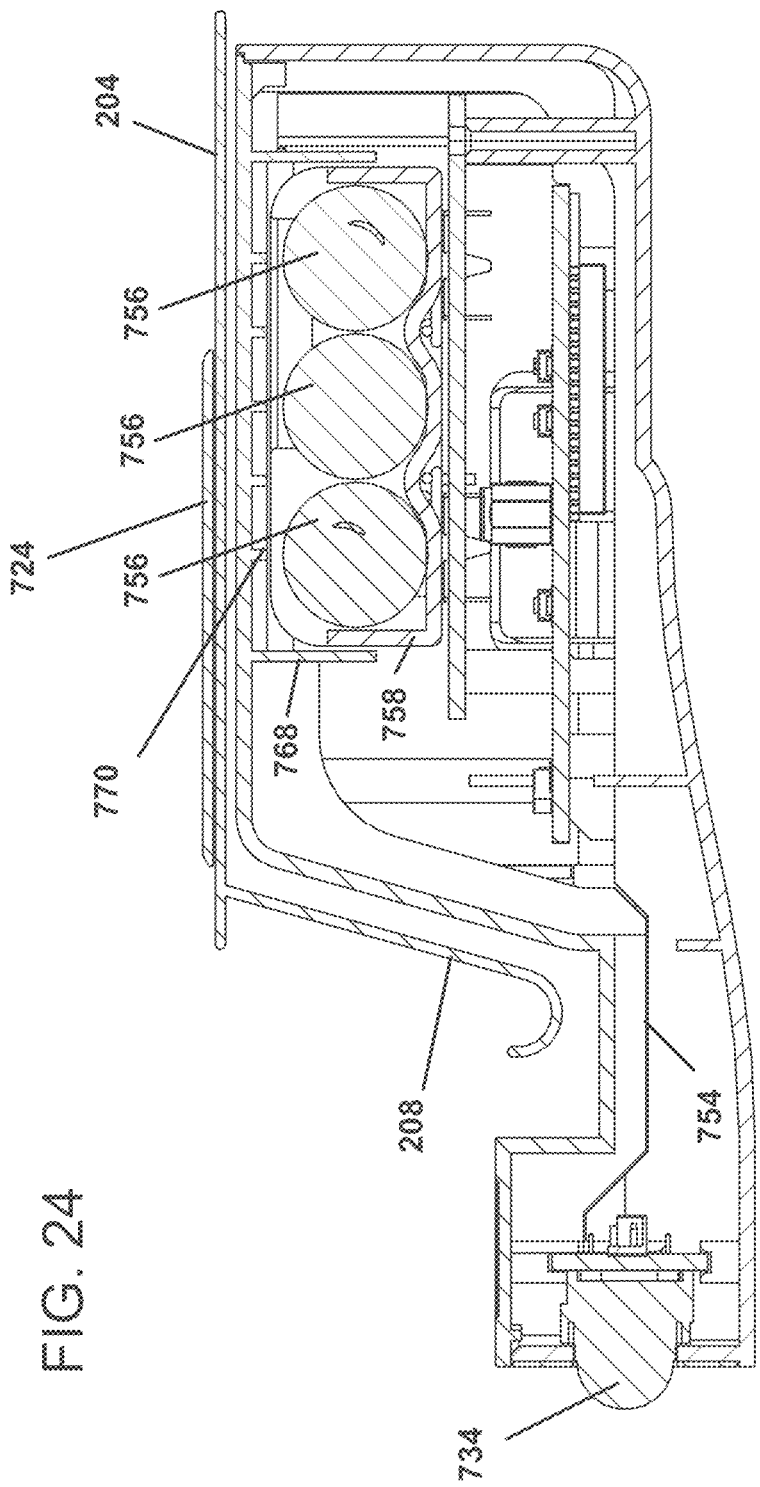
FIG. 24 is a cross-sectional view taken along the 24-24 line of FIG. 14.
Figure 25:
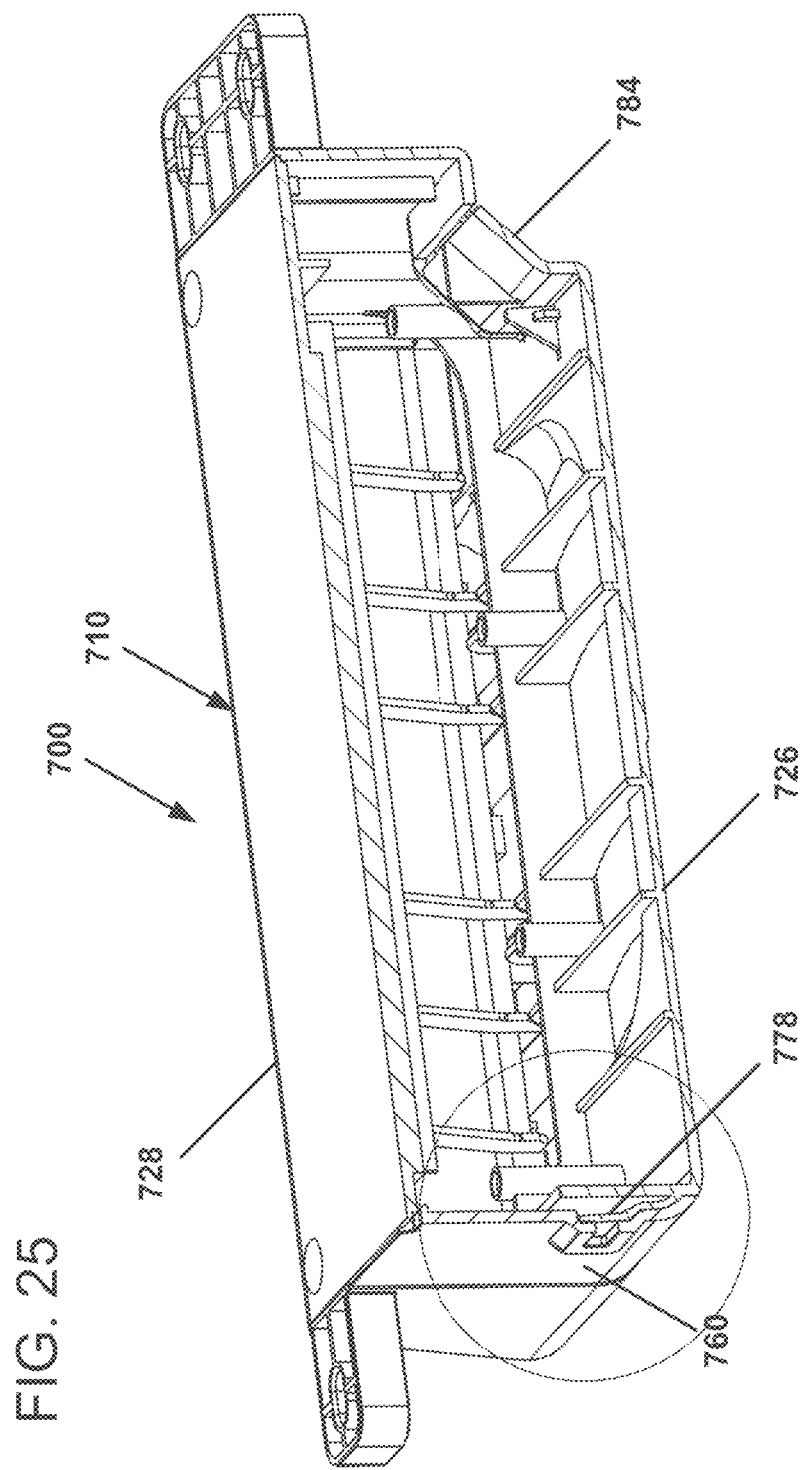
FIG. 25 is a perspective view of a cross-section taken of the imaging device to better show the door lock.
Figure 26:
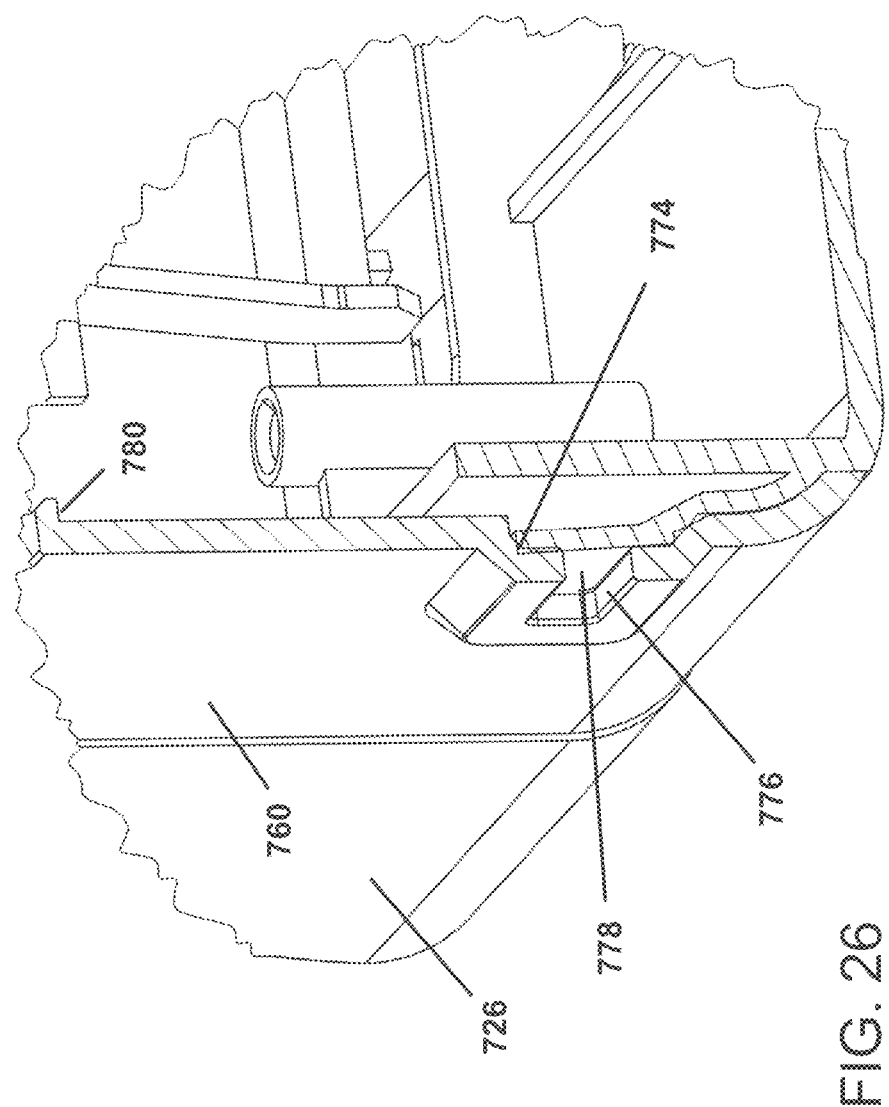
FIG. 26 is an enlarged view of a portion of FIG. 25.
Figure 27:
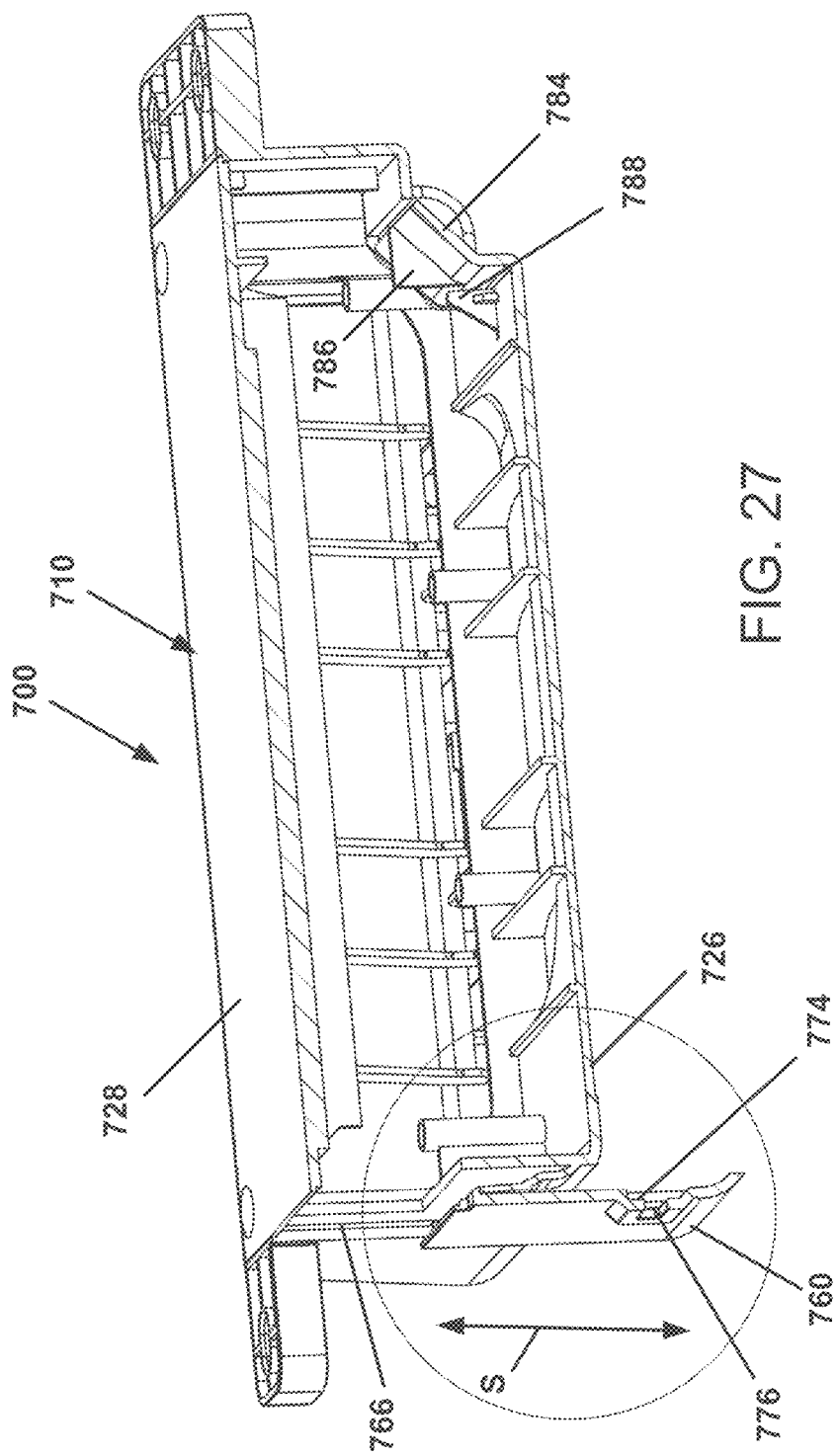
FIG. 27 shows the door of FIG. 25 moved to the open position.
Figure 28:
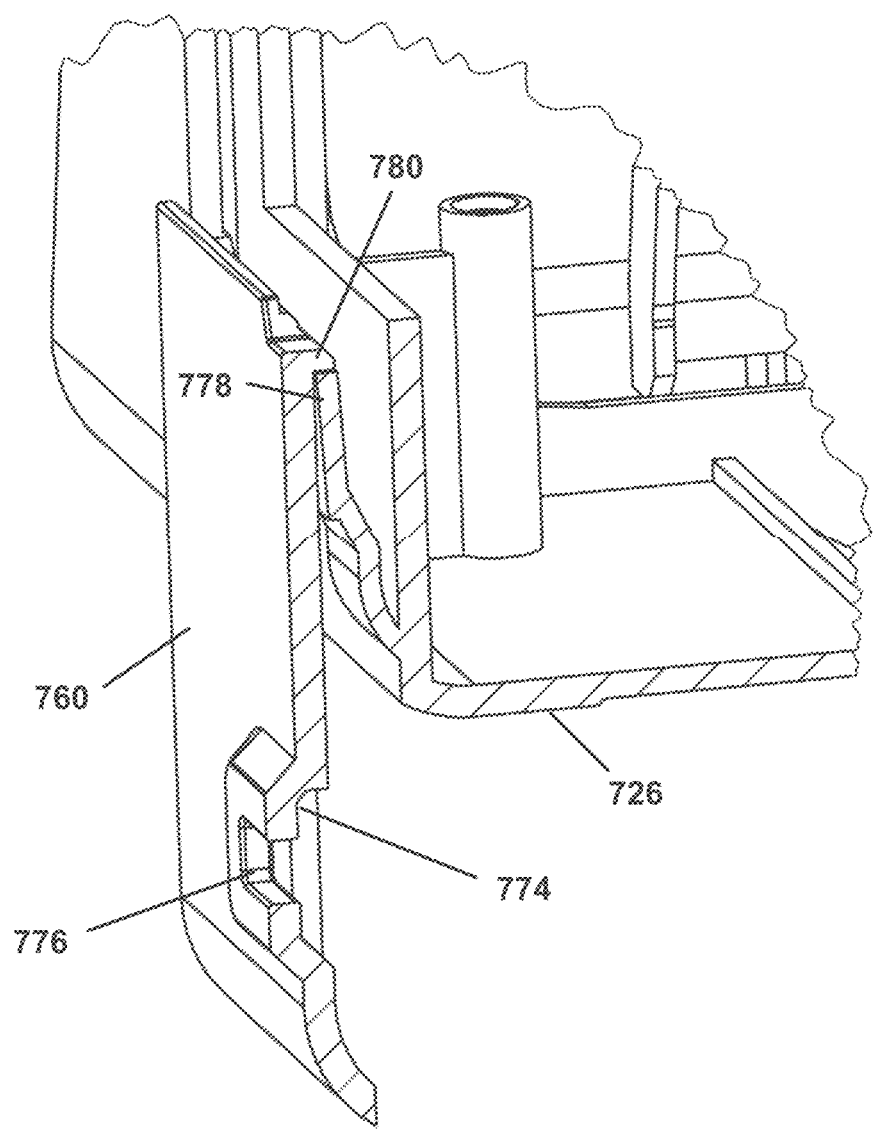
FIG. 28 is an enlarged view of a portion of FIG. 27.
Figure 29:
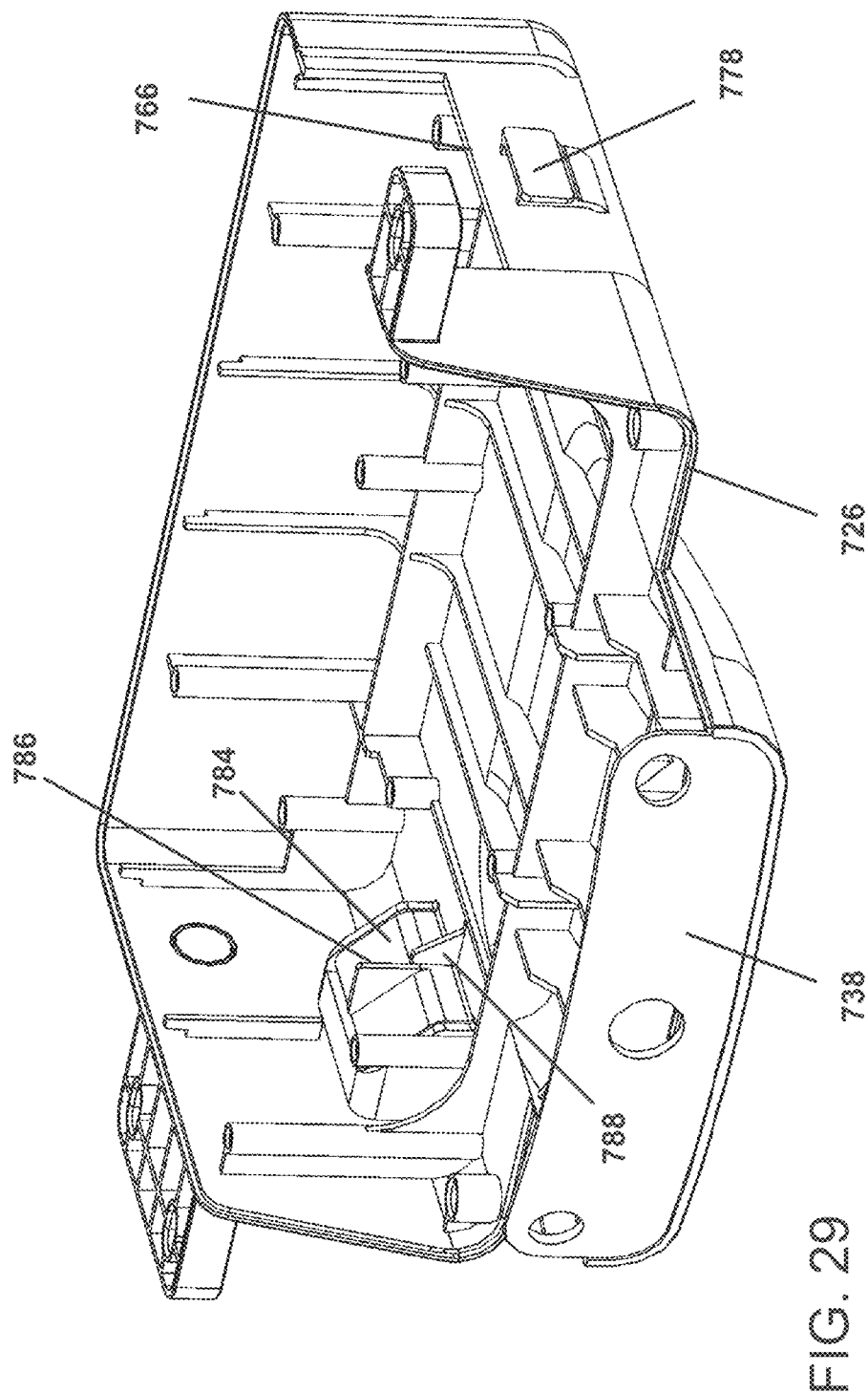
FIG. 29 is a perspective view of the bottom housing of the imaging device of FIG. 11.
Figure 30:
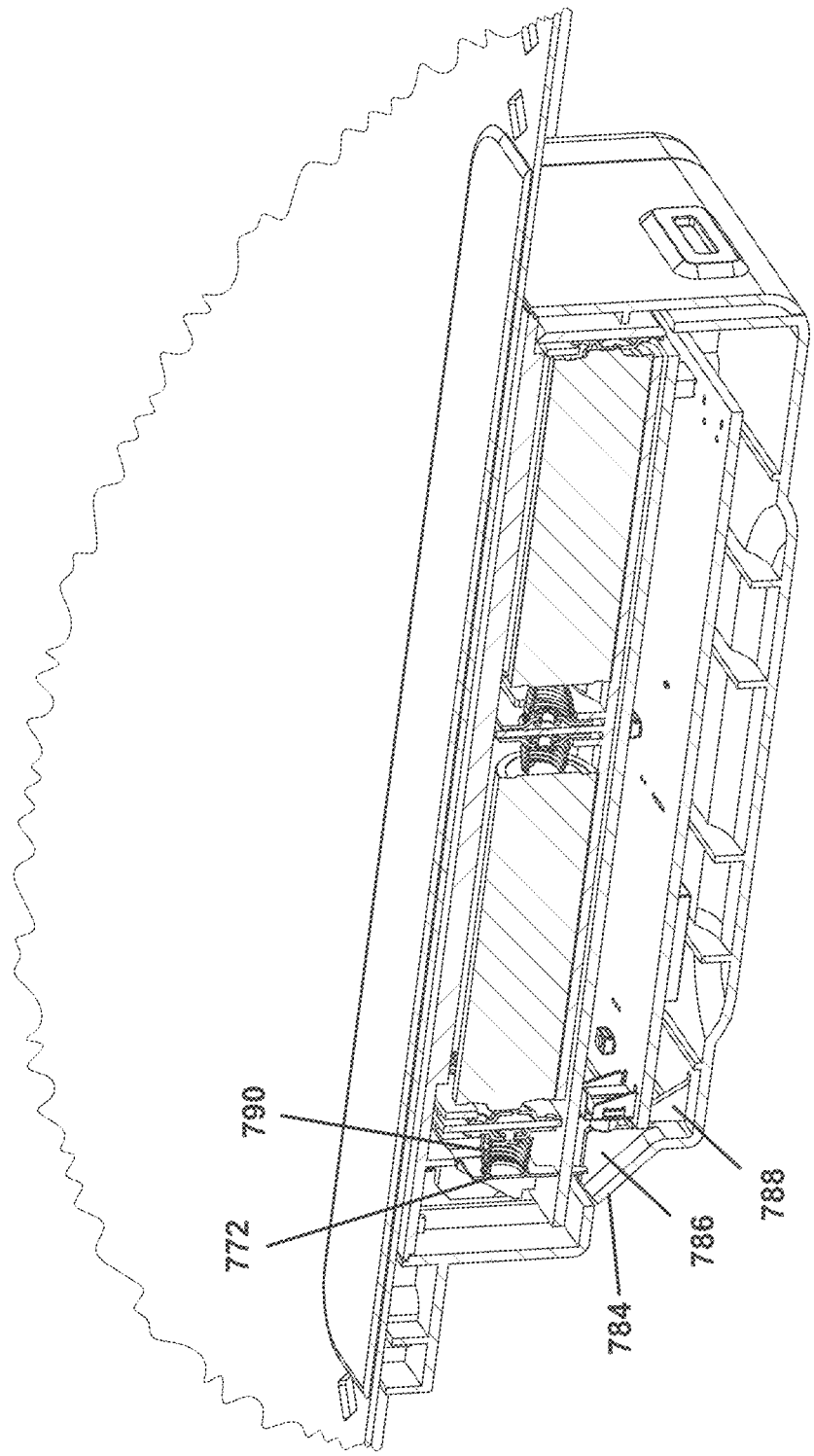
FIG. 30 is a cross-sectional view of the imaging device of FIG. 11 taken along the 30-30 line of FIG. 14.
Figure 31:
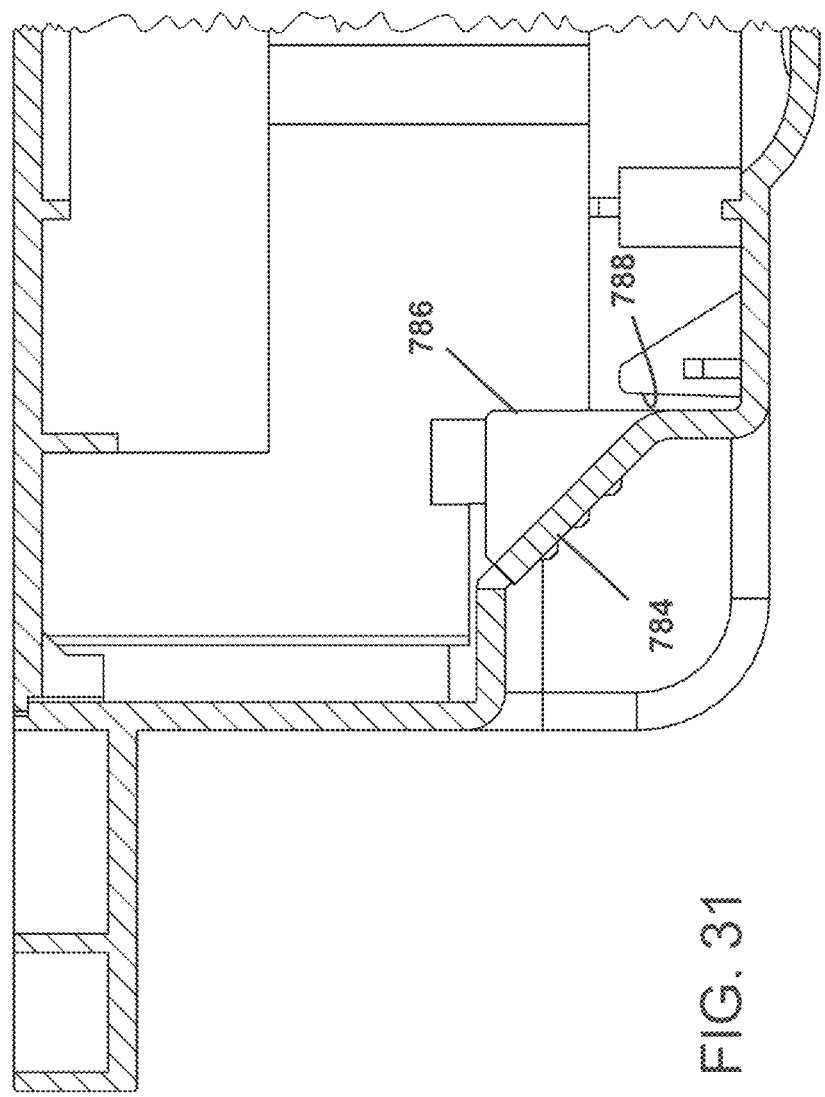
FIG. 31 is a cross-sectional view of the imaging device of FIG. 11 taken along the 31-31 line of FIG. 18.

In certain implementations, the housing 710 defines an access opening 766 in one of the sides 706, 708. The access opening 766 is aligned above the second circuit board 752b so that the carriage 758 can slide through the access opening 766 and over the second circuit board 752b. As shown in FIG. 24, the top housing 728 includes guide walls 768 extending downwardly and spaced from each other sufficient to enable the carriage 758 to slide therebetween. In certain examples, the top housing 728 also defines ribs 770 that extend downwardly to help retain the batteries 756 in the carriage 758 and the carriage 758 against the second circuit board 752b. In certain examples, the guide walls 768 extend downwardly farther than the ribs 770.

Figure 23:
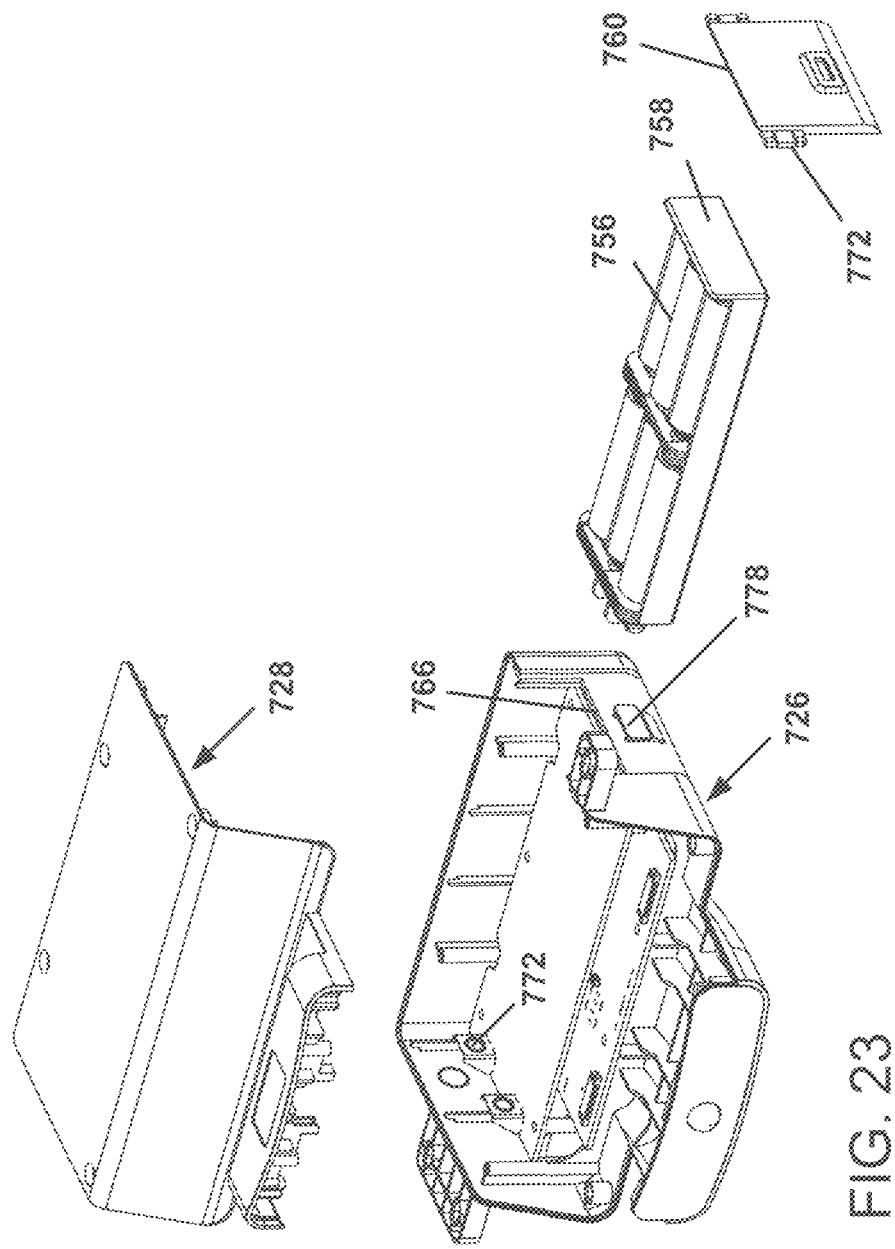
FIG. 23 shows the top housing, door, and battery carriage exploded from the bottom housing of the imaging device of FIG. 11.

As shown in FIG. 23, one or more power connections 722 extend upwardly from the second circuit board 752b to engage a power connection end of the carriage 758. In certain examples, one or more springs 790 carried on the carriage 758 engage the power connections 722 when the carriage 758 is mounted within the housing 710 to transfer power from the batteries 756 to the circuit board arrangement 752. In certain examples, the springs 790 bias the carriage outwardly from the power connections 722. Accordingly, the springs 790 bias the carriage outwardly through the access opening 766. A door 760 can be mounted at the access opening 766 to hold the carriage 758 within the housing 710.

In certain implementations, the door 760 is movable relative to the housing 710 between a closed position and an open position. When in the closed position, the door 760 blocks access to the interior of the housing 710 through the access opening 766. The door 760 also retains the carriage 758 within the housing 710 when in the closed position. When in the open position, the door 760 enables access to the interior of the housing through the access opening 766 and allows the carriage 758 to pass through the access opening 766 (e.g., under the bias of the springs 790). In certain implementations, the door 760 slides relative to the housing 710 along a slide axis S. For example, the door 760 may include outwardly extending side tabs 772 that ride along channels 774 extending along sides of the access opening 766. Interaction between the tabs 772 and the channels 774 allows the sliding movement of the door 760 relative to the housing 710 while inhibiting removal of the door 760.

In certain implementations, the door 760 is configured to releasably lock in the closed position. For example, the door 760 may define a pocket or depression 774. The door 760 also may define an opening 776 passing through the door 760 to the pocket or depression 774. The bottom housing 726 defines a deflectable latch finger 778 beneath the access opening 766. When the door 760 is disposed in the closed position, the latch finger 778 extends into the pocket or depression 774 to retain the door 760 in the closed position. To move the door to the open position, a tool can be inserted through the opening 778 to press against the latch finger 778 to deflect the latch finger 778 out of the pocket or depression 774. Deflecting the latch finger 778 out of the pocket or depression 774 allows the door 760 to slide downwardly to uncover the access opening 766. In certain examples, the door 760 includes a ledge or lip 780 that rests on the latch finger 778 to hold the door 760 in the open position. Interaction between the ledge or lip 780 and the latch finger 778 and interaction between the door tabs 772 and the channels 774 inhibit the door 760 from being removed from the housing 710. In certain examples, the door 760 is not locked in the open position and can be freely slid back to the closed position.

Figure 12:
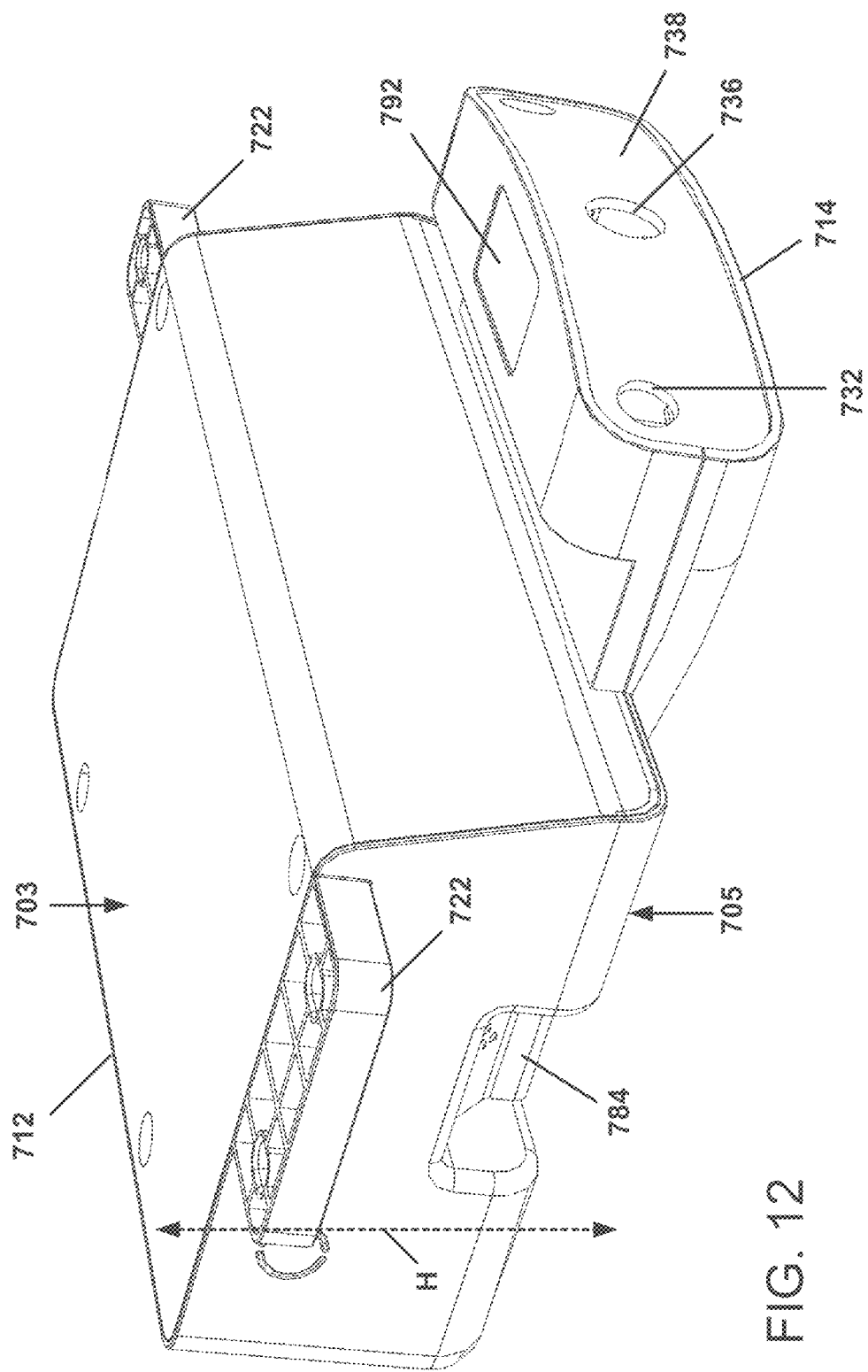
FIG. 12 is another top perspective view of the imaging device of FIG. 11.
Figure 13:
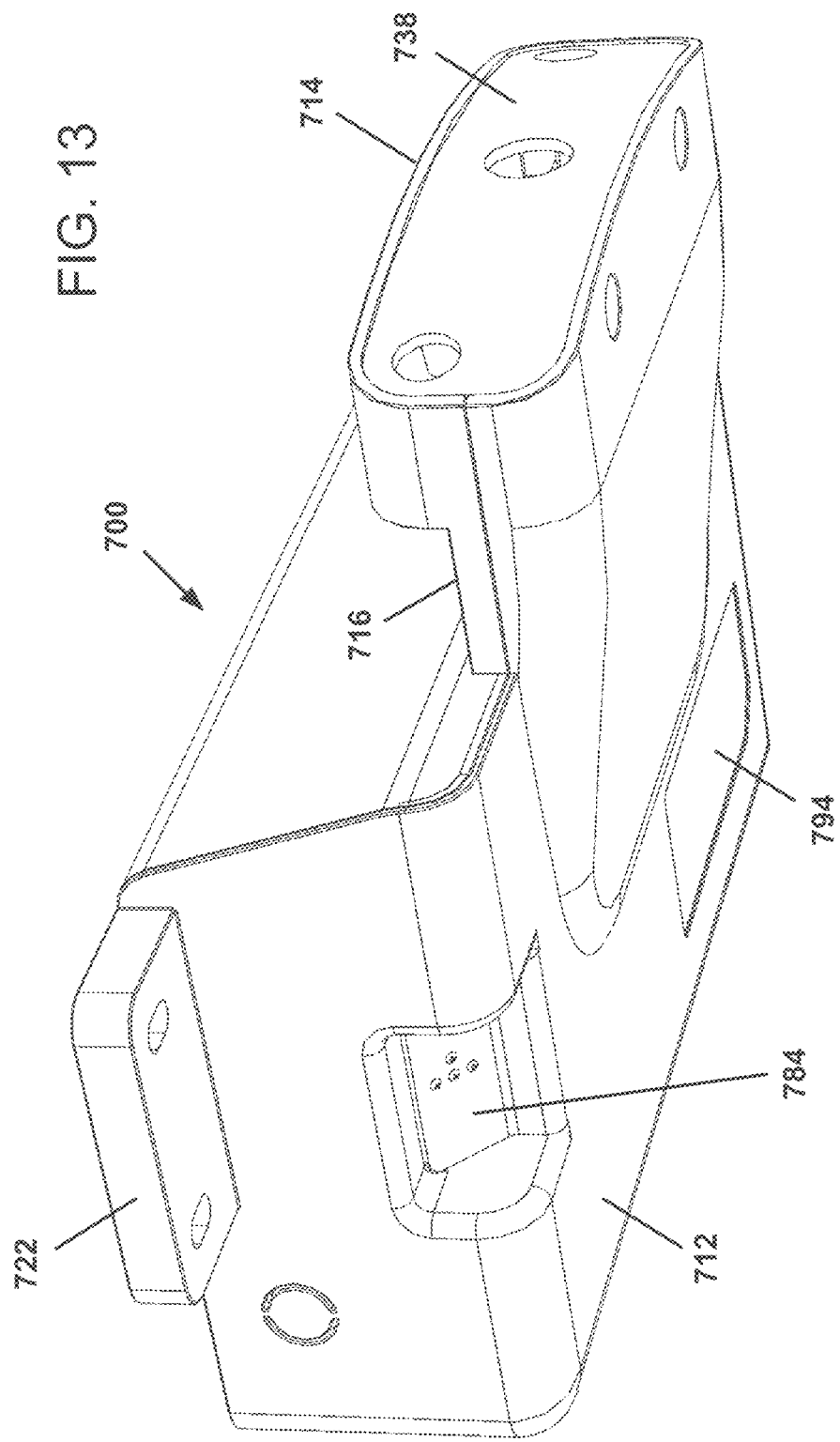
FIG. 13 is a bottom perspective view of the imaging device of FIG. 11.
Figure 14:
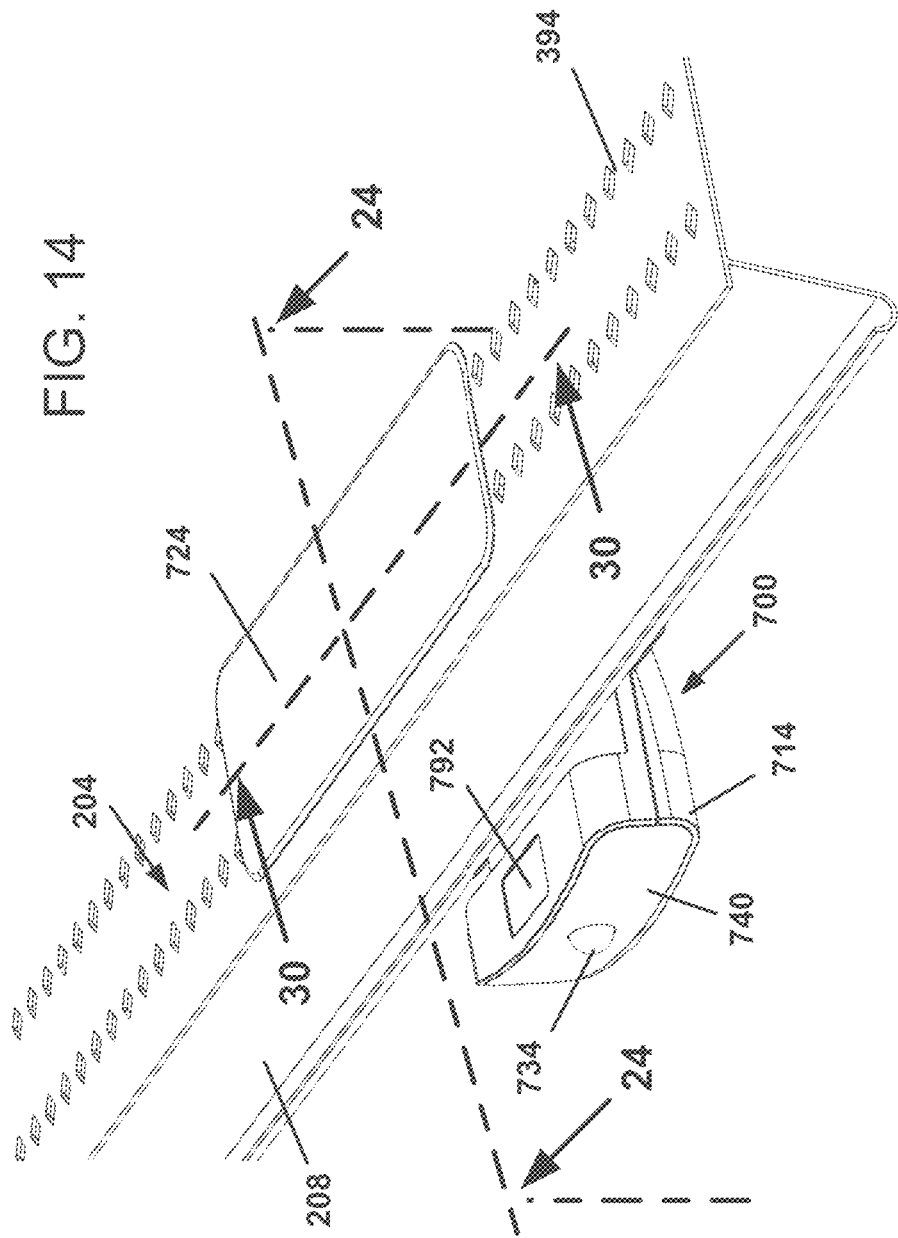
FIG. 14 is a top perspective view of the imaging device of FIG. 11 mounted to an example retail shelf.
Figure 15:
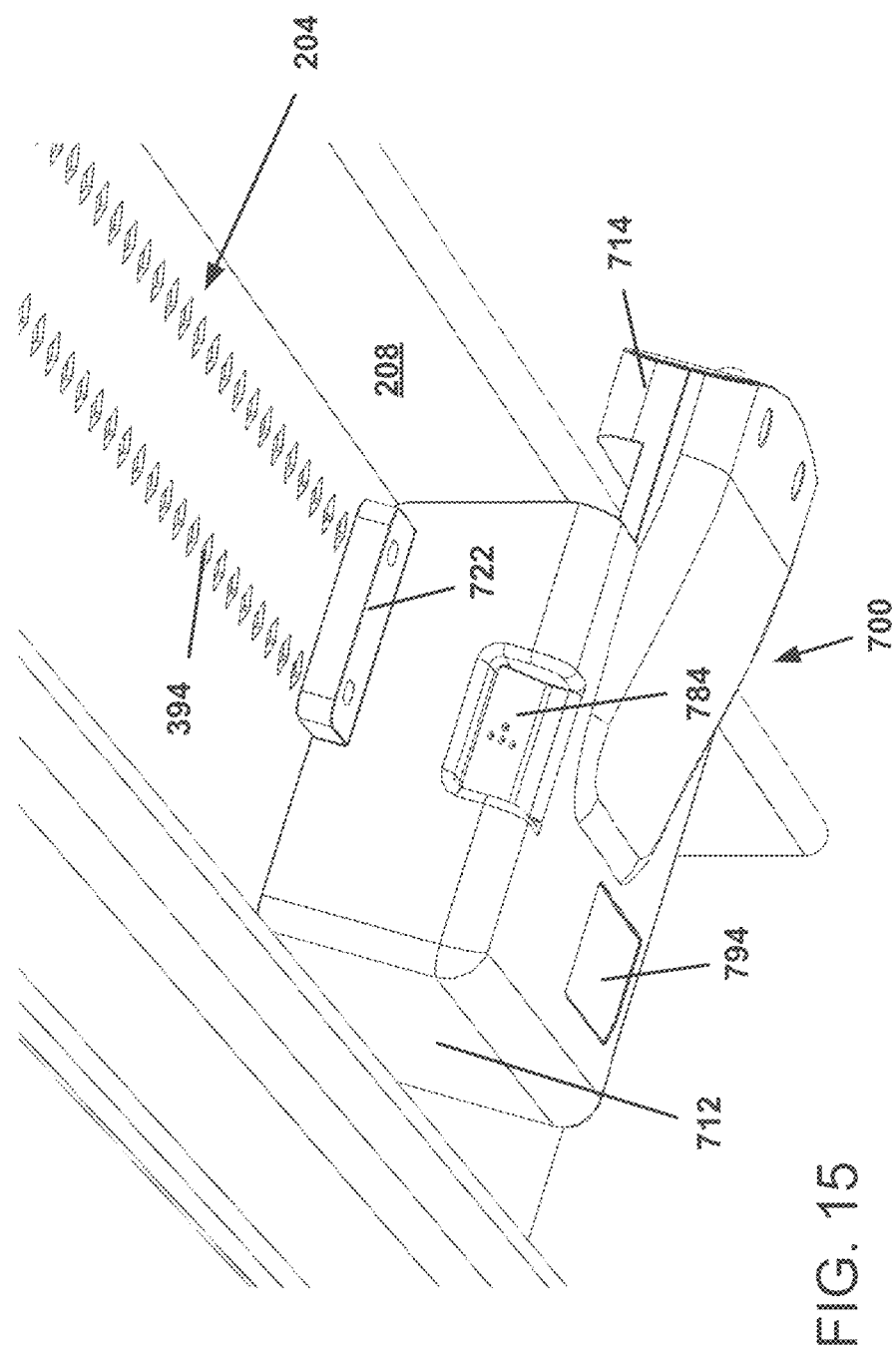
FIG. 15 is a bottom perspective view of the imaging device of FIG. 11 mounted to the retail shelf of FIG. 14.

In certain implementations, the circuit board arrangement 752 includes a reset switch 782 (FIG. 17) that, when actuated, causes the imaging device 700 to reinitialize. The reset switch 782 is actuatable via a button 784 disposed on the housing 710 (FIGS. 12 and 13). In certain examples, the button 784 is disposed at an opposite side of the housing 710 from the access opening 766. In certain examples, the button 784 is recessed inwardly from an outer profile of the housing 710. In certain examples, the button 784 includes indicia identifying the button 784 as a reset button. For example, the indicia may include Braille indicia.

In certain implementations, the button 784 is formed by a deflectable tab extending from a base end attached to the bottom housing 726 to a free end. In certain examples, the free end of button 784 carries a rib 786 that translates between a non-actuated position and an actuated position when the button 784 is depressed. The rib 786 activates the reset switch 782 when in the actuated position and is spaced from or otherwise does not activate the reset switch 782 when in the non-actuated position. In certain implementations, the housing 710 (e.g., the bottom housing 726) includes a limiter 788 that inhibits overtravel of the button 784 that would damage the reset switch 782. The limiter 788 is positioned so that the button 784 will engage the limiter 788 before moving sufficient towards the reset switch 782 to damage the reset switch 782.

One or more labels can be disposed on the exterior of the housing 710. In certain implementations, one or more of the labels can include a QR code, a bar code, or other machine-readable indicia that when read by a computing device (e.g., a cell phone) directs the computing device to a database entry or internet site providing information about the imaging device 700. In certain examples, the exterior of the housing 710 defines depressions 792, 794 at which the labels can be positioned.

Figure 5:
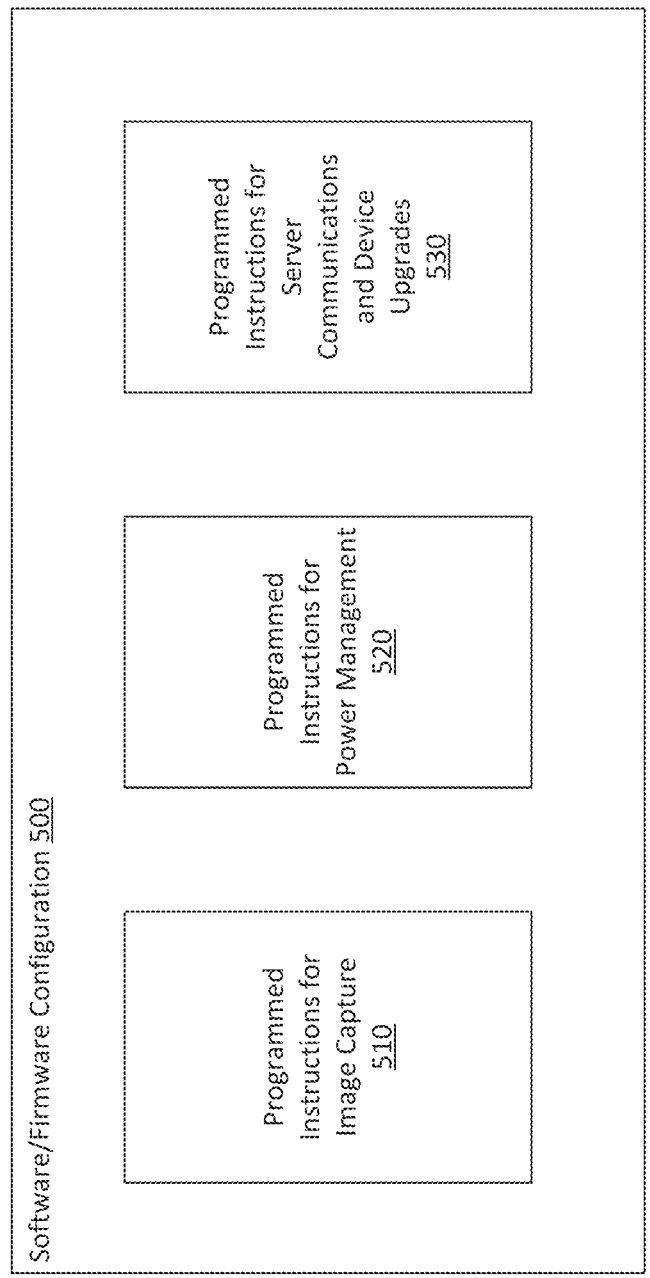
FIG. 5 illustrates a schematic of an example software/firmware configuration of the shelf-mountable imaging device.

Referring to FIG. 5, an example software/firmware configuration 500 of the shelf-mountable imaging device 300, 700 is illustrated. The software/firmware configuration 500 is representative of programmed instructions that are stored in one or more memories of the hardware system 400, 400', such as memory 412, memory 416, memory 422, for execution by one or more processors of the hardware system 400, 400', such as main processor circuit 410 or companion processor circuit 414, for desired functionality. The software/firmware configuration 500 includes programmed instructions that can be grouped as programmed instructions for image capture 510, programmed instructions for power management 520, and programmed instructions for server communications and device upgrades 530. Further details regarding the functionality produced by the programmed instructions are found herein.

III. Image Capture Process

Each shelf-mountable imaging device 300, 700 is configured to obtain one or more images of the stock 210 (or absence 250 of stock) on one or more shelves 204 of a shelving unit 202 at a retail location 104. For example, the shelf-mountable imaging device 300, 700 may obtain one or more images of the one or more shelves 204 opposing the shelf 204 to which the imaging device 300, 700 is mounted. In some implementations, the imaging device 300, 700 includes a single image sensor 426 to capture the images. In other implementations, the imaging device 300, 700 includes multiple image sensors 426 to capture separate images that are combined to form an image of a combined field of view.

For example, as shown in FIG. 7A, an imaging device 300, 700 is mounted to face a shelf 204 stocked with one or more items 210. A first image sensor 426a of the imaging device 300, 700 has a first field of view 250A of the shelf 204 and items 210. A second image sensor 426b has a second field of view 250B of the shelf 204 and items 210. Images obtained from the first and second image sensors 426a, 426b can be combined to cover a field of view 220 of the imaging device 300, 700.

The use of the two imaging units 374a, 347b, 730a, 730b to capture images results in one imaging unit 374a, 730a producing one or more images of a portion of the shelf/shelves 204 with the other imaging unit 374b, 730b producing one or more images of a different portion of the shelf/shelves 204. These images of different shelf portions can be combined to provide a complete overview of the shelving unit 202. In certain embodiments, dependent upon the angle of the imaging sensor 426a, 426b of the respective imaging units 374a, 374b, 730a, 730b, the original images produced may be distorted or warped, whereby the images are first processed to de-warp the images and then combined to produce a desired image. In further embodiments, again dependent upon the angle of the imaging sensor 426a, 426b of the respective imaging units 374a, 374b, 730a, 730b, the original images produced may have partially overlapping fields of view, as depicted in FIGS. 2A-2B.

In some implementations, a separate image from each imaging sensor 426a, 426b is transmitted to the remote computing device/server 120, 121 for subsequent integration of the images, with only minimal processing to avoid significant power consumption. In other implementations, depending on the desired level of power consumption, the images are combined at the shelf-mountable imaging device 300, 700 (e.g., by the image processor 425 of the main processor circuit 410) and transmitted to a remote computing device/server for stock analysis.

As shown, in FIG. 6, an image capture process 600 is implemented by the main processor circuit 410 to obtain one or more images of the field of view 220 of the imaging device 300, 700. In certain implementations, the steps of the image capture process 600 are stored as programmed instructions 510 within one of the memories 412, 416, 422 of the circuit board 372, 752. The image capture process 600 begins at an initialization step S610. In certain examples, the initialization step S610 includes the imaging device 300, 700 transitioning to an awake mode in which power is supplied from the power source 370, 756 to the imaging units 374a, 374b, 730a, 730b via the power management circuit 424.

In some examples, the initialization step S610 is performed according to a programmed time schedule stored in memory of the device 300, 700. For examples, the transition to awake mode for each imaging device 300, 700 within a retail locations 104a-104n may be scheduled at a different time. Staggering the wakeup of the imaging devices 300, 700 avoids overwhelming the processing server 121. Staggering the wakeup also may reduce the amount of data to be sent to the processing server 121 as the processing server 121 may identify which imaging device 300, 700 captured the images being sent based on the time at which the processing server 121 receives the images. For example, the processing server 121 may associated the received images with the imaging device 300, 700 scheduled to awake at that time. In certain implementations, depending on the number of retail locations 104a-104n across the retail organization, the transition to the awake mode of each imaging device 300, 700 within a retail imaging system 100 may be scheduled for a different time. In other examples, the initialization step S610 is performed upon request from a remote server (e.g., image processing server 121 of FIG. 1).

Upon successful initialization, data is obtained from the presence sensor 376 at step S612. In general, the images sought to be obtained are of the items 210 and lack of items 250 on the one or more shelves 204 within the field of view 220 of the imaging device 300. In use, consumers, employees, shopping carts, stocking trolleys, and other traffic may pass through the field of view 220 of the imaging device 300. Obtaining images during such blockage results in images that are less useful than images obtained when no traffic is within the field of view 220. Accordingly, in certain implementations, the capture process 600 proceeds only when the presence sensor 376 indicates the aisle is empty of human activity (e.g., that no motion is detected). As shown in FIG. 7A, the presence sensor 376 is typically configured so that a range 260 of the presence sensor 376 extends over the combined field of view 220 of the imaging device 300. In certain examples, the presence sensor 376 may have a range 260 that extends beyond the field of view 220 of the imaging device 300.

If the data from the presence sensor 376 indicates that no human activity (e.g., no motion) is occurring within the field of view 220 at module S614 (see "YES" in FIG. 6A), then the presence sensor 376 waits a short period of time and then again operates to obtain presence data (e.g., motion data) at step S612. This sequence occurs over a determined period of time (or for a set number if iterations) until human activity (e.g., motion) is not detected. If human presence is always detected during the predetermined time or iterations, then the shelf-mountable imaging device 300 may enter a sleep mode until once again awakened according to the time schedule. Image capture is delayed if human activity (e.g., motion) is detected based on the assumption that a customer is present and, due to customer privacy concerns and/or quality of images, current capture of an image is not desired. The presence sensor enables the imaging device 300, 700

When no presence is detected, (see "NO" in FIG. 6A), the image capture process 600 continues with obtaining one or more images from the one or more imaging units 374 at step S616. Various implementations of the obtain step S616 are illustrated in the flowcharts 630, 650 shown in FIGS. 6B and 6D. In certain examples, the obtain image step S616 is performed by the image processor 425 of the main processor circuit 410 of FIG. 4. The image capture process 600 then transmits the obtained image(s) to computing or electronic storage equipment remote from the imaging device 300 at a transmit step S618. Various implementations of the transmit step S618 are illustrated in the flowcharts 640, 660 shown in FIGS. 6C and 6E. In certain examples, the transmit image step S618 is performed by the companion processor circuit 414 of FIG. 4. Finally, when the image(s) have been transmitted, the image capture process 600 performs any finalization steps (e.g., transitions the imaging device 300 to a sleep mode) at step S620 and ends.

In some implementations, the imaging device 300, 700 is configured to obtain low resolution images with the image sensors 426. For example, in certain implementations, the imaging device 300, 700 may be configured to obtain an image having a resolution of about 640×480 pixels. In certain implementations, the imaging device 300, 700 is configured to obtain images in compressible formats, such as a JPG image. In other implementations, the imaging device 300 is configured to obtain high resolution images. For example, in certain implementations, the imaging device 300 is configured to obtain an image having a resolution of about 2560×1944 pixels. Other resolutions are possible. In certain implementations, the imaging device 300 stores instructions for capturing both types of images. In certain implementations, the imaging device 300 receives instructions from a remote server to obtain either high resolution images or low resolution images.

Figure 6A:
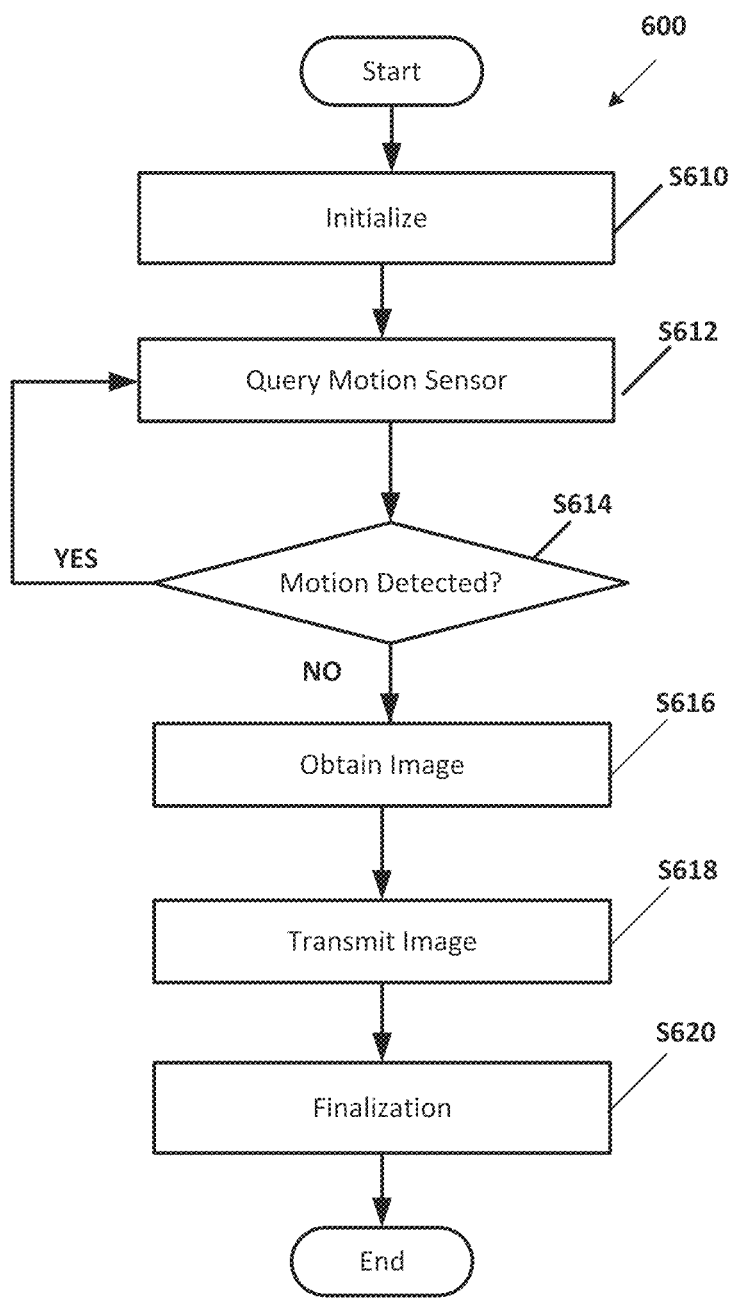
FIG. 6A is a flowchart illustrating an example method for image capture by the shelf-mountable imaging device.
Figure 6C:
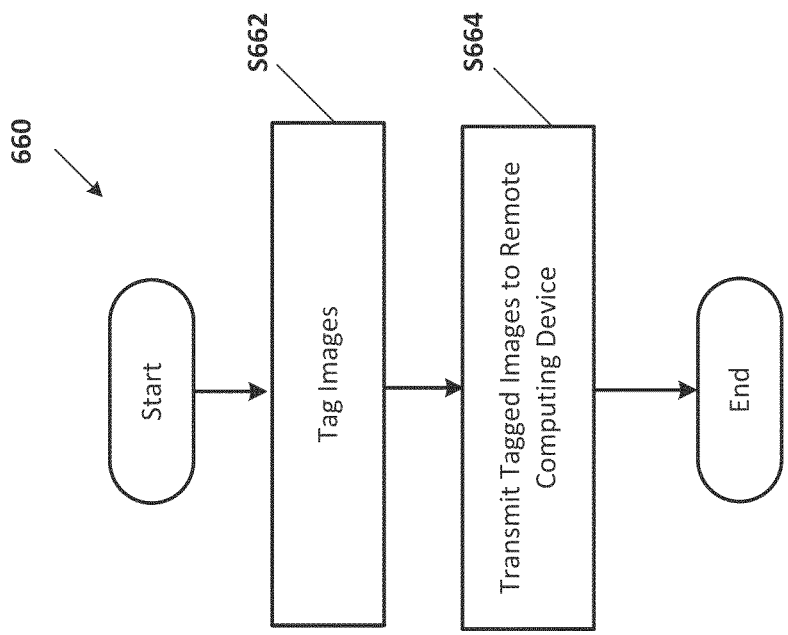
FIG. 6C is a flowchart illustrating another example implementation of the obtain step of the image capture flow chart of FIG. 6A performed for high resolution images.
Figure 6B:
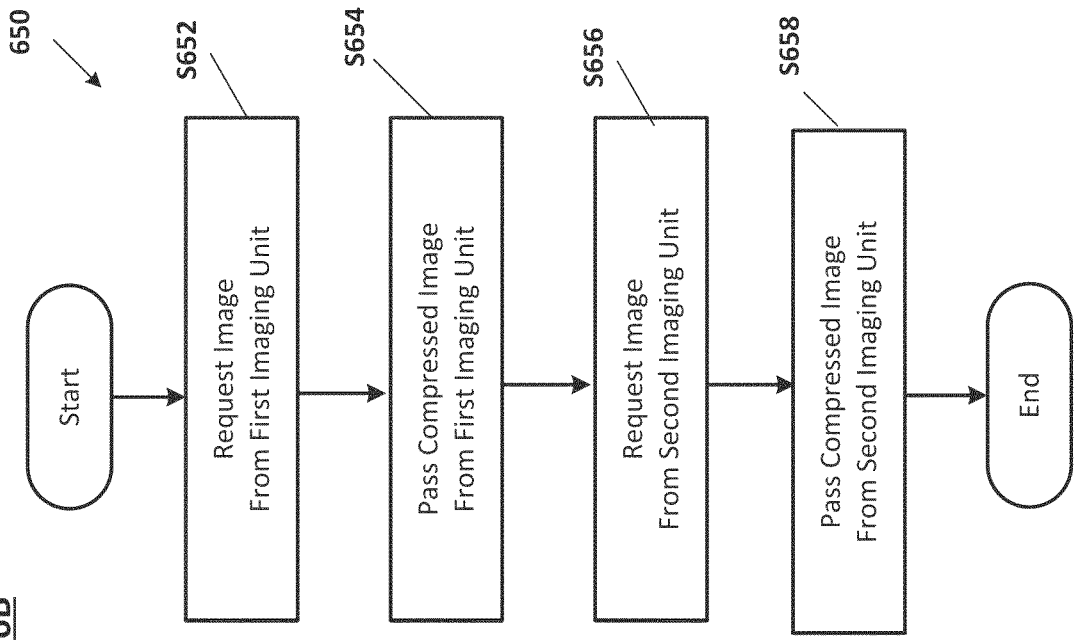
FIG. 6B is a flowchart illustrating an example implementation of the obtain step of the image capture flow chart of FIG. 6A performed for low resolution images.

FIG. 6B illustrates a compressed image capture process 650 for implementing the obtain step S616 of the image capture process 600. The capture process 650 may be implemented by one of the main circuit 410 and companion circuit 414. The compressed image capture process 650 sends a request to the first imaging unit 374a for a first image showing the full field of view 250A of the first imaging unit 374a at step S652. In some implementations, the request is for the first image to be in a compressed image format (e.g., a JPG image. In other implementations, the request does not specify an image format.

At step S654, the captured image is passed from the imaging unit 374a to the companion circuit 414 through the main circuit 410. In certain examples, the main processor circuit 410 does not store the captured image in memory. In some examples, the image processor 425 compresses (e.g., converts RAW image data to JPEG, or other format) the image. In other implementations, the image is already compressed by the imaging unit 374a. In certain implementations, the image processor 425 or instruction processor 411 otherwise modifies (e.g., tags) the captured image. In other examples, the captured, compressed image passes directly to the companion processor circuit 414 without tagging.

At step S656, the compressed image capture process 650 sends a request (e.g., from the image processor 425) to the second imaging unit 374b for a second image showing the full field of view 250B of the first imaging unit 374b. In some implementation, the request specifies a compressed image format (e.g., a JPG image). In other implementation, the request does not specify an image format.

The low resolution capture process 650 passes the second requested image from the second imaging unit 374b to the companion circuit 414 at step S658. In some implementations, a compressed second image is passed from the second imaging unit 374b to the companion circuit 414. In other implementations, the image processor 425 compresses the image received from the imaging unit 374b and passes the compressed image to the companion circuit 414. In certain implementations, the main circuit 410 does not store the second image in memory.

In certain embodiments, the first and second imaging units 374, 374b operate simultaneously. However, in other embodiments, in an effort to preserve battery power, operation of the first and second imaging units 374a, 374b may be performed sequentially as suggested in the flowchart 650. In other implementations, the compressed image capture process 650 sends a request for an image of the combined field of view 220 to a combined management circuit for the imaging sensors 426a, 426b and receives the requested combined compressed image.

FIG. 6C illustrates a transmit process 660 for implementing the transmit step S618 of the image capture process 600. The transmit process 660 can be implemented by the main circuit 410 and/or the companion circuit 414 to send the obtained images to a remote location (e.g., image processing server 121 of FIG. 1). At step S662, the obtained images are tagged with metadata. In certain examples, the metadata includes an identification (ID) of the imaging device 300, 700 at which the images were obtained. In certain examples, the ID of the imaging device 300, 700 is accessible via the QR code or other label disposed on the imaging device 300, 700. In some implementations, the companion circuit 414 tags the images with the metadata, such as a voltage level of a battery supply at the imaging device 300, 700. In other implementations, the main circuit 410 (e.g., the image processor 425) tags the captured images with metadata.

In some examples, the images are obtained according to a predetermined schedule. The imaging devices 300 of the imaging system 150 are associated with specific shelves 204 or shelving installations 202 with a retail location 104. Accordingly, tagging the images with indicia identifying the imaging device 300 is sufficient to identify the subject of the image (e.g., which product shelf within the retail location is pictured) based on the schedule. In other examples, the images also can be tagged with a timestamp indicating when the image was obtained. In some implementations, the images may be tagged with a current voltage level or power level of the imaging device 300 so that an analysis can be made of the available battery power remaining. In other implementations, such information can be sent separate from the images.

At step S664, the tagged images are transmitted from the companion processor circuit 414 to a central computing device (e.g., local retail store server 120 or remote server 121). In certain implementations, the central computing device is communicatively coupled to multiple imaging devices 300 within the retail location 104 (or across retail locations 104a-n, in the event of a remote server 121). In some implementations, the tagged images are wirelessly sent to the central computing device (e.g., using WiFi transfer protocol, Bluetooth transfer protocol, LoRa transfer protocol, or other wireless transfer protocol). In other implementations, the tagged images can be transmitted over a cabled connection.

Figures 6D, 6E:
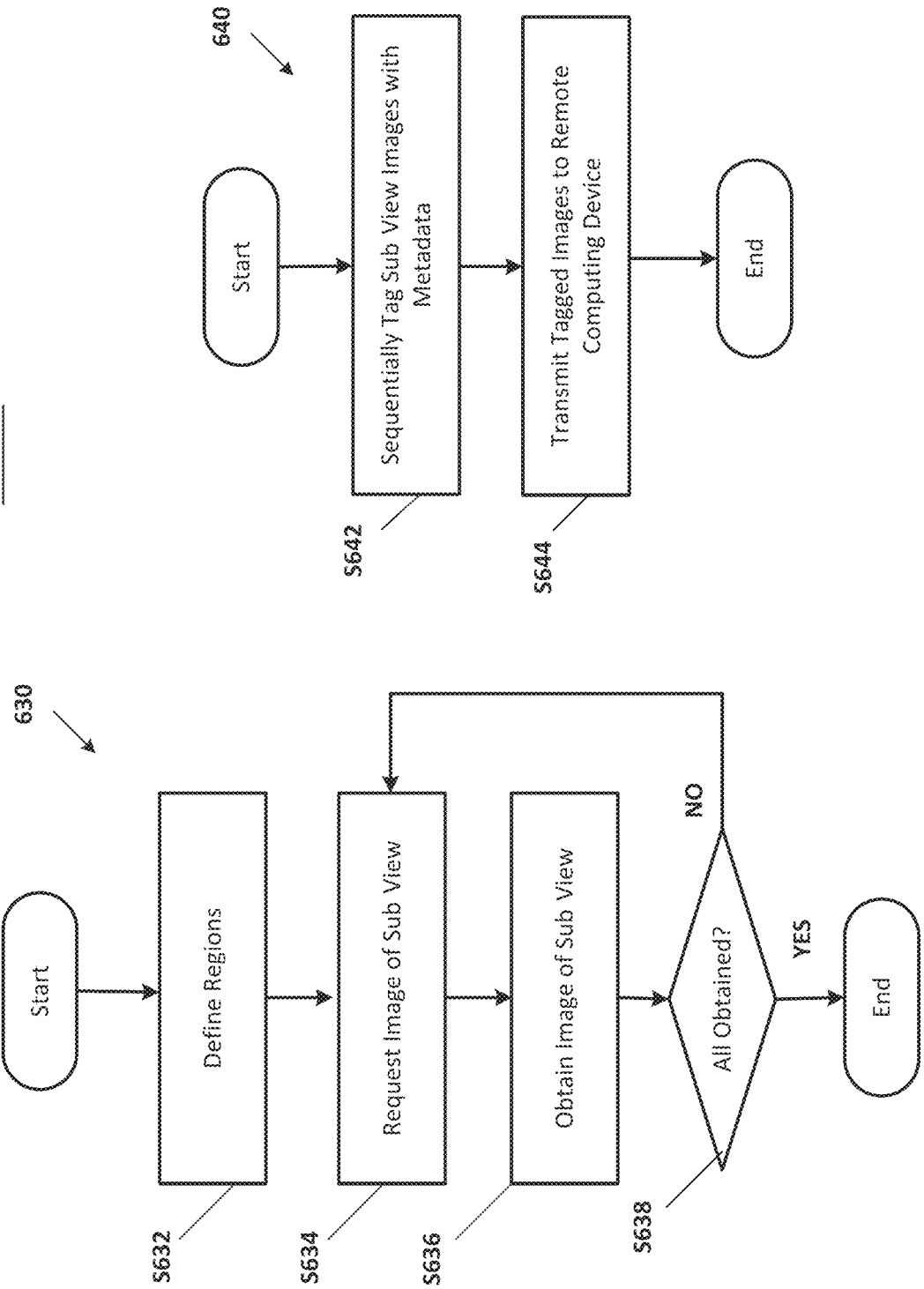
FIG. 6D is a flowchart illustrating an example implementation of the transmit step of the image capture flow chart of FIG. 6A performed for low resolution images.
FIG. 6E is a flowchart illustrating another example implementation of the transmit step of the image capture flow chart of FIG. 6A performed for high resolution images.

FIG. 6D illustrates a high resolution capture process 630 for implementing the obtain step S616 of the image capture process 600. The capture process 630 may be implemented by the main circuit 410. The high resolution capture process 630 is implemented when a high quality image (e.g., high resolution, high color depth, uncompressed images, such as in a RAW image format, or otherwise uncompressed form as received from imaging units 374a, 374b) for the field of view 220 of the imaging device 300 is desired, but insufficient memory is available within the imaging device 300 to process, store, and/or transmit entire images of the resulting size.

At step S632, the capture process 630 divides the field of view 220 of the imaging device 300 into regions R1-Rn. As show in FIG. 7B, each region R1-Rn has a height H and a width W. In certain examples, the regions R1-Rn have a common height H and width W. Each region R1-Rn also has a particular offset. In some examples, the offset refers to a number of pixels along first and second axes (Offset 1, Offset 2) between a starting position (0, 0) for the field of view 220 and the starting position for the image. In certain examples, the capture process 630 separately divides the field of view 250 of each imaging unit 374 into regions R1-Rn.

At step S634, the high resolution capture process 630 requests a high resolution sub-image of one of the region R1-Rn of the field of view 220 of the imaging device 300. For example, the capture process 630 may request an image of a particular size (e.g., a particular height H and width W) and taken at a particular offset within the field of view 220.

In certain implementations, the capture process 630 requests a sub-image from a particular imaging unit 374*a*, 374*b* (i.e., from a particular field of view 250). At step S634, the capture process 630 obtains the requested sub-image. In certain implementations, the captured image is passed from the respective imaging unit 374 to the companion processor circuit 414 via the main processor circuit 410. In certain examples, the captured image is not stored in non-transitory, non-volatile memory within the imaging device 300. Steps S632 and S634 are repeated until sub-images are obtained for each defined region R1-R*n* for the field of view 220.

In certain implementations, the regions R1-R*n* are sized so that the resulting image of the region has a size that is no larger than the size of the low resolution image of the entire field of view 220. For example, the resulting high resolution image of each region R1-R*n* may have a resolution of about 640×480 pixels. Accordingly, when the images of the various regions R1-R*n* are combined, the resulting combined image will have a resolution of about 2560×1920 pixels. By sequentially imaging each region R1-R*n* of the field of view 220, the limited number of pixels that can be stored in memory at any one time, in uncompressed form, are used capture a high resolution, uncompressed image of a sub-view of the region R1-R*n* rather than using that same memory space to capture a single compressed image of the entire field of view 220) at lower image quality.

FIG. 6E illustrates another example transmit process 640 for implementing the transmit step S618 of the image capture process 600. The transmit process 640 can be implemented by the main circuit 410 and/or the companion circuit 414 to send the obtained high resolution sub-images to a local or remote location (e.g., local server 120 or image processing server 121 of FIG. 1). At step S642, the obtained high resolution images are tagged with metadata. In certain examples, the metadata includes an identification (ID) of the imaging device 300 at which the images were obtained and an indication of the region R1-R*n* represented by the sub-image. In some examples, the regions are pre-defined to have particular sizes and offset so only a region identifier need be included. In other examples, the dimensions of each region (e.g., height and width) and an offset (e.g., Offset 1 and Offset 2) are included in the tag.

In some examples, the sub-images are obtained according to a predetermined schedule. The imaging devices 300 of the imaging system 150 are associated with specific shelves 204 or shelving installations 202 with a retail location 104. Accordingly, tagging the images with indicia identifying the imaging device 300 is sufficient to identify the subject of the image (e.g., which product shelf within the retail location is pictures). Further, the sequence in which the sub-images are obtained within a particular field of view 220 also may be pre-defined. Accordingly, the sub-images can be pieced together based on the time or order in which they are received at the central location. In other examples, the sub-images also can be tagged with a timestamp indicating when the sub-image was obtained, an indication of from which imaging sensor the image was obtained, and/or a region identification. In certain implementations, the sub-images may be tagged with a current voltage level or power level of the imaging device 300 so that an analysis can be made of the available battery power remaining.

At step S644, the tagged sub-images are transmitted from the companion processor circuit 414 to a central computing device (e.g., local retail store server 120 or remote server 121). In certain implementations, the central computing device is communicatively coupled to multiple imaging devices 300 within the retail location 104. In some implementations, the tagged sub-images are wirelessly sent to the central computing device (e.g., using WiFi transfer protocol, Bluetooth transfer protocol, LoRa transfer protocol, or other wireless transfer protocol).

In some implementations, the transmit process 640 is implemented after each iteration of the capture process 630 so that the uncompressed sub-images are transmitted as they are obtained. Accordingly, the imaging device 300 need not store all of the uncompressed sub-images simultaneously. Rather, in certain implementations, the imaging device 300 stores only one or two of the sub-images at one time.

The ability to divide the field of view into sub-views and obtain corresponding images of the sub-views enables the imaging units 374*a*, 374*b* to operate a low power levels without having the need for large memory (e.g., each sub-view image is locally stored in the imaging device then transmitted to the companion processor circuit 414 before the next sub-view image needs to be stored at the imaging device).

In certain implementations, dividing the field of view into regions R1-R*n* allows the capture of images showing one or more regions of interest within the field of view instead of obtaining images of the entire field of view. Accordingly, regions deemed uninteresting (e.g., not including portions of the retail shelf, etc.) may not be imaged, thereby reducing the time needed to obtain the images and reducing the amount of data transferred from the imaging device 300, 700 to the remote server or other management network component. In some such examples, the instructions provided by the main processor circuit 410 to the imaging units 374*a*, 374*b*, 730*a*, 730*b* may indicate one or more specific regions to image.

In certain implementations, the instructions provided from the main processor circuit 410 to the one or more imaging units 374*a*, 374*b*, 730*a*, 730*b* specify a zoom level at which to take the image(s) of the field of view or of the one or more regions R1-R*n* within the field of view. In certain examples, the instructions 374*a*, 374*b*, 730*a*, 730*b* may include instructions to the imaging units 374*a*, 374*b*, 730*a*, 730*b* to optically and/or digitally zoom in or out on one or more of the region(s) of interest.

Figure 7B:
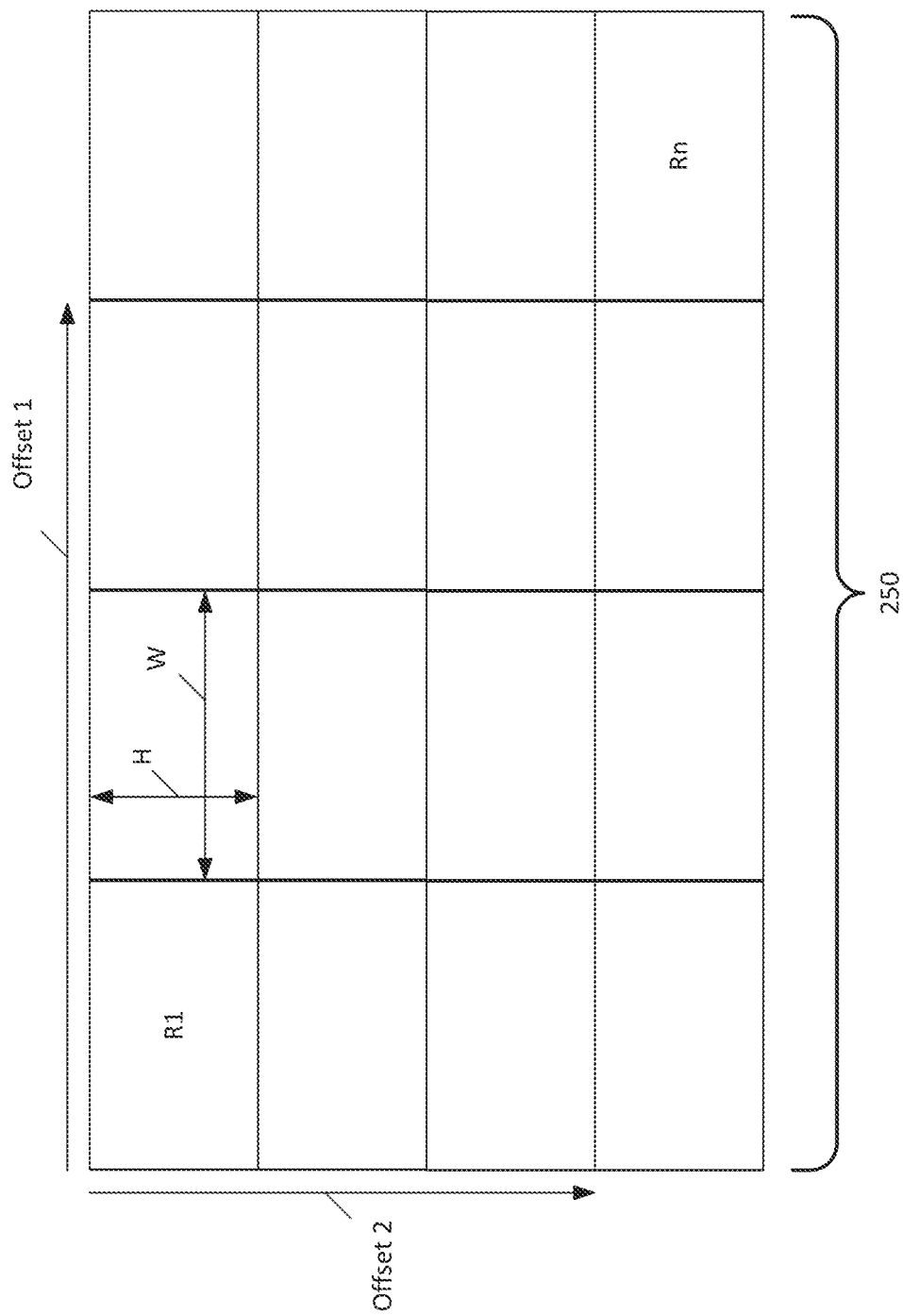
FIG. 7B illustrates the field of view of an imaging unit divided into sub-views based on dimensions and offsets of the sub-views.

As noted above, FIGS. 7A-7C illustrate an example manner of dividing a field view of an imaging device into a plurality of sub-views. As shown in FIG. 7A, the field of view 220 can be divided into a grid of columns and rows with the upper left corner of the upper left sub-view R1 establishing an origin for the field of view 220. Additional sub-views can then be identified by a height H and/or a width W offset from the origin to uniquely identify each sub-view from R1 to R*n*. FIG. 7A also shows how the field of view 220 can be divided into sub-fields 250A, 250B of each imaging unit 374*a*, 374*b* and how each of the sub-fields 250A, 250B also are divided into regions R1-R*n* for capture by the shelf-mountable imaging device 300.

Figure 7C:
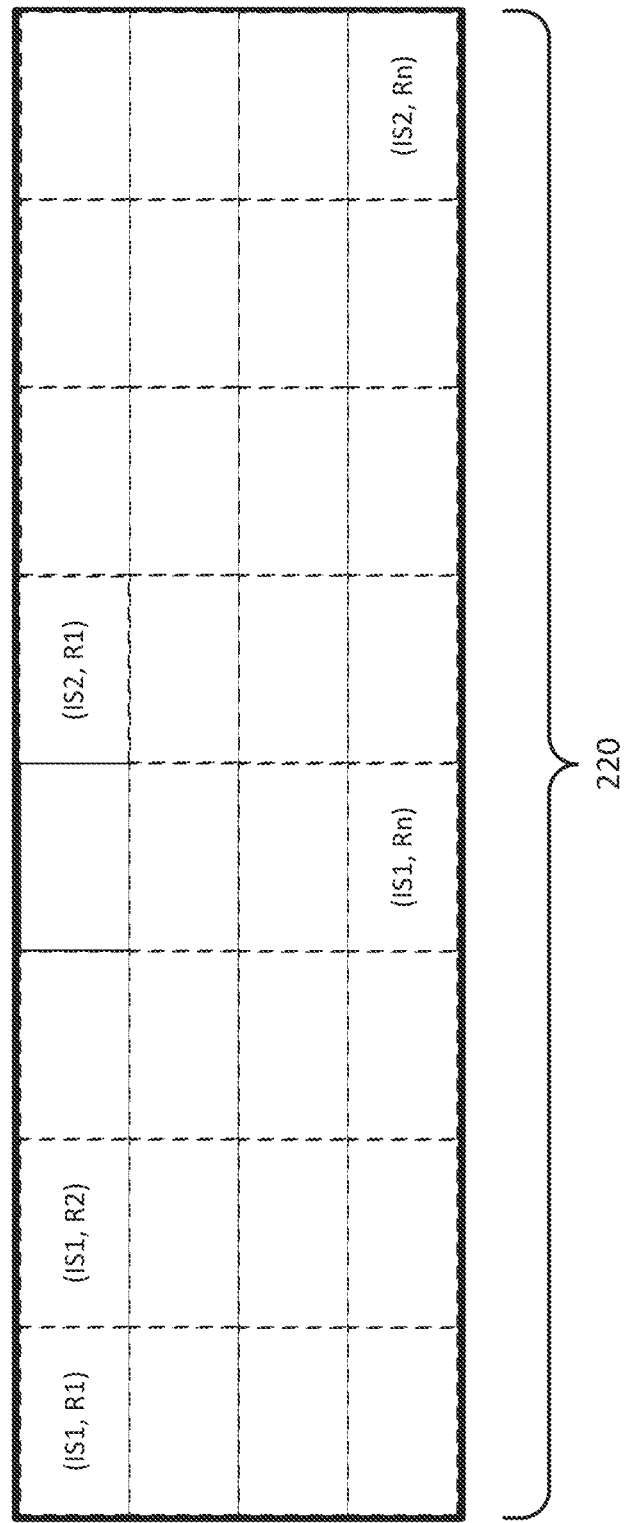
FIG. 7C is an example aggregation of sub-views to create a single image covering an entire field view of the shelf-mountable imaging device.

FIG. 7B illustrates an example field of view 250 for one of the imaging units 374 divided into R1 to R*n* sub-views. FIG. 7C illustrates how the sub-views from the field of view 250*a* of a first imaging unit 374*a* and the sub-views of field of view 250*b* of a second imaging unit 374*b* can be aggregated to provide a single high resolution image of the combined field of view 220 of the imaging device 300.

In certain embodiments, the image capture process 600 can be instigated outside of a regularly scheduled image capture time. For example, the shelf-mountable imaging device 300 may receive an instruction from a remote server to activate an unscheduled image capture process based on the remote server having analyzed previously captured images and determined that an undesirable object, such as a stationary cart or person, has appeared in the images (e.g., the presence sensor 376 failed to detect any human activity (e.g., motion) that would delay the image capture process 600 due to stationary nature of the undesirable object).

IV. Power Management

Referring to FIG. 8, a power management process is performed with the intent of minimizing the power consumed by the hardware system 400, 400' to assist in maintaining longevity of operation and reducing physical intervention for component replacement. The power management process cycles the imaging device 300 with various modes. In each mode, a different set of components are awake to perform a function or asleep to conserve power. In certain examples, the imaging device 300 cycles between a sleep mode, a wake-up mode, an image capture mode, an internal image transfer mode, and an external transfer mode.

FIG. 8 is a power usage timing diagram illustrating the operational status of the main processor circuit 410, the presence detector 376, the memory 422, the first and second imaging units 374a, 374b, and the companion processor circuit 414 during the operational stages of wake-up, image capture, internal transfer, external transfer, and sleep. The power management process 800 is executed by the shelf-mountable imaging device 300 in accordance with the programmed instructions for power management 520, as assisted by the power management circuit 424 of FIG. 4 to selectively deliver or interrupt power to specific circuits within the imaging device 300.

During the operational stage of wake-up, which is typically performed responsive to a predetermined time schedule, the main processor circuit 410 is ON. The presence sensor 376 is powered on to detect human activity (e.g., motion) for a brief period of time (e.g., 10-12 sec.) and supply data representative of human presence to the main processor circuit 410. If the data indicates no motion, the presence detector 376 is powered OFF and a successful wake-up is deemed to have occurred. In the instance that the data indicates human activity (e.g., motion) is occurring, the presence detector 376 is powered OFF for a period of time (e.g., thirty seconds, one minute, two minutes, 3-10 minutes, etc.) then powered ON again (as indicated by dashed line) for motion detection. This re-attempt at detecting human presence can be repeated a predetermined number of time or until no human presence is detected.

When wake-up is deemed successful, the imaging device 300 transitions to the image capture stage. During the image capture stage, the main processor circuit 410 remains ON, the companion processor circuit 414 is powered to an ON/not transmitting mode, and the first and second imaging units 374a, 374b are ENABLED (e.g. supplied with power) without performing image capture. The memory 422 also is powered ON while the one or both of the imaging units 374a, 374b are ENABLED without performing image capture. One or both of the imaging units 374a, 374b are then powered ON for image capture. In some embodiments, the imaging units 374a, 374b operate simultaneously during image capture. In other embodiments (as indicated by the dotted line), the first imaging unit 374a is provided sufficient power to perform image capture and then powered down to ENABLED before the second imaging unit 374b is powered ON for image capture then powered down to ENABLED without image capture.

When the images from the imaging units 374 are captured, the imaging device 300 transitions to an internal image transfer mode. During the internal transfer stage, the main processor circuit 410 remains ON, the companion processor circuit 414 remains in an ON/not transmitting mode, the memory 422 remains ON, and the first and second imaging units 374a, 374b remain in an ENABLED mode of operation. Each of the imaging units 374a, 374b transfers (simultaneously or sequentially) their respective captured image data to the companion processor circuit 414 (e.g., directly or via the main processor circuit 410). In certain examples, the captured image data is transferred to a volatile memory (e.g., RAM) 416 of the companion processor circuit 414. In certain examples, one or more internal checks (e.g., a checksum process) may be performed to ensure data integrity during the transfer. Upon completion of internal transfer of the captured image data to the companion processor circuit 414, the imaging units 374a, 374b are powered OFF and, correspondingly, the memory 422 is powered OFF.

During the external transfer stage, the main processor circuit 410 remains ON and the WiFi transceiver 418 or other transceiver is powered ON causing the companion processor circuit 414 to transition from an ON/not transmitting mode to an ON/transmitting mode. While the WiFi transceiver 418 is powered ON, communication with a local or remote computing device/server is established. The captured image data is then transmitted via the WiFi transceiver 418 to the computing device/server. In certain examples, one or more checks (e.g., a checksum process) may be performed to ensure data integrity during the transfer.

In certain implementations, health data of the hardware system 400, 400' also can be pushed to the computing device/server during open WiFi communication (e.g., during the external transfer stage). Example health data includes a battery voltage level. In certain implementations, a check can be performed with the computing device/server to determine if an update to software/firm of the hardware system 400, 400' needed. With communications complete, the WiFi transceiver 418 is powered off placing the companion processor circuit 414 in an ON/not transmitting mode. Then, the companion processor circuit 414 is powered OFF.

With only the main processor circuit 410 powered ON and the presence detector 376, memory 422, imaging units 374a, 374b, and companion processor circuit 414 powered OFF, the hardware system 400, 400' is deemed to be in a sleep mode. In such instances, the power management circuit 424 may limit power delivery to various circuits included in the hardware system 400, 400', thereby further reducing power consumption during the sleep mode. In some implementations, the imaging device 300 remains in a sleep mode for a pre-determined period of time until a scheduled wake-up cycle. In other implementations, the imaging device 300 may remain in the sleep mode until a request for an image is made from an external computing device/server.

V. Device Updates

Figure 9A:
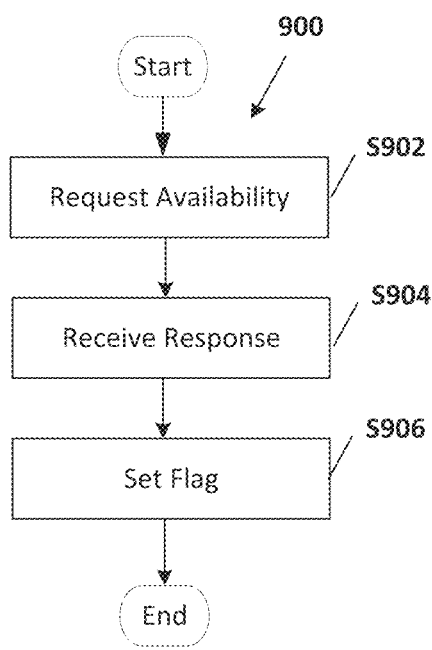
FIG. 9A is a flowchart illustrating an example process for checking for software/firmware updates for the shelf-mountable imaging device.
Figure 9B:
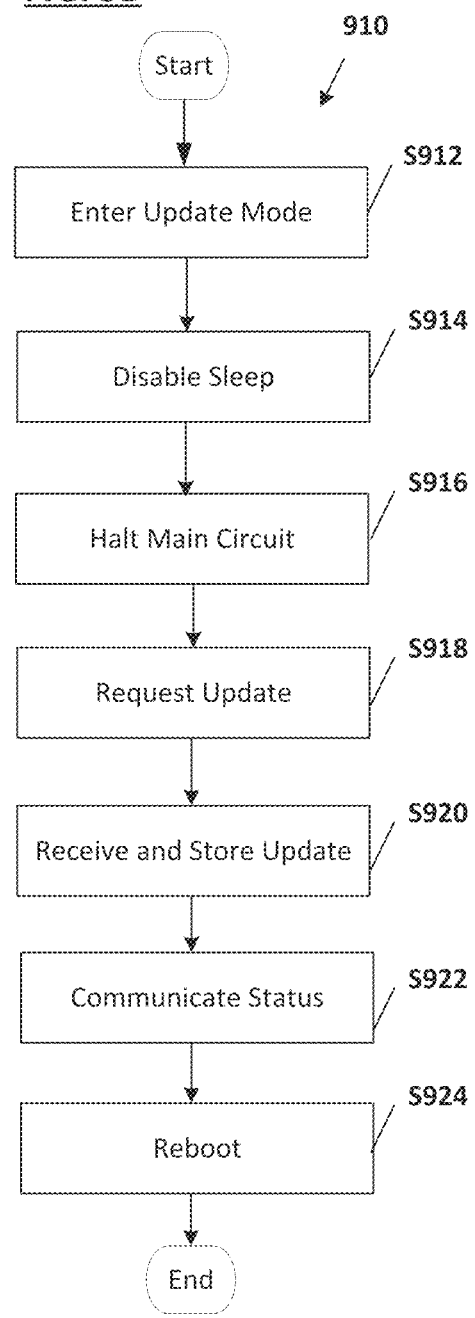
FIG. 9B is a flowchart illustrating an example process for obtaining and implementing software/firmware updates for the shelf-mountable imaging device.

Referring to FIGS. 9A and 9B, the imaging device 300 can receive over the air (OTA) updates of the software/firmware from a remote computing device/server. In some implementations, the updates are for the main processor circuit 410. In other implementations, the updates are for the companion processor circuit 414. In certain examples, the imaging device 300 obtains an update for only one of the processor circuits 410, 414 at one time.

FIG. 9A is a flowchart illustrating a process 900 to check for updates for the imaging device 300. In some implementations, the check process 900 is performed during the external transmit mode after the captured images have been uploaded. In other implementations, the check process 900 may be performed at a scheduled time not tied to the image capture process.

At step S902, the companion circuit 414 communicates with the remote computing device/server (e.g., via the WiFi transceiver 418, Bluetooth transceiver 420, LoRa transceiver, serial bus port, etc.) to request update availability. For example, the companion circuit 414 may request whether an update is available for the main processor circuit 410, the companion circuit 414, or another component of the software and/or firmware.

At step S904, the companion circuit 414 receives a response from the remote device indicating whether an update is available.

At step S906, the companion circuit 414 sets a flag (or other indicator) indicating whether or not an update is available. In certain examples, the companion circuit 414 stores the flag in internal memory 416. In other examples, the companion circuit 414 may store the flag in memory 422. In still other examples, the companion circuit 414 may communicate the availability of the update to the main circuit 410, which stores a flag in memory 412. The check process 900 ends after the indicator is stored.

FIG. 9B is a flowchart illustrating an update process 910 to obtain and implement the update for the imaging device 300. In some implementations, the update process 910 is performed immediately following the ending of the check process 900 if an update is available. In other implementations, the update process 910 may be performed at a scheduled time not tied to the image capture process. For example, the update process 910 may be scheduled for a time when the imaging device 300 is not scheduled to capture images. In some implementations, the update process 910 may be schedule for a time when the retail location is closed. In other implementations, the update process 910 may be scheduled for peak hours at the retail location when an unobstructed view for image capture will be difficult to obtain. In still further implementations, the update process 910 may be scheduled for a time different from another update process 910 of another imaging device 300, at the same retail location or another location, to avoid server congestion. The process 910 is executed by the companion circuit 414 in accordance with the programmed instructions for device upgrades 530.

At step S912, the companion processor circuit 414 determines that an update is available from a remote computing device/server and transitions into an update mode. In certain implementations, the companion processor circuit 414 checks whether an update flag has been stored. If the availability of an update is indicated, then the companion circuit 414 (optionally with the main processor circuit 410) assesses whether one or more conditions are present that suggest that the update may not complete successfully. For example, the main processor circuit 410 and/or companion processor circuit 414 may check the voltage level of the battery. In other examples, the main processor circuit 410 and/or companion processor circuit 414 may check for corrupted data (e.g., using a checksum process).

At step S914, the companion processor circuit 414 disables sleep mode for the imaging device 300. Accordingly, in some examples, the imaging device 300 will not power down the main processor circuit 410 or the companion processor circuit 414 until the imaging device 300 exits the update mode as will be described herein. In certain examples, disabling the sleep module maintains the main processor circuit 410 in an ON state. In certain examples, disabling the sleep module maintains the companion processor circuit 414 in an ENABLED or ON state.

At step S916, the companion circuit 414 sends a signal to the main processor circuit 410 to halt operation without powering down. Accordingly, the main processor circuit 410 continues to pull power from the power management circuit 424 and supply the power to the memory 422. However, the main processor circuit 410 will cease attempts to access the memory 422 to read or write data.

At step S918, the companion circuit 414 transitions to an ON state and supplies power to the communication interface (e.g., WiFi transceiver 418, Bluetooth transceiver 420, LoRa transceiver, bus serial port, etc.). The companion circuit 414 initiate communication with the remote computing device/server. In some implementations, the companion circuit 414 requests the available update. In other implementations, the companion circuit 414 identifies itself to the remote device so that the remote device can determine what information should be sent.

At step S920, the companion circuit 414 receives the update from the remote device via the wireless interface (e.g., the WiFi transceiver 418). In some implementations, the companion circuit 414 stores the received update or portions thereof in memory 422. For example, the companion circuit 414 may store the update in a portion of memory 422 reserved for instructions executed by the main processor circuit 410. In other implementations, the companion circuit 414 may store the update or portions thereof in its internal memory 416.

At step S912, the companion circuit 414 sends a communication to the remote computing device/server indicating whether or not the update was successfully obtained. In some implementations, the companion circuit 414 determines the update was obtained in its entirety, removes the update availability flag, and confirms receipt to the remote device. In other implementations, the companion circuit 414 determines that the update was not fully received (e.g., the communication was interrupted, the received data was corrupted, the received data was incomplete, etc.) and sends an error message to the remote device. In some implementations, the companion circuit 414 may immediately reinitiate the update if the update was incomplete. In other implementations, the companion circuit 414 ends the transmission, maintains the availability flag, and exits out of update mode.

At step S914, upon successfully writing the update into memory 422, the companion circuit 414 initiates a reboot of the imaging device 300. The main processor circuit 410 is configured to check the memory 422 for executable instructions during the reboot process. Accordingly, the update will be implemented by the main processor circuit 410 upon reboot. Further, rebooting the main processor circuit 410 resets the power cycle so that the processor circuits 410, 414 can enter a sleep mode.

In certain implementations, multiple imaging devices 300 communicate with a common computing device/server (or network of computer devices/servers) to upload captured images and obtain updates. In certain examples, each imaging device 300 has a scheduled time at which the imaging device 300 contacts the remote device to upload the images and check for updates. In certain examples, the upload/update times for the imaging devices 300 are staggered to avoid overwhelming the remote device.

VI. Image Processing Techniques and Applications

Figure 10:
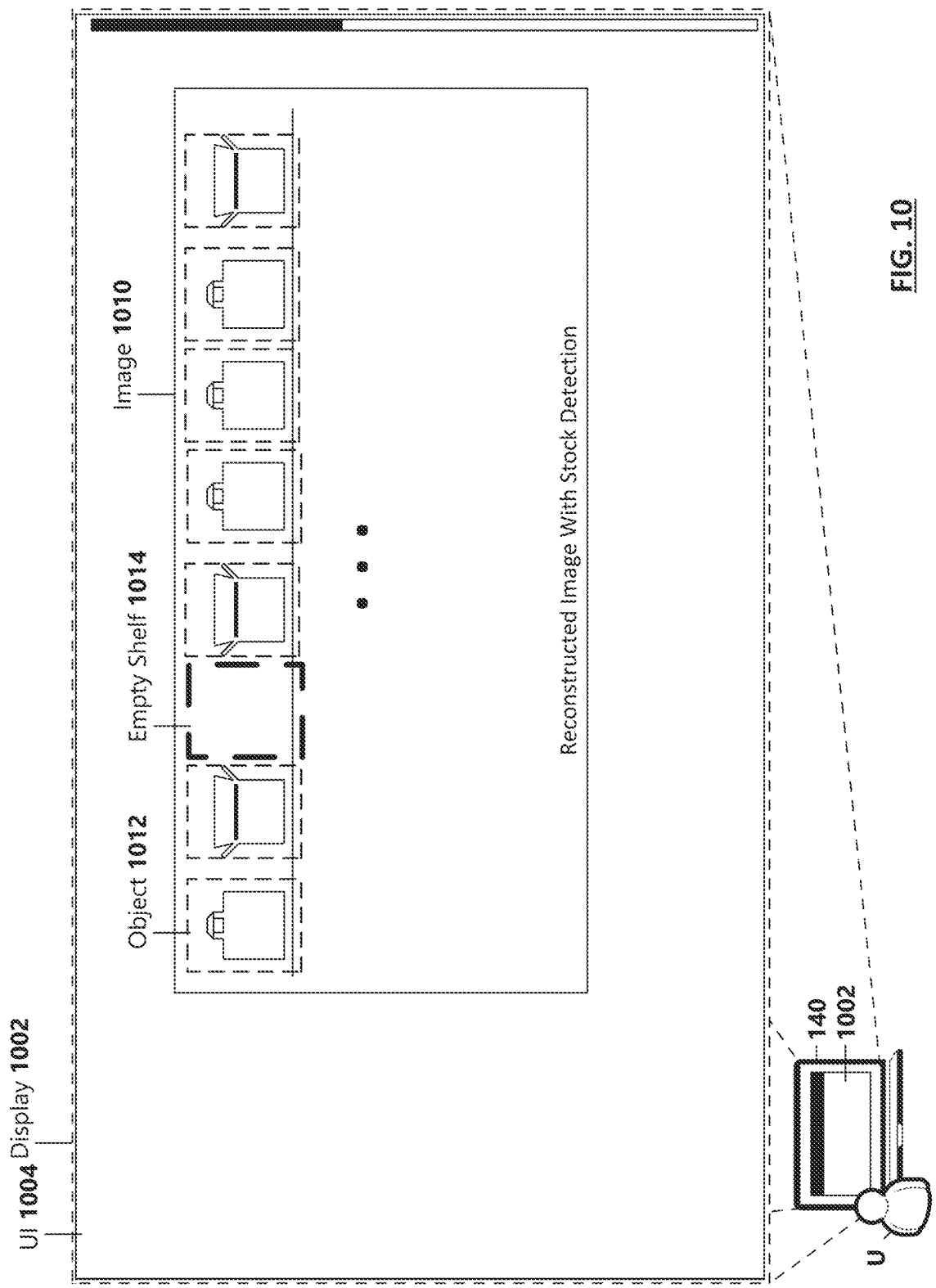
FIG. 10 is an example schematic illustration of a user interface presented on a display of an end-user computing system, depicting a reconstructed, analyzed image captured using a plurality of shelf-mountable imaging devices.
Figure 11:
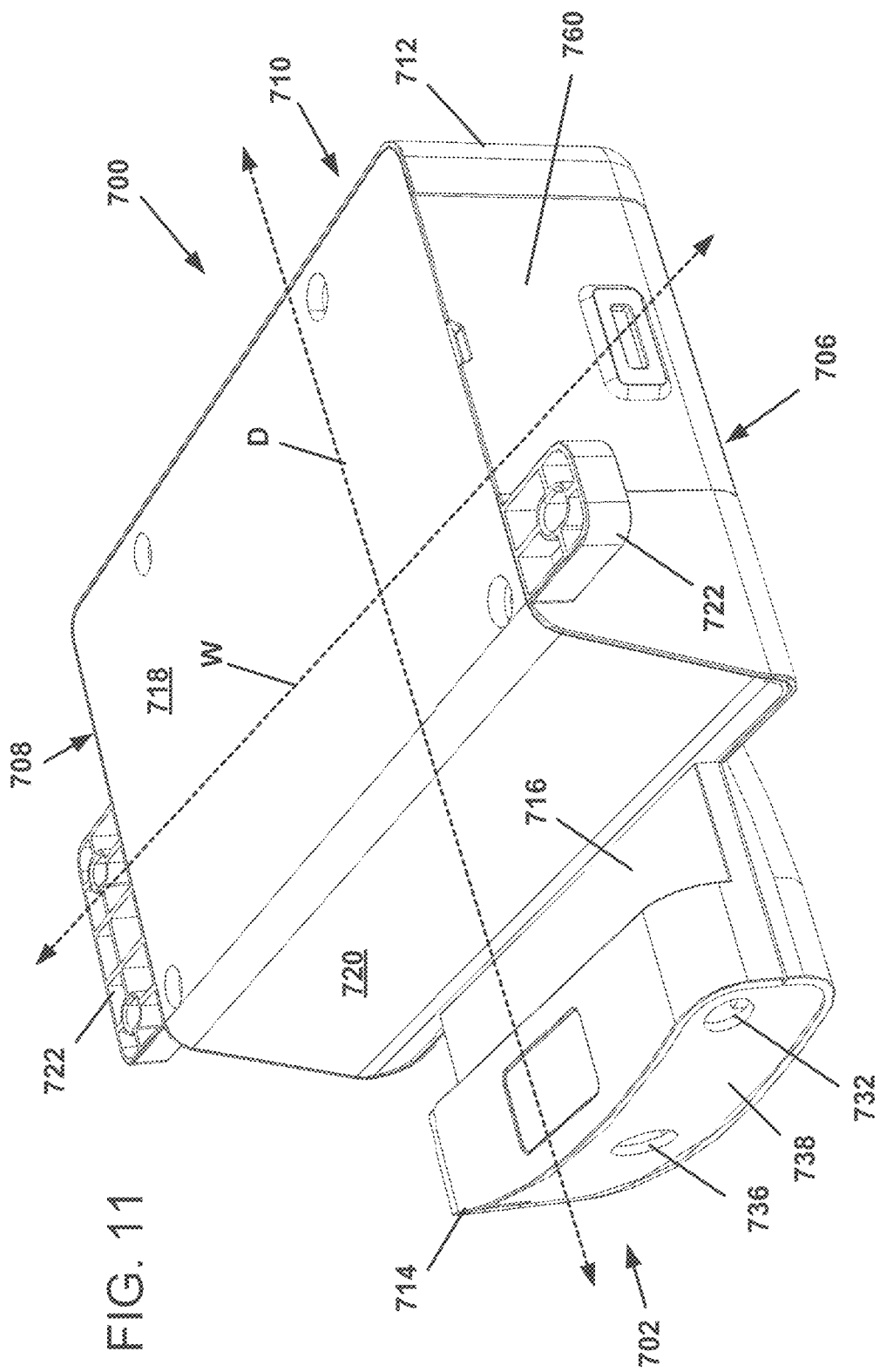
FIG. 11 is a top perspective view of an example shelf-mountable imaging device suitable for use in the retail imaging system of FIG. 1.

Referring to the above figures, the imaging devices described herein provide image data to a local or central server for further analysis, which may have a variety of applications. One such application is depicted in FIG. 10. FIG. 10 is an example schematic illustration of a user interface 1004 presented on a display 1002 of an end-user computing system 140, depicting a reconstructed, analyzed image captured using a plurality of shelf-mountable imaging devices.

As illustrated in FIG. 10, a reconstructed image may be presented to a user that is the result of a dewarping and deskewing process, as well as a stitching process. For example, individual images captured by imaging devices may be de-skewed to remove perspective effects in an image of the opposed shelf when viewed from the perspective of the camera of an imaging device. Specifically, a warping and skewing may occur as to portions of a shelf, and products on those portions, that are further away from and viewed at a less direct angle relative to the camera. Additionally, after the dewarping and deskewing process, two or more such images may be stitched together to form a composite image 1010 of a shelf at a particular point in time. The stitched image may be a composite of two or more images from imaging devices, such as images from two cameras of a single imaging device or cameras of two or more different imaging devices. The stitched image may then reflect a view of an increased length of and opposed shelf, for example appearing as a panoramic image of the opposed shelf.

Individual dewarped, deskewed images or composite images may then be analyzed in a variety of ways. In the example shown, an object detection algorithm is applied, in combination with planogram data, to assess whether particular objects 1012 are identified as being positioned in an appropriate locations on the shelf captured in the composite image, and to potentially detect empty shelf spaces 1014 that correspond to particular products. Notifications may be sent automatically to store employees regarding empty shelf spaces to initiate restocking activity.

In addition, various analysis metrics may be calculated by a user U based on models derived from image data. For example, rates of out of stocks may be assessed at a single location, or compared across multiple retail locations. Additionally, relative performance of retail locations may be assessed in terms of stocking performance or planogram compliance. Additionally, assessments of the time of day at which out of stock events occur may be performed at one or more locations to cause a reassessment or modification of restocking schedules, e.g. to increase frequency of restocking or change times of restocking to ensure stock on shelves, minimize customer disruption, and ensure customer loyalty.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of retail imaging systems other contexts in which imaging systems are required to perform periodic, low-power image capture and subsequent analysis may be applicable as well.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

Aspects of the Disclosure

Aspect 1. An imaging system for use in capture of images of shelf stock at a retail location, the retail location including a plurality of retail product shelves arranged in a plurality of aisles, each of the retail product shelves having opposite top and bottom sides extending along a length and along a depth of the retail product shelf, the length of each retail product shelf extending along the respective aisle, the depth of each retail product shelf extending between a rear and a front edge of the retail product shelf, the imaging system comprising:
    a plurality of self-contained imaging devices each mounted to the bottom side of one of the retail product shelves, each of the imaging devices comprising:
        a housing mounted to the bottom side of the respective retail product shelf so that a viewing portion extends downwardly below the retail product shelf while remaining flush or recessed from the front edge of the respective retail product shelf;
        an image sensor disposed at the viewing portion of the housing and oriented toward an opposed retail product shelf on an opposite side of the aisle from the respective retail product shelf;
        a main processor circuit disposed within the housing, the main processor circuit being configured to manage the image sensor;
        a wireless communication interface disposed at the housing, the wireless communication interface being managed by the main processor circuit to communicate images obtained from the image sensor to a remote aggregation device; and
        a replaceable internal power source disposed within the housing, the internal power source being configured to supply power to the image sensor, the main processor circuit, and the network communication interface.

Aspect 11. An imaging device for use in a retail environment comprising:
    an under-shelf mountable housing;
    a first image sensor held by the housing and facing in a first direction to have a first field of view;

a second image sensor held by the housing and facing in a second direction to have a second view of view that is different than the first field of view; and a presence sensor disposed between the first and second image sensors, the presence sensor having a range extending along the first and second fields of view;

the imaging device being configured to obtain images from the first and second image sensors in tandem when the presence sensor detects a lack of motion within the first and second fields of view.

Aspect 17. An imaging device comprising:
a housing;
an image sensor arrangement disposed within the housing, the image sensor arrangement including a first image sensor;
a controller disposed within the housing, the controller being coupled to the image sensor arrangement via a control line and a data line, the controller including a processor and memory, the memory storing instructions to:
receive a request to obtain an image;
analyze the request to determine a type of image requested, the type of image being a low resolution image or a high resolution image;
sending instructions to the image sensor to obtain a low resolution image if a low resolution image is requested; and
sending a sequence of instructions to the image sensor to obtain a series of high resolution sub-images each representing a portion of the image if a high resolution image is requested.

Aspect 22. An imaging device comprising:
a housing;
an image sensor arrangement mounted to the housing, the image sensor arrangement including a first image sensor and a second image sensor;
a local electronic processor disposed within the housing, the local electronic processor including a switching circuit that electrically couples the local electronic processor to a selected one of the first and second image sensors;
a presence sensor arrangement mounted to the housing, the presence sensor arrangement being electrically coupled to the local electronic processor; and
a network communication controller mounted to the housing, the network communication controller being electrically coupled to the local electronic processor.

Aspect 25. An imaging device for use in a retail environment, the imaging device comprising:
a housing having a depth extending between a front and a rear, a width extending between opposite first and second sides, and a height extending between a bottom and a top, the housing including a mounting portion configured to be mounted to a bottom of a shelf, the housing also including a viewing portion configured to extend downwardly from the shelf when the mounting portion is mounted to the bottom of the shelf, the mounting portion defining a majority of the height of the housing, the viewing portion defining a viewing window and an aperture;
an imaging sensor disposed within the housing and aligned with the viewing window; and
a presence sensor disposed within the housing and aligned with the aperture.

Aspect 31. A shelf-mountable imaging device comprising:
a housing mountable to a product shelf;
a imaging device positioned at a front side of the housing;
a main processor circuit positioned within the housing and comprising a non-volatile memory, the non-volatile memory storing operational instructions executable by the main processor circuit to capture images via the imaging device; and
a companion circuit communicatively connected to the main processor circuit, the companion circuit comprising an embedded control circuit including a wireless communication interface;
wherein the companion circuit includes an embedded memory storing maintenance instructions, the maintenance instructions causing the companion circuit to:
determine, during an awake condition for the main processor circuit and the companion circuit, that an update to the operational instructions should be performed;
assess whether one or more conditions are present that suggest that the update may not complete successfully;
upon determining that the one or more conditions are not present, temporarily disable a sleep mode of the main processor circuit and the companion circuit;
initiate wireless communication with a remote server storing updated operational instructions;
set a reprogramming mode of the main processor circuit, the reprogramming mode providing write access to the non-volatile memory to the companion circuit;
write updated operational instructions received from the remote server via the wireless communication interface to the non-volatile memory; and
exit the reprogramming mode of the main processing circuit and initiate a reboot of the main processing circuit.

Aspect 43. An imaging system for use in capture of images of shelf stock at a retail location, the imaging system comprising:
an imaging device mounted to an underside of a retail product shelf within an aisle of a retail location, the imaging device comprising:
a housing mounted to a product shelf;
a imaging device positioned at a front side of the housing and oriented toward an opposed product shelf on an opposite side of the aisle from the retail product shelf to which the housing is mounted;
a main processor circuit positioned within the housing and comprising a non-volatile memory, the non-volatile memory storing operational instructions executable by the main processor circuit to capture images of the opposed product shelf via the imaging device; and a companion circuit communicatively connected to the main processor circuit, the companion circuit comprising an embedded control circuit including a wireless communication interface;
wherein the companion circuit includes an embedded memory storing maintenance instructions, the maintenance instructions causing the companion circuit to:
determine, during an awake condition for the main processor circuit and the companion circuit, that an update to the operational instructions should be performed;
assess whether one or more conditions are present that suggest that the update may not complete successfully;

upon determining that the one or more conditions are not present, temporarily disable a sleep mode of the main processor circuit and the companion circuit;

initiate wireless communication with a remote server storing updated operational instructions;

set a reprogramming mode of the main processor circuit, the reprogramming mode providing write access to the non-volatile memory to the companion circuit;

write updated operational instructions received from the remote server via the wireless communication interface to the non-volatile memory; and exit the reprogramming mode of the main processing circuit and initiate a reboot of the main processing circuit.

Aspect 50. A method for obtaining an image with an imaging device, the method comprising:
 at a local processor disposed within the imaging device, receiving a request to obtain an image over a field of view of the imaging device;
 at the local processor, defining a plurality of regions within the field of view;
 sequentially sending respective control signals from the local processor to an image sensor arrangement of the imaging device to obtain a sub-image for each of the regions within the field of view;
 at the local processor, sequentially receiving the sub-images from the image sensor arrangement; and
 sequentially sending each received sub-image from the local processor to a processor at an aggregation station remote from the imaging device.

Aspect 57. A method of obtaining an image comprising:
 (a) at a local processor disposed within the imaging device, receiving a request to obtain an image over a field of view of the imaging device, the field of view being divided into sub-regions;
 (b) sending a request to an image sensor arrangement to capture a sub-image of a pre-determined size and at a selected offset from a particular channel of the image sensor arrangement, the selected offset corresponding with one of the sub-regions of the field of view;
 (c) receiving the sub-image from the image sensor arrangement;
 (d) sending the sub-image to a remote processor via a wireless connection;
 (e) repeat steps (b)-(d) for each sub-region of the field of view.

Aspect 58. A method of obtaining an image comprising:
 obtaining a plurality of images over a period of time using an image sensor of an imaging device, the image sensor remaining stationary over the period of time, each of the images being associated with a different sub-set of a field of view of the image sensor; and
 creating a combined image from the obtained images based on metadata associated with the obtained images, the metadata including identification of the respective sub-set of the field of view.

Aspect 60. A method of obtaining a series of images at a retail location, the method comprising:
 obtaining a reading from a presence sensor mounted within an aisle of the retail location; and
 taking an image from an image sensor mounted within the aisle of the retail location when the obtained reading indicates a lack of human activity in the aisle.

Aspect 65. A method for battery power management of a shelf-mountable imaging device having a hardware system that includes a main processor circuit, a motion detector, first and second imaging devices and a companion processor circuit, the method comprising
 powering ON the main processor circuit;
 subsequent the powering ON of the main processor circuit, performing a wake-up operation by powering ON the motion detector, the motion detector providing data to the main processor circuit indicating an absence of motion and, subsequently, powering OFF the motion detector;
 subsequent the wake-up operation, performing an image capture operation by powering ON the companion processor circuit to an ON not transmitting WiFi mode, powering ON each of the first and second camera to an ENABLED not capturing mode, then powering the first imaging device to an ON capturing mode, the first imaging device then performing image capture, subsequently returning the first imaging device to an ENABLED not capturing mode and then powering the second imaging device to an ON capturing mode, the second imaging device then performing image capture and subsequently returning the second imaging device to an ENABLED not capturing mode;
 subsequent the image capture operation, performing an image transfer operation by transferring the captured images of the first imaging device to the companion processor circuit and subsequently transferring the captured images of the second imaging device to the companion processor circuit then powering both the first and second imaging devices OFF; and
 subsequent the image transfer operation, performing a WiFi image transfer operation by powering ON a WiFi transceiver of the companion processor circuit to place the companion processor circuit in an ON transmitting WiFi mode, transmitting via the WiFi transceiver the captured images to a remote computing device, then powering OFF the WiFi transmitter to place the companion processor circuit in an ON not transmitting mode and subsequently powering OFF the companion processor circuit.

Aspect 66. An imaging system for use in capture of images of shelf stock at a retail location, the retail location including a plurality of retail product shelves arranged in a plurality of aisles, each of the retail product shelves having opposite top and bottom sides extending along a length and along a depth of the retail product shelf, the length of each retail product shelf extending along the respective aisle, the depth of each retail product shelf extending between a rear and a front edge of the retail product shelf, the imaging system comprising:
 a plurality of self-contained imaging devices each mounted to the bottom side of one of the retail product shelves, each of the imaging devices comprising:
  a housing mounted to the bottom side of the respective retail product shelf so that a viewing portion extends forwardly of the front edge of the retail product shelf while a majority of the housing remains flush or recessed from the front edge of the respective retail product shelf;
  an image sensor disposed at the viewing portion of the housing and oriented toward an opposed retail product shelf on an opposite side of the aisle from the respective retail product shelf;
  a main processor circuit disposed within the housing, the main processor circuit being configured to manage the image sensor;
  a wireless communication interface disposed at the housing, the wireless communication interface being managed by the main processor circuit to communicate images obtained from the image sensor to a remote aggregation device; and a replaceable internal power source disposed within the housing, the internal power source being configured to supply power to the image sensor, the main processor circuit, and the network communication interface.

Aspect 78. An imaging system for use in capture of images of shelf stock at a retail location, the retail location including a plurality of retail product shelves arranged in a plurality of aisles, each of the retail product shelves having opposite top and bottom sides extending along a length and along a depth of the retail product shelf, the length of each retail product shelf extending along the respective aisle, the depth of each retail product shelf extending between a rear and a front edge of the retail product shelf, and each retail product shelf having an angled extension extending downwardly from the retail product shelf, the imaging system comprising:

a plurality of self-contained imaging devices each mounted to the bottom side of one of the retail product shelves so that a main portion of each imaging device is disposed behind the angled extension of the respective retail product shelf, the main portion of each imaging device defining an access aperture, each of the imaging devices comprising:

a plurality of image sensors disposed at a viewing portion of the housing that extends beneath the angled extension;

a wireless communication interface disposed within the main portion of the housing, the wireless communication interface being configured to communicate images obtained from the image sensors to a remote aggregation device;

a network communication controller and wireless network interface disposed within the main portion of the housing; and a replaceable internal power source disposed within the main portion of the housing, the internal power source being configured to supply power to the image sensors, the wireless communication interface, and the network communication interface, the replaceable internal power source being removable from the main portion of the housing through the access aperture without removing the main portion of the housing from the respective retail product shelf.

Aspect 86. An imaging device for use in a retail environment comprising:

an under-shelf mountable housing;

a first image sensor held by the housing and facing in a first direction to have a first field of view;

a second image sensor held by the housing and facing in a second direction to have a second field of view that is different than the first field of view; and a presence sensor disposed between the first and second image sensors, the presence sensor having a range extending along the first and second fields of view;

the imaging device being configured to obtain images from the first and second image sensors in tandem when the presence sensor detects a lack of human activity within the first and second fields of view.

Aspect 99. A method of obtaining a series of images at a retail location, the method comprising:

obtaining a reading from a motion sensor mounted within an aisle of the retail location; and taking a first image from a first image sensor of an imaging device mounted within the aisle of the retail location when the obtained reading indicates a lack of motion in the aisle; and taking a second image from a second image sensor of the imaging device after taking the first image and before sensing motion in the aisle, the second image sensor facing in a different direction than the first image sensor while having a partially overlapping field of view with the first image sensor.

Aspect 104. An imaging device for use in a retail environment, the imaging device comprising:

a housing having a depth extending between a front and a rear, a width extending between opposite first and second sides, and a height extending between a bottom and a top, the housing including a mounting portion configured to be mounted to a bottom of a retail shelf within the retail environment, the housing also including a viewing portion configured to extend forwardly of the retail shelf when the mounting portion is mounted to the bottom of the retail shelf, the mounting portion of the housing being angled at the front to accommodate an angled extension at a front of the retail shelf, the mounting portion defining a majority of the height of the housing, the viewing portion defining a viewing window and an aperture;

an imaging sensor disposed within the housing and aligned with the viewing window; and a presence sensor disposed within the housing and aligned with the aperture.

Aspect 106. A shelf-mountable imaging device comprising:

a housing mountable to a product shelf;

a imaging device positioned at a front side of the housing;

a main processor circuit positioned within the housing and comprising a non-volatile memory, the non-volatile memory storing operational instructions executable by the main processor circuit to capture images via the imaging device; and a companion circuit communicatively connected to the main processor circuit, the companion circuit comprising an embedded control circuit including a wireless communication interface;

wherein the companion circuit includes an embedded memory storing maintenance instructions, the maintenance instructions causing the companion circuit to:

determine, during an awake condition for the main processor circuit and the companion circuit, that an update to the operational instructions should be performed;

assess whether one or more conditions are present that suggest that the update may not complete successfully;

upon determining that the one or more conditions are not present, temporarily disable a sleep mode of the main processor circuit and the companion circuit;

initiate wireless communication with a remote server storing updated operational instructions;

set a reprogramming mode of the main processor circuit, the reprogramming mode providing write access to the non-volatile memory to the companion circuit;

write updated operational instructions received from the remote server via the wireless communication interface to the non-volatile memory; and exit the reprogramming mode of the main processing circuit and initiate a reboot of the main processing circuit.

Aspect 110. The shelf-mountable imaging device of aspect 106, wherein the embedded memory of the companion circuit further stores communication instructions for communication via the wireless communication interface, the communication instructions causing the embedded memory to:
  enable the wireless communication interface;
  transmit data to the remote server;
  check for available updates to the operational instructions at the remote server;
  after checking for available updates, entering a low power state.

Aspect 118. An imaging system for use in capture of images of shelf stock at a retail location, the imaging system comprising:
  an imaging device mounted to an underside of a retail product shelf within an aisle of a retail location, the imaging device comprising:
  a housing mounted to a product shelf;
  a imaging device positioned at a front side of the housing and oriented toward an opposed product shelf on an opposite side of the aisle from the retail product shelf to which the housing is mounted;
  a main processor circuit positioned within the housing and comprising a non-volatile memory, the non-volatile memory storing operational instructions executable by the main processor circuit to capture images of the opposed product shelf via the imaging device; and
  a companion circuit communicatively connected to the main processor circuit, the companion circuit comprising an embedded control circuit including a wireless communication interface;
  wherein the companion circuit includes an embedded memory storing maintenance instructions, the maintenance instructions causing the companion circuit to:
    determine, during an awake condition for the main processor circuit and the companion circuit, that an update to the operational instructions should be performed;
    assess whether one or more conditions are present that suggest that the update may not complete successfully;
    upon determining that the one or more conditions are not present, temporarily disable a sleep mode of the main processor circuit and the companion circuit;
    initiate wireless communication with a remote server storing updated operational instructions;
    set a reprogramming mode of the main processor circuit, the reprogramming mode providing write access to the non-volatile memory to the companion circuit;
    write updated operational instructions received from the remote server via the wireless communication interface to the non-volatile memory; and
    exit the reprogramming mode of the main processing circuit and initiate a reboot of the main processing circuit.

Aspect 125. A method for battery power management of a shelf-mountable imaging device having a hardware system that includes a main processor circuit, a motion detector, first and second imaging devices and a companion processor circuit, the method comprising
  powering ON the main processor circuit;
  subsequent the powering ON of the main processor circuit, performing a wake-up operation by powering ON the motion detector, the motion detector providing data to the main processor circuit indicating an absence of motion and, subsequently, powering OFF the motion detector;
  subsequent the wake-up operation, performing an image capture operation by powering ON the companion processor circuit to an ON not transmitting WiFi mode, powering ON each of the first and second camera to an ENABLED not capturing mode, then powering the first imaging device to an ON capturing mode, the first imaging device then performing image capture, subsequently returning the first imaging device to an ENABLED not capturing mode and then powering the second imaging device to an ON capturing mode, the second imaging device then performing image capture and subsequently returning the second imaging device to an ENABLED not capturing mode;
  subsequent the image capture operation, performing an image transfer operation by transferring the captured images of the first imaging device to the companion processor circuit and subsequently transferring the captured images of the second imaging device to the companion processor circuit then powering both the first and second imaging devices OFF; and
  subsequent the image transfer operation, performing a WiFi image transfer operation by powering ON a WiFi transceiver of the companion processor circuit to place the companion processor circuit in an ON transmitting WiFi mode, transmitting via the WiFi transceiver the captured images to a remote computing device, then powering OFF the WiFi transmitter to place the companion processor circuit in an ON not transmitting mode and subsequently powering OFF the companion processor circuit.

Aspect 126. An imaging device comprising:
  a housing;
  an image sensor arrangement disposed within the housing, the image sensor arrangement including a first image sensor;
  a controller disposed within the housing, the controller being coupled to the image sensor arrangement via a control line and a data line, the controller including a processor and memory, the memory storing instructions to:
  receive a request to obtain an image;
  analyze the request to determine a type of image requested, the type of image being a low resolution image or a high resolution image;
  sending instructions to the image sensor to obtain a low resolution image if a low resolution image is requested; and
  sending a sequence of instructions to the image sensor to obtain a series of high resolution sub-images each representing a portion of the image if a high resolution image is requested.

Aspect 131. A method of obtaining an image comprising:
  obtaining a plurality of images over a period of time using an image sensor arrangement of an imaging device, the image sensor arrangement remaining stationary over the period of time, each of the images being associated with a different sub-set of a field of view of the image sensor arrangement; and
  creating a combined image from the obtained images based on metadata associated with the obtained images, the metadata including identification of the respective sub-set of the field of view.

Aspect 133. The method of aspect 131, wherein obtaining the plurality of images comprises:
- at a local processor disposed within the imaging device, receiving a request to obtain an overall image over the field of view of the imaging device;
- at the local processor, defining a plurality of regions within the field of view, each of the regions corresponding to one of the sub-sets of the field of view;
- sequentially sending respective control signals from the local processor to the image sensor arrangement of the imaging device to obtain a respective image of each of the regions within the field of view;
- at the local processor, sequentially receiving the images of the regions from the image sensor arrangement; and
- sequentially sending each received image from the local processor to a processor at an aggregation station remote from the imaging device.

Aspect 141. A method of obtaining an image with an imaging device comprising:
- (a) at a local processor disposed within the imaging device, receiving a request to obtain an image over a field of view of the imaging device, the field of view being divided into sub-regions;
- (b) sending a request from the local processor to an image sensor arrangement to capture a sub-image of a predetermined size and at a selected offset from the image sensor arrangement, the selected offset corresponding with one of the sub-regions of the field of view;
- (c) at the local processor, receiving the sub-image from the image sensor arrangement;
- (d) sending the sub-image from the local processor to a remote processor via a wireless connection;
- (e) repeat steps (b)-(d) for each sub-region of the field of view.

What is claimed is:

1. A shelf-mountable imaging device comprising:
a housing mountable to a product shelf;
an imaging unit positioned at a front side of the housing;
a main processor circuit positioned within the housing and configured to communicate with the imaging unit to capture images;
a non-volatile memory positioned within the housing; and
a companion circuit communicatively connected to the main processor circuit, the companion circuit comprising an embedded control circuit including a wireless communication interface;
wherein the companion circuit includes an embedded memory storing maintenance instructions, the maintenance instructions causing the companion circuit to:
  determine, during an awake condition for the main processor circuit and the companion circuit, that an update to operational instructions should be performed;
  assess whether one or more conditions are present that suggest that the update may not complete successfully;
  upon determining that the one or more conditions are not present, temporarily disable a sleep mode of the main processor circuit and the companion circuit;
  initiate wireless communication with a remote server storing updated operational instructions;
  set a reprogramming mode of the main processor circuit, the reprogramming mode providing write access to the non-volatile memory to the companion circuit while halting write access to the non-volatile memory by the main processor circuit;
  write updated operational instructions received from the remote server via the wireless communication interface to the non-volatile memory; and
  exit the reprogramming mode of the main processor circuit and initiate a reboot of the main processor circuit.

2. The shelf-mountable imaging device of claim 1, wherein the non-volatile memory is separate from the main processor circuit.

3. The shelf-mountable imaging device of claim 1, further comprising a power source comprising a power management module electrically connected to a battery, the power management module being electrically connected to selectively supply power to the imaging unit, the main processor circuit, and the companion circuit, wherein the power management module maintains power to the main processor circuit while the companion circuit writes the updated operational instructions to the non-volatile memory.

4. The shelf-mountable imaging device of claim 1, wherein the imaging unit comprises an image sensor including an image processing circuit, wherein the image processing circuit is communicatively connected to the main processor circuit.

5. The shelf-mountable imaging device of claim 4, wherein the image sensor is a first image sensor, and wherein the imaging unit further includes a second image sensor; and wherein the first and second image sensors output to a common line leading towards the main processor circuit.

6. The shelf-mountable imaging device of claim 1, wherein the embedded memory of the companion circuit further stores communication instructions for communication via the wireless communication interface, the communication instructions causing the embedded memory to:
enable the wireless communication interface;
transmit data to the remote server;
check for available updates to the operational instructions at the remote server;
after checking for available updates, entering a low power state.

7. The shelf-mountable imaging device of claim 6, wherein the data transmitted to the remote server includes image data captured via the imaging unit and health data of the shelf-mountable imaging system, wherein the health data includes a battery voltage level.

8. The shelf-mountable imaging device of claim 6, wherein enabling the wireless communication interface includes entering an operational mode from the low power state.

9. The shelf-mountable imaging device of claim 1, wherein the one or more conditions comprises a low battery level, a detection of corrupted data, and/or faulty device behavior.

10. The shelf-mountable imaging device of claim 6, wherein the maintenance instructions are executed at a predetermined time.

11. The shelf-mountable imaging device of claim 10, wherein the predetermined time is during execution of the communication instructions, after transmission of the data to the remote server and prior to entering the low power state.

12. The shelf-mountable imaging device of claim 11, wherein the predetermined time is selected by the remote server.

13. An imaging system for use in capture of images of shelf stock at a retail location, the imaging system comprising:

an imaging device mounted to an underside of a retail product shelf within an aisle of a retail location, the imaging device comprising:
a housing mounted to the retail product shelf;
an imaging device positioned at a front side of the housing and oriented toward an opposed product shelf on an opposite side of the aisle from the retail product shelf to which the housing is mounted;
a main processor circuit positioned within the housing and comprising a non-volatile memory, the non-volatile memory storing operational instructions executable by the main processor circuit to capture images of the opposed product shelf via the imaging device; and
a companion circuit communicatively connected to the main processor circuit, the companion circuit comprising an embedded control circuit including a wireless communication interface;
wherein the companion circuit includes an embedded memory storing maintenance instructions, the maintenance instructions causing the companion circuit to:
  determine, during an awake condition for the main processor circuit and the companion circuit, that an update to the operational instructions should be performed;
  assess whether one or more conditions are present that suggest that the update may not complete successfully;
  upon determining that the one or more conditions are not present, temporarily disable a sleep mode of the main processor circuit and the companion circuit;
  initiate wireless communication with a remote server storing updated operational instructions;
  set a reprogramming mode of the main processor circuit, the reprogramming mode providing write access to the non-volatile memory to the companion circuit;
  write updated operational instructions received from the remote server via the wireless communication interface to the non-volatile memory; and
  exit the reprogramming mode of the main processor circuit and initiate a reboot of the main processor circuit.

14. The imaging system of claim 13, further comprising the remote server, wherein the remote server is communicatively connectable to the imaging device.

15. The imaging system of claim 14, wherein the remote server is located remotely from the retail location.

16. The imaging system of claim 14, further comprising a plurality of imaging devices, the plurality of imaging devices each mounted to a respective product shelf of a plurality of product shelves at the retail location.

17. The imaging system of claim 16, wherein the remote server defines an update schedule that staggers updates to the operational instructions of each of the plurality of imaging devices.

18. The imaging system of claim 17, wherein a time at which the update should occur for each of the plurality of imaging devices differs for each of the plurality of imaging devices.

19. The imaging system of claim 14, wherein the remote server is configured to receive from the imaging device an indication of a failure to update the operational instructions.

* * * * *